(12) United States Patent
Ozin et al.

(10) Patent No.: US 7,758,919 B2
(45) Date of Patent: Jul. 20, 2010

(54) METHOD OF SELF-ASSEMBLY AND OPTICAL APPLICATIONS OF CRYSTALLINE COLLOIDAL PATTERNS ON SUBSTRATES

(75) Inventors: Geoffrey Alan Ozin, Toronto (CA); San Ming Yang, Toronto (CA); Hernan Miguez, Toronto (CA)

(73) Assignee: The Governing Council of the University of Toronto, Toronto, Ontario (CA)

( * ) Notice: Subject to any disclaimer, the term of this patent is extended or adjusted under 35 U.S.C. 154(b) by 211 days.

(21) Appl. No.: 11/783,569

(22) Filed: Apr. 10, 2007

(65) Prior Publication Data
US 2007/0196571 A1 Aug. 23, 2007

Related U.S. Application Data

(62) Division of application No. 10/660,588, filed on Sep. 12, 2003, now Pat. No. 7,247,349, which is a division of application No. 09/977,254, filed on Oct. 16, 2001, now Pat. No. 7,045,195.

(60) Provisional application No. 60/240,055, filed on Oct. 16, 2000, provisional application No. 60/253,081, filed on Nov. 28, 2000, provisional application No. 60/296,119, filed on Jun. 7, 2001.

(51) Int. Cl.
*B05D 3/12* (2006.01)
*B05D 1/38* (2006.01)
*B05D 3/02* (2006.01)
*B05D 3/04* (2006.01)
*B05D 3/10* (2006.01)

(52) U.S. Cl. ............... 427/240; 427/261; 427/255.37; 427/337; 427/397.7; 977/779; 977/883

(58) Field of Classification Search ............... None
See application file for complete search history.

(56) References Cited

U.S. PATENT DOCUMENTS

| 4,728,591 A | 3/1988 | Clark et al. |
| 6,194,316 B1 * | 2/2001 | Oda et al. ............... 438/687 |
| 2002/0151161 A1 * | 10/2002 | Furusawa ............... 438/597 |

FOREIGN PATENT DOCUMENTS

| EP | 1030196 | 1/2000 |
| EP | 1081513 | 8/2000 |
| WO | 0010040 | 8/1999 |

OTHER PUBLICATIONS

Velev et al., "Colloidal Crystals as Templates for Porous Materials," Current Opinion in Colloid & Interface Science 5 (2000) 56-63.*

(Continued)

*Primary Examiner*—William Phillip Fletcher, III
(74) *Attorney, Agent, or Firm*—Lynn C. Schumacher; Hill & Schumacher

(57) ABSTRACT

This invention describes methods of synthesis and applications of a composite material of a colloidal crystal and a substrate. The method includes steps of (a) providing a substrate having a surface with a surface relief pattern; and (b) applying a liquid dispersion containing colloidal particles onto the surface and spinning the substrate whereby colloidal particles are swept across the surface and self-assemble in void spaces on the surface defined by the relief pattern. The resulting composite material (substrate with colloidal crystal) may be used in various applications such as chromatography, for use in lab-on-chip based devices, micro-reactors and the like. The material may be infiltrated by a material and the composite inverted to remove the colloidal particles to produce an inverted colloidal crystal pattern on the substrate. The material may be selected such that the inverted colloidal crystal pattern is a photonic crystal.

10 Claims, 45 Drawing Sheets

OTHER PUBLICATIONS

Xia et al., "Monodispersed Colloidal Spheres: Old Materials with New Applications," Adv. Mater. 2000, 12, No. 10, 693-713.*

Denning, R.G., "New optics—new materials," J. Mater. Chem., 2001, 11, 19-28.*

Definition of "colloid chemistry" from Hawley's Condensed Chemical Dictionary, 14th Edition. Copyright 2002 by John Wiley & Sons. Retrieved online at http://knovel.com/web/portal/browse/display?_EXT_KNOVEL_DISPLAY_bookid=704&VerticalID=0, Oct. 10, 2008.*

Chen et al., "Nanofabrication: Conventional and nonconventional methods," Electrophoresis 2001, 22, 187-207.*

Xia et al., "Soft Lithography," Angew. Chem. Int. Ed. 1998, 37, 550-575.*

Gates, B. et al.: "Self-Assembly of Meso-and Nanoparticles into 3-D Ordered Arrays and Its Applications", Organic/Inorganic Hybrid Materials II, San Francisco, CA, Apr. 5-9, 1999, Materials Research Society Symposium Proceedings, vol. 576, Apr. 5, 1999, pp. 149-154, XP-000897904.

Aizenberg et al.: "Patterned Colloidal Deposition Controlled by Electrostatic and Capillary Forces", Physical Review Letters, vol. 84, No. 13, Mar. 27, 2000, pp. 2997-3000, XP-001074766.

Chen, et al.: "Selective Self Organization of Colloids on Patterned Polyelectrolyte Templates", Langmuir, vol. 16, 2000, pp. 7825-7834, XP-001074759.

Oleschuk et al.: "Trapping of Bead-Based Reagents within Microfluidic Systems", Anal. Chem., vol. 72, 2000, pp. 585-590, XP-001074756.

Kim et al.: "Two- and Three-Dimensional Crystallization of Polymeric Microspheres by Micromolding in Capillaries", Advanced Materials, VCH Verlagsgesellschaft, Weinheim, DE, vol. 8, No. 3, Mar. 1, 1996, pp. 245-247, XP-000558255.

Chomski E. et al: "Panoscopic Silicon—A Material for All Length Scales", Advanced Materials, VCH Veriagsgesellschaft, Weinheim, DE, vol. 12, No. 14, Jul. 19, 2000, pp. 1071-1078, XP-000959392.

Deckman H.W. et al.: "Macromolecular Self-Organized Assemblies", American Vacuum Society, J. Vac. Sci. Technol., B 6(1), Jan./Feb. 1988, pp. 333-336.

Burmeister et al.: "From Mesoscopic to Nanoscopic Surface Structures: Lithography with Colloid Monolayers", Advanced Materials, vol. 10, No. 6, 1998, pp. 495-497.

Yang et al.: "Hierarchically Ordered Oxides", Science, vol. 282, Dec. 18, 1998, pp. 2244-2246.

Lin et al.: "Entropically Driven Colloidal Crystallization on Patterned Surfaces", The American Physical Society, Physical Review Letters, vol. 85, No. 8, Aug. 21, 2000, pp. 1770-1773.

Hayward et al.: "Electrophoretic Assembly of Colloidal Crystals with Optically Tunable Micropatterns", Macmillian Magazines Ltd., Nature, vol. 404, Mar. 2, 2000, pp. 56-58.

Chen et al.: "Selective Self-Organization of Colloids on Patterned Polyelectrolyte Templates", Langmiur, vol. 16, No. 20, 2000 American Chemical Society, Sep. 8, 2000, pp. 7825-7834.

Yin et al.: "A Self-Assembly Approach to the Formulation of Asymmetric Dimers from Monodispersed Spherical Colloids", J. Am. Chem. Soc., vol. 123, 2001 American Chemical Society, Jan. 9, 2001, pp. 771-772.

Lu et al.: "A Self-Assembly Approach to the Fabrication of Patterned, Two-Dimensional Arrays of Microlenses of Organic Polymers", Advanced Materials, vol. 13, No. 1, Jan. 5, 2001, pp. 34-37.

Yin et al.: "Assembly of Monodispersed Spherical Colloids into One-Dimensional Aggregates Characterized by Well-Controlled Structures and Lengths", Journal of Chemistry Materials Communication, The Royal Society of Chemistry, Mar. 2001, pp. 987-989.

Yang et al.: "Patterning Porous Oxides Within Microchannel Networks", Advanced Materials, vol. 13, No. 6, Mar. 2001, pp. 427-431.

Jiang et al.: "Single-Crystal Colloidal Multilayers of Controlled Thickness", American Chemical Society, Chem. Mater., vol. 11, 1999, pp. 2132-2140.

Jiang et al.: "The Fabrication and Bandgap Engineering of Photonic Multilayers", Advanced Materials, vol. 13, No. 6, Mar. 16, 2001, pp. 389-393.

Park et al.: "Crystallization of Mesoscale Particles Over Large Areas", Advanced Materials, vol. 10, No. 13, 1998, pp. 1028-1031.

Blaaderen et al.: "Template-directed Colloidal Crystallization", Nature, vol. 385, Jan. 23, 1997, pp. 321-324.

Dimitrov et al.: "Continuous Convective Assembling of Fine Particles into Two-Dimensional Arrays on Solid Surfaces", Langmuir, vol. 12, 1996, pp. 1303-1311.

* cited by examiner

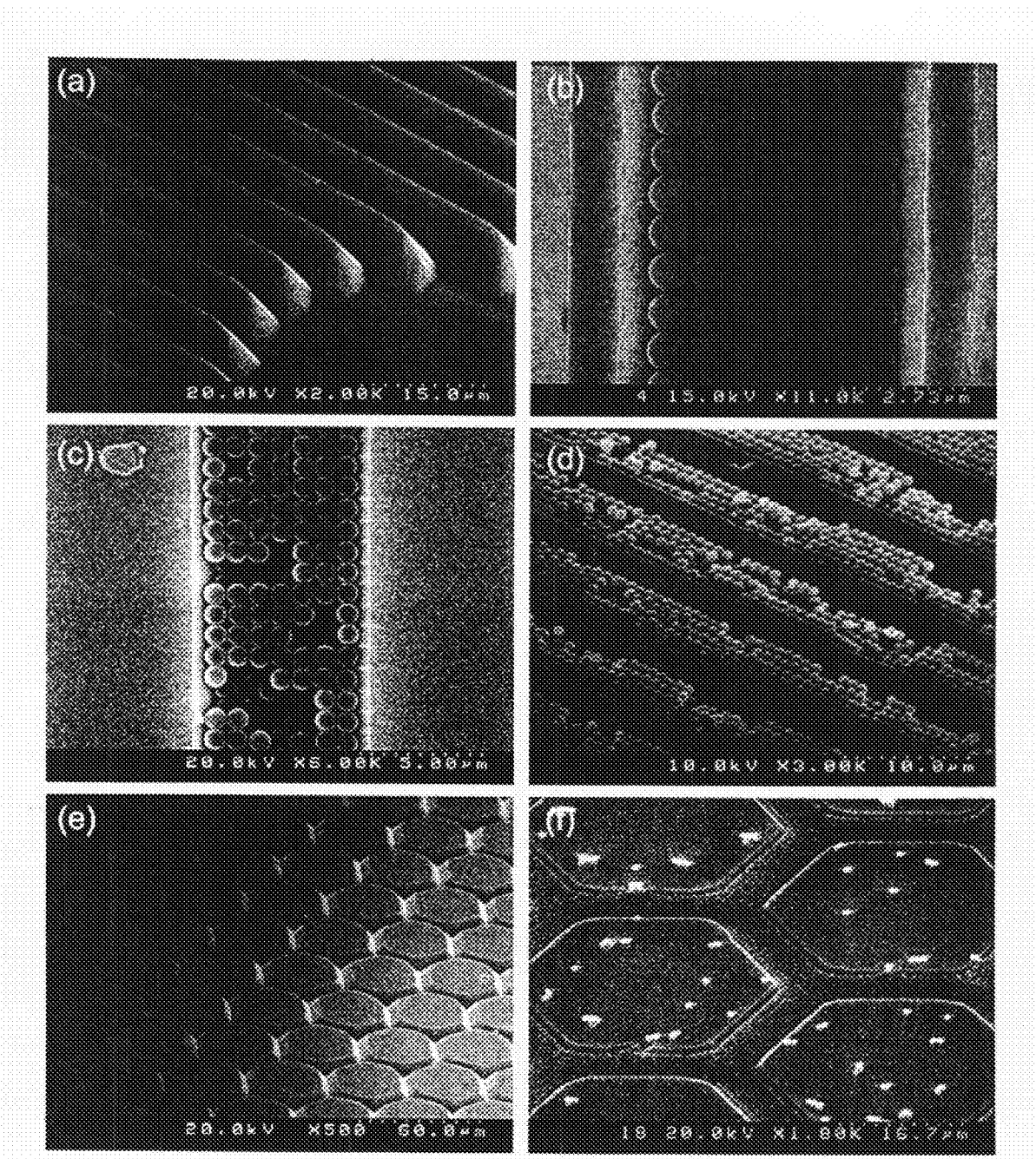
Figures 1(a) to (f)

INTEGRATED PHOTONIC CHIP: IN-WAFER
PATTERNED PHOTONIC CRYSTALS AND
OPTICAL FIBERS
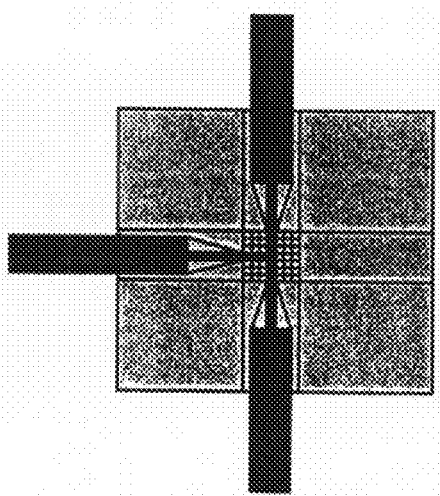
Figure 21a
Top View Of Photonic Chip
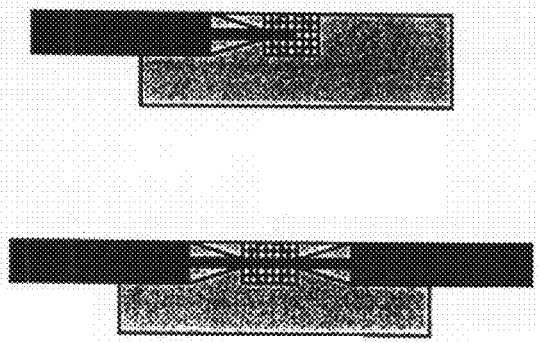
Figure 21b,c
Side Views Of Photonic Chip

METHOD OF SELF-ASSEMBLY AND OPTICAL APPLICATIONS OF CRYSTALLINE COLLOIDAL PATTERNS ON SUBSTRATES

CROSS REFERENCE TO RELATED U.S. PATENT APPLICATIONS

This patent application is a divisional application of U.S. patent application Ser. No. 10/660,588, entitled METHOD OF SELF-ASSEMBLY AND OPTICAL APPLICATIONS OF CRYSTALLINE COLLOIDAL PATTERNS ON SUBSTRATES, filed on Sep. 12, 2003, in the name of the same inventors and issued on Jul. 24, 2007, as U.S. Pat. No. 7,247,349 B2, which is a divisional application of U.S. patent application Ser. No. 09/977,254, filed on Oct. 16, 2001, in the name of the same inventors and issued on May 16, 2006, as U.S. Pat. No. 7,045,195 B2, which claims benefit of U.S. provisional patent application Ser. No. 60/240,055, filed on Oct. 16, 2000, entitles METHOD OF SELF-ASSEMBLY OF CRYSTALLINE COLLOIDAL PATTERS ON SUBSTRATES, Ser. No. 60/253,081, filed on Nov. 28, 2000, entitled METHOD OF SELF-ASSEMBLY OF CRYSTALLINE COLLOIDAL PATTERNS ON SUBSTRATES, and Ser. No. 60/296,119, filed Jun. 7, 2001, entitled METHOD OF SELF-ASSEMBLY OF CRYSTALLINE COLLOIDAL PATTERNS ON SUBSTRATES, all of which are incorporated herein by reference in their entirety.

FIELD OF THE INVENTION

The present invention relates to methods of synthesis and optical applications of composite materials comprised of crystalline colloidal patterns on substrates, and more particularly the present invention is related to a method of synthesizing crystalline photonic crystals on the surfaces of, or embedded within, substrates and optical utility thereof.

BACKGROUND OF THE INVENTION

Photonics is the science of molding the flow of light. A photonics revolution is currently taking place and it is anticipated that the use of photons to carry information will be as important as electrons are in microelectronics. To realize this fundamental change photonic materials need to be developed that enable for example the generation, guiding, detection, amplification, attenuation, modulation, switching, filtering, coupling, splitting, shifting, frequency doubling and tripling and storing processing operations of light [Made to Measure: New Materials for the 21st Century, P. Ball, Princeton U Press, 1997].

A new material (and devices derived therefrom) that is expected to prove useful in this regard is the photonic crystal (PC). The structure of a photonic crystal is based on for example a lattice filled with regular arrays of micron size air holes. When the refractive index contrast (RIC) between the voids and the material comprising the lattice is sufficiently large the photonic crystal has the property of diffracting light according to Bragg's law. This leads to the development of a photonic band gap (PBG) in the photon density of states (PDS) and the inability of light to propagate in the photonic crystal at wavelengths corresponding to the PBG.

Photonic band gap materials, as disclosed in S. John, Phys. Rev. Lett. 1987, 58, 2486, and E. Yablonovitch, Phys. Rev. Lett. 1987, 58, 2059, are a new class of dielectrics which carry the concept of molding the flow of light to its ultimate level, namely by facilitating the coherent localization of light, see S. John, Phys. Rev. Lett. 1984, 53, 2169, P. W. Anderson, Phil. Mag. 1985, B 52, 505, S. John, Physics Today 1991, 44, (5), 32, and D. Wiersma, D. Bartolini, A. Lagendijk and R. Righini, Nature 1997, 390, 671. The underlying theory of operation of a photonic bandgap material is founded upon the scattering and interference of light in a periodic dielectric at a wavelength close to the lattice spacing of the photonic crystal. The existence of a PBG causes selective filtering of certain wavelengths of light while other wavelengths are transmitted. This provides a mechanism for the control and inhibition of spontaneous emission of light from atoms and molecules forming the active region of the PBG materials, and offers a basis for low threshold micro-lasers and novel non-linear optical phenomena.

Therefore, it is the PBG that enables the photonic crystal to manage photons in ways like the electronic band gap allows semiconductors manipulate electrons. By engineering the lattice dimensions, refractive index contrast and structural defects of the PC it can be designed to function as either passive or active photonic devices in the near infrared around 1.5 microns. This is the wavelength range most suitable for applications in optical telecommunications. The PC devices are easily scalable to a broad spectrum of applications in the near-infrared, visible, and ultraviolet, including future local-area optical networks using visible or near-infrared light.

In order to obtain experimental evidence of PBG in photonic crystals much effort has recently been directed towards the synthesis and fabrication of materials with structures required to show the effects of a PBG. These effects include the localization of light and inhibition of spontaneous emission, however this research is still in its infancy. This is mainly because of the technical difficulty of producing well ordered three-dimensional structures having dielectric periodicity on the order of the wavelength of visible and near infrared light.

A significant obstacle to the realization of these photonic capabilities is the lack of a proven route for synthesis of high quality, very large-scale PBG materials and patterns thereof with significant electromagnetic gaps at micron and submicron wavelengths. The method of micro-fabrication must also allow the controlled incorporation of straight and bent line and point defects, for optical circuitry, during the synthetic process as well as the inclusion of appropriately configured optical waveguides and fibers for optical coupling of light into and out of the different photonic elements.

The current state of development of PCs is similar to the early days of semiconductor technology. There are interesting analogies between semiconductor chemistry and physics aimed at microelectronics and photonic materials chemistry and physics directed at microphotonics. The consensus is that progress with photonic crystals directed at photonics will rest on the ability to control and understand the influence of various types of intrinsic defects (e.g. vacancies, dislocations, and stacking faults) and disorder (e.g. size, shape and positional imperfections, polycrystallinity, cracks, inhomogeneities of refractive index, density, volume filling, and etching) in a photonic lattice on the PBG. Not surprisingly, technologies founded on photonic crystals are presently facing scientific challenges like those confronted with semiconductors in the 1940's and 1950's. The real potential of photonic crystals will be realized by minimizing the effects of intrinsic defects and randomness in the photonic lattice and by learning how to incorporate specific structural defects in the photonic lattice to achieve a particular function. Structural defects in photonic crystals like points, lines and bends, facilitate photon confinement and enable the development of low threshold micro-lasers and highly compact circuits of light for producing and guiding light between photonic crystals devices, such as optical switches, variable attenuators, wavelength dispersion compensators and wavelength division multiplexers and demultiplexers. These developments could lead to a photonics technology based on highly compact optical circuits in which integrated photonic crystal devices are coupled to optical waveguides and fibers in all-optical computer and telecommunication systems.

Presently at least six main methods are providing the first examples of photonic lattices in the form of crystals and films for optical studies. These methods comprise micromachining, holographic photolithography, electrochemistry, field ion beam, glancing angle deposition and colloidal crystal self-assembly. Each approach has strengths and weaknesses, which are in the process of being defined and evaluated. It is not clear whether one or a combination of these methods of physically and chemically shaping materials into PC will dominate in this emerging field. For example, 3-D Lincoln Log (Wood-Pile) PC architectures, with structural defects have been micro-machined from high refractive index semiconductors like, silicon, gallium arsenide and indium phosphide. These structures have an omnidirectional PBG at near infrared wavelengths. Spiral PC structures made from silica have been made by deposition of appropriate gas phase precursors at a specified angle onto a lithographically patterned rotating substrate. Also, 2-D periodic arrays of air cylinders with structural defects have been made by electron beam lithography as well as photolithography and etching methods. Another method involves making a 2-D or 3-D array of vertically aligned air cylinders with straight or periodically modulated walls with structural defects by lithographic and photo-assisted electrochemical or current modulated electrochemical patterning in silicon wafers. Field ion beam methods have also been utilized to drill microchannels at specified angles into a 2-D periodic array of vertically aligned air cylinders with structural defects made by electron beam lithography or electrochemical patterning. These structures display a pseudo-PBG in the near infrared spectral region. Holey glass fibres are flexible 2-D photonic crystals that guide light over long distances. Here, hand assembled glass rods are heated and pulled into fine strands of flexible glass fibers. 1-D photonic crystals are also of interest. Fiber Bragg gratings are commercially important and may be considered a 1-D photonic crystal. The gratings are formed by laser-imprinting of small periodic refractive index changes into the guiding core of glass fibers and serve to reflect a narrow spectrum of guided light. Multi-layered dielectric mirrors also behave as a 1-D photonic crystals and are based on moderate to large contrasts in refractive index between alternating thin films of optical materials.

Physical methods of shaping bulk semiconductors into photonic crystals involve complex, time consuming and expensive multi-step processing. By contrast, self-assembly of micrometer scale silica spheres into face centered cubic (fcc) colloidal crystals provides a simple, fast, reproducible and cheap materials chemistry approach to producing photonic crystals. To self-assemble a PC with an omnidirectional PBG, a fcc silica colloidal crystal may be used as a template to replicate the interstitial void space in the form of a high refractive index material like silicon. Extraction of the template leaves behind an inverted fcc colloidal crystal made of silicon. The silicon PC is impenetrable to near infrared light around 1.5 microns, the wavelength of choice for optical fiber communications.

While bulk photonic crystals will be useful in producing optical circuit components, the most promising photonic circuit elements will be composites comprising a photonic crystal integrated with a substrate such as an insulator semiconductor and coupled to optical waveguides or fibers. Therefore it would be very advantageous to find relatively simple, rapid, reproducible and inexpensive methods of producing photonic crystal films and patterns having controlled thickness, area, lattice structure and orientation either on the surface and/or embedded within insulating or semiconducting wafers to be used directly and/or as templates for the manufacture of integrated photonic crystal devices on or within a photonic chip. If these photonic crystals on or embedded within the substrates could be coupled with light sources, for example by being combined with optical waveguides or fibers for coupling light into and out of the on wafer photonic crystals, then such combinations would provide the basis for highly compact photonic circuit devices. Producing photonic devices from silicon-based photonic crystals would be a very significant commercial advantage since methods of fabricating such materials could be readily retrofitted into existing silicon chip fabrication facilities.

A convenient method of synthesizing such composites involves colloidal crystal self-assembly. A number of methods have been described in the literature for patterning microspheres made of silica and latex on the surface of various substrates. One method called colloidal epitaxy (A. van Blaaderen, R. Ruel and P. Wiltzius, Nature 1997, 385, 32) utilizes a photolithographically patterned array of micron scale holes in a polymer resist deposited on a planar substrate as a template to capture and organize micro-spheres into predetermined patterns. In this approach, micro-spheres dispersed in a solvent are allowed to sediment onto the pre-patterned substrate and organize in the holes to create a colloidal crystal film that replicates the pattern of the polymer resist. The method is time consuming and the patterned colloidal crystal film grows on top of the substrate. Order of micro-spheres in the colloidal crystal film appears to be maintained only close to the patterned substrate. There is no control over layer thickness by this technique. Moreover sophisticated and expensive photolithography techniques are required to pre-pattern a periodic array of micron scale holes in the substrate to perform colloidal epitaxy.

Another method uses an elastomeric mold containing micron scale channels placed on a planar substrate into which a solution of micro-spheres is drawn by capillary flow (E. Kim, Y. Xia and G. M. Whitesides, Adv. Mater. 1996, 8, 245). Crystallization of micro-spheres occurs within the channels of the micro-mold to create a patterned colloidal crystal film that replicates that of the micro-mold. The patterned colloidal crystal film grows on top of the substrate and the physical dimensions and degree of order of the patterns are limited by mechanical deformation of the materials comprising the channel walls of the micro-mold and the adherence of micro-spheres to the micro-mold.

Patterned self-assembled monolayers of alkanethiolates on gold substrates (J. Aizenberg, P. V. Braun and P. Wiltzius, Phys. Rev. Lett. 2000, 84, 2997) and polyelectrolytes on gold supported patterned self-assembled monolayers (K. M. Chen, X. Jiang, L. C. Kimerling and P. T. Hammond, Langmuir 2000, 16, 7825) have been used to generate colloidal crystal arrays. By placing functional groups at the end of the alkanethiolate or on the polymer electrolyte that bear positive and/or negative charges it is possible to organize oppositely charged micro-spheres into patterns that replicate those of the alkanethiolate or polyelectrolyte. The micro-spheres however are not ordered into a colloidal crystal by these techniques and there is no control over layer thickness or how one layer is organized with respect to another. In another approach, micro-spheres have been electroosmotically pumped into a micro-fluidic system of channels fabricated on a glass substrate (R. D. Oleschuk, L. L. Shultz-Lockyear, Y.

Ning and D. J. Harrison, Anal. Chem. 2000, 72, 585). This creates an on-chip solid phase for capillary electrochromatography applications. There is no evidence that the microspheres are ordered into a patterned colloidal crystal using this approach.

In another strategy a two-dimensional lattice of microspheres have been arranged on a planar substrate into a regular pattern one-sphere-at-a-time by micromanipulation in a scanning electron microscope (H. T. Miyazaki, H. Miyazaki, K. Ohtaka, and T. Sato, J. Appl. Phys. 2000, 87, 7152). This method of robotic assembly can sort micro-spheres by size and selectively place them into pre-determined 2-D patterns, however the method is serial in nature, time consuming, expensive and limited so far to a single layer and a single shape of limited size on top of the substrate.

Thus, while there are current existing methods directed to teaching how to pattern micro-spheres and colloidal crystals on substrates, each of these methods has limitations, which are considered to render them unsuitable for the large scale manufacture of photonic-based devices and optically integrated photonic crystal circuits and chips.

Therefore it would be very advantageous to provide methods to produce a patterned and well-ordered colloidal crystal film with controlled thickness, lattice structure, area, orientation and registry, and upon or embedded within wafers of different types, and use such colloidal crystals for templating replica patterns of inverse colloidal crystals, making structural defects of different type in photonic crystals, and positioning and integrating photonic crystal devices with optical waveguides and fibers upon or within wafers. Moreover, the method should be simple, fast, reproducible and inexpensive to implement, easily integrated into existing chip fabrication facilities and readily adaptable for manufacturing photonic chips that couple to optical waveguides and fiber systems. This is not true of any of the methods described in the prior art.

SUMMARY OF THE INVENTION

It is an object of the present invention to provide methods for synthesizing patterned colloidal crystals on the surfaces of, or embedded in, substrates. It is also an object of the present invention to demonstrate the optical quality of said patterned colloidal crystals and their applicability in photonics.

To amplify, reduction to practice of optically integrated micro-photonic crystal chips is expected to profoundly shrink the physical dimension of contemporary optical circuits by several orders of magnitude and start a revolution in optical circuit miniaturization like that experienced half a century ago by the integrated silicon microelectronic chip. In the invention described herein we have for the first time been able to practically harness this capability by planarizing and patterning 3-D opal-based micro-photonic crystals and demonstrating that they behave as ideal 3-D diffractive optical elements and devices. The processing steps utilized to achieve this goal involve, but are not limited to, a straightforward combination of the well-documented methods of micro-molding and micro-contact printing with standard wet and dry etching techniques, to pattern a planar substrate with micro-wells and micro-channels with geometrically well-defined shapes and sizes, followed by self-assembly, to crystallize a suspension of micro-spheres into well ordered colloidal crystals located exclusively inside the micro-wells and micro-channels. In this way it has proven possible to grow planarized single crystal colloidal crystal diffractive optical devices that precisely replicate the architecture of the micro-wells and micro-channels in or on the substrate. The entire process for making these kinds of 3-D micro-photonic crystal chips is straightforward, time effective, reproducible and low cost. Every step in the process is easily adapted to methods commonly used in current photonic component and electronics chip micro-fabrication facilities. Single crystal colloidal crystal diffractive optical structures of the kind described in this invention promise to be easily modified with point, line and bend defects to localize and guide light, host a variety of guest materials to attain function and integrated with optical waveguides and optical fibers for the future manufacture of highly compact optical circuits. The development reported herein has led to a prototype planarized micro-photonic crystal chip device. This is considered to represent an enabling step towards the attainment of planarized highly compact functional micro-optical circuits. Packaged colloidal crystal photonic crystal structures offer in theory, powerful capabilities for managing light in planarized miniaturized optical circuits.

In one aspect of the present invention there is provided a method of synthesizing composite material of a colloidal crystal and a substrate, comprising:

a) providing a substrate having a surface with a surface relief pattern; and b) applying a liquid dispersion containing colloidal particles onto said surface and spinning said substrate whereby colloidal particles are swept across said surface and self-assemble in void spaces on said surface defined by said surface relief pattern.

BRIEF DESCRIPTION OF THE DRAWINGS

The methods of synthesis of colloidal crystals on patterned substrates according to the present invention will now be described, by way of example only, reference being made to the accompanying drawings, in which.

step (ii) next the master is placed in conformal contact with a 50 nm Au/5 nm Ti/Si (100) substrate for 5-10 s;

step (iii) the bare gold is etched away by a mixture of 0.001 M $K_4Fe(CN)_6$, 0.01 M $K_3Fe(CN)_6$, 0.1 M $K_2S_2O_3$, 1M KOH for 17 minutes;

step (iv) anisotropic etching of Si (100) by 3M KOH in water/isopropanol mixture at 70° C. for 10 minutes;

step (iv) involves placing a flat PDMS block on top of the etched pattern of V-shaped grooves in Si (100); and step (v) then infiltration and evaporation of an aqueous dispersion of silica micro-spheres, causes nucleation and vectorial growth of silica colloidal crystals, having controlled thickness and (100) orientation, inside the V-shaped grooves.

FIG. 1(a) shows a scanning electron microscope (SEM) image illustrating a lateral view of soft-lithographically generated V-shaped grooves inside a Si (100) wafer.

FIG. 1(b) shows a SEM image illustrating a top view of a six-layer stack of a well-ordered silica colloidal crystal grown by capillary infiltration of an aqueous dispersion of silica micro-spheres inside V-shaped grooves of Si (100). The figure shows vectorial growth of the silica colloidal crystal to selectively expose the (100) surface.

FIG. 1(c) shows an SEM image illustrating a top view of a seven-layer stack of well-ordered silica micro-spheres inside V-shaped grooves of Si (100) depicting selective growth of the silica colloidal crystal along the (100) direction.

FIG. 1(d) shows an SEM image illustrating a lateral view of well-ordered silica colloidal crystals showing vectorial (100) growth within a collection of parallel V-shaped grooves in Si (100).

FIG. 1(e) shows an SEM image illustrating a lateral view of V-shaped hexagonal groove network within the surface of a Si (100) wafer made by soft-lithography from a hexagonal TEM grid master.

FIG. 1(f) shows an SEM image illustrating a lateral view of a typical hexagonal grid patterned silica colloidal crystal grown inside V-shaped hexagonal groove network within the surface of a Si (100) wafer following infiltration of an aqueous dispersion of silica micro-spheres.

Figure 2:
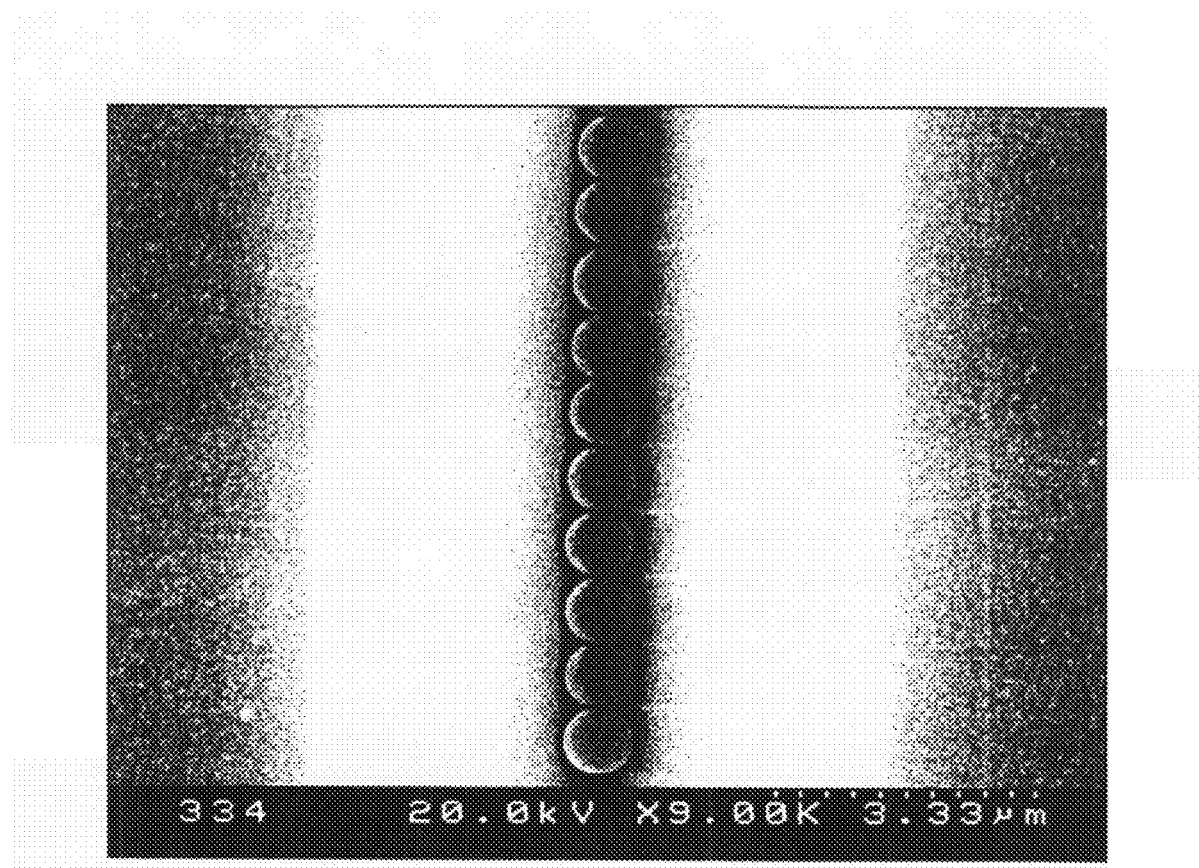

FIG. 2 is an SEM image depicting the formation of a 1-D chain of silica micro-spheres grown in the apex region of a V-shaped groove that had been anisotropically etched within the surface of a single crystal (100) silicon wafer.

Figure 2B:
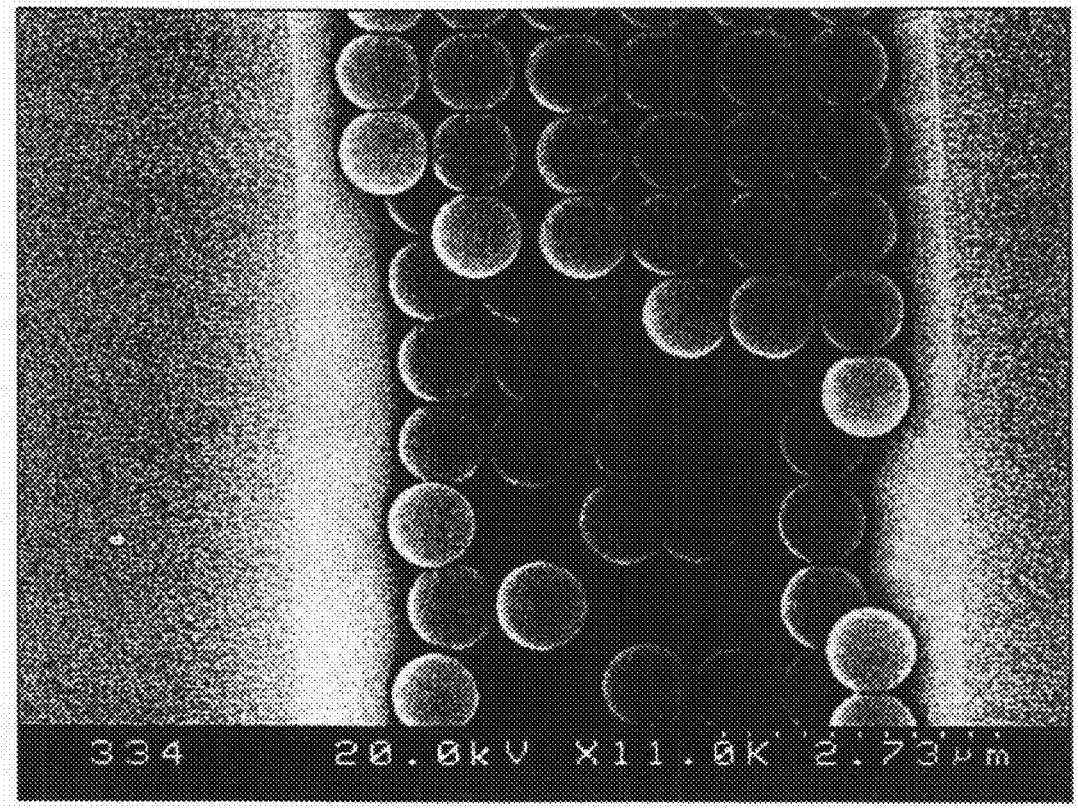

FIG. 2b is an SEM image depicting the vectorial growth of (100) oriented silica colloidal crystal with a V-shaped channel in a silicon wafer.

Figure 3A:
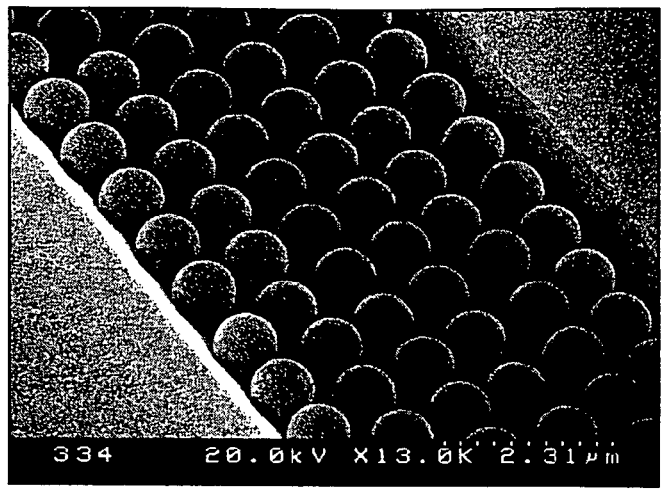

FIG. 3a is an SEM image showing a six layer (100) single crystal silica colloidal crystal in a V-shaped channel of Si (100) wafer and devoid of vacancy defects.

Figure 3B:
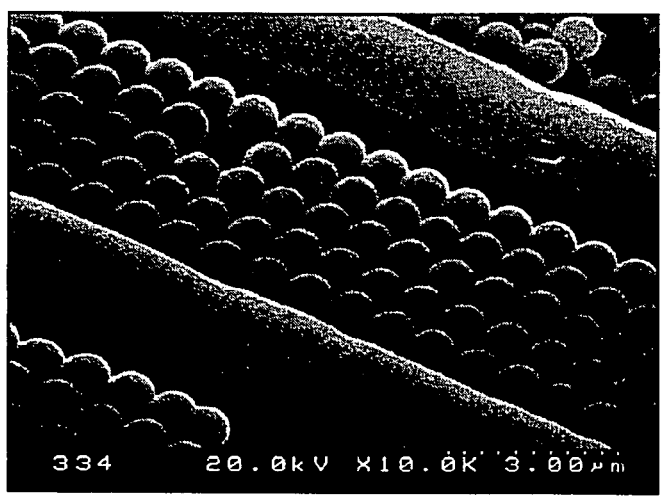

FIG. 3b is an SEM image showing a five layer (100) single crystal silica colloidal crystal in a V-shaped channel of Si (100) wafer showing single vacancy defects in the top layer of the micro-spheres.

Figure 3C:
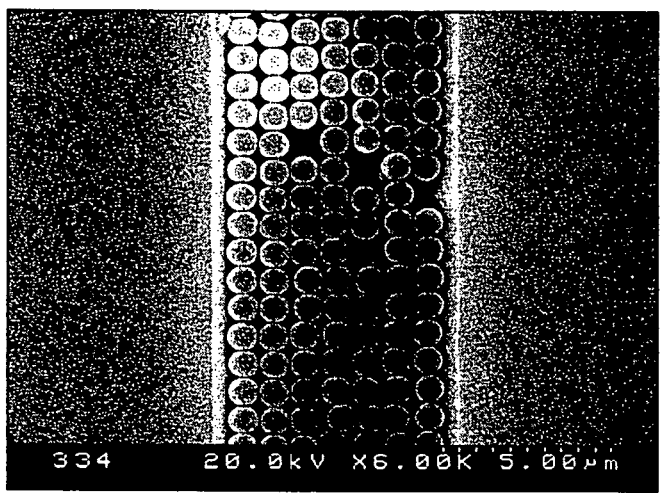

FIG. 3c is an SEM image showing a seven-layer (100) single crystal silica colloidal crystal in a V-shaped channel of Si (100) wafer showing three vacancy defects in the top layer of the micro-spheres.

Figure 1:
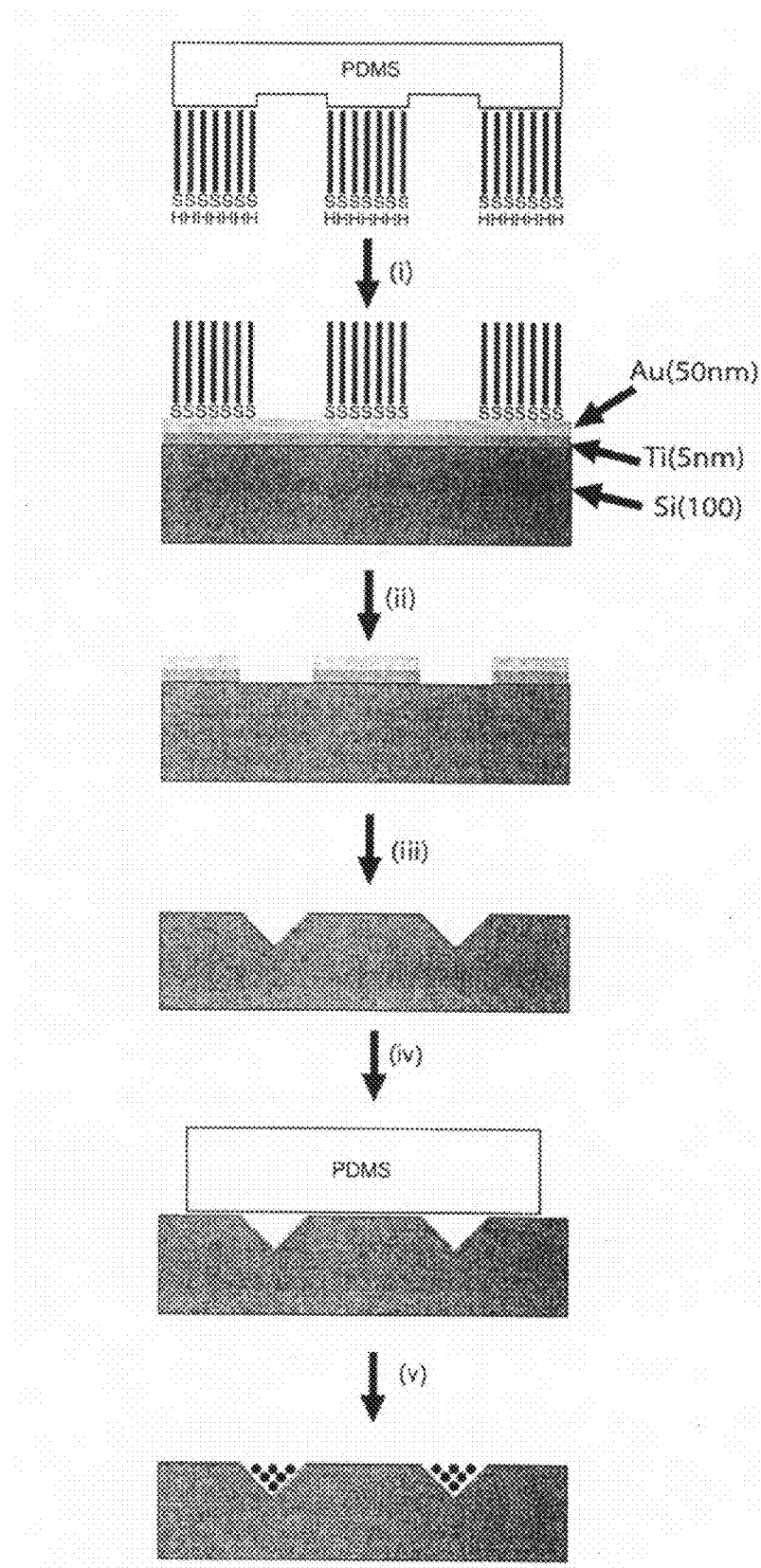
FIG. 1 shows diagrammatic representation illustrating an exemplary, non-limiting synthetic strategy illustrating vectorial control of thickness, area, lattice structure, orientation and registry of silica colloidal crystals in silicon wafers for lab-on-chip and photonic chip technologies, the procedure for making the Si (100) substrate patterned with V-shaped grooves comprises several steps including step (i) an ethanolic hexadecanethiol solution (2 mM) is inked on the PDMS master.
Figure 4:
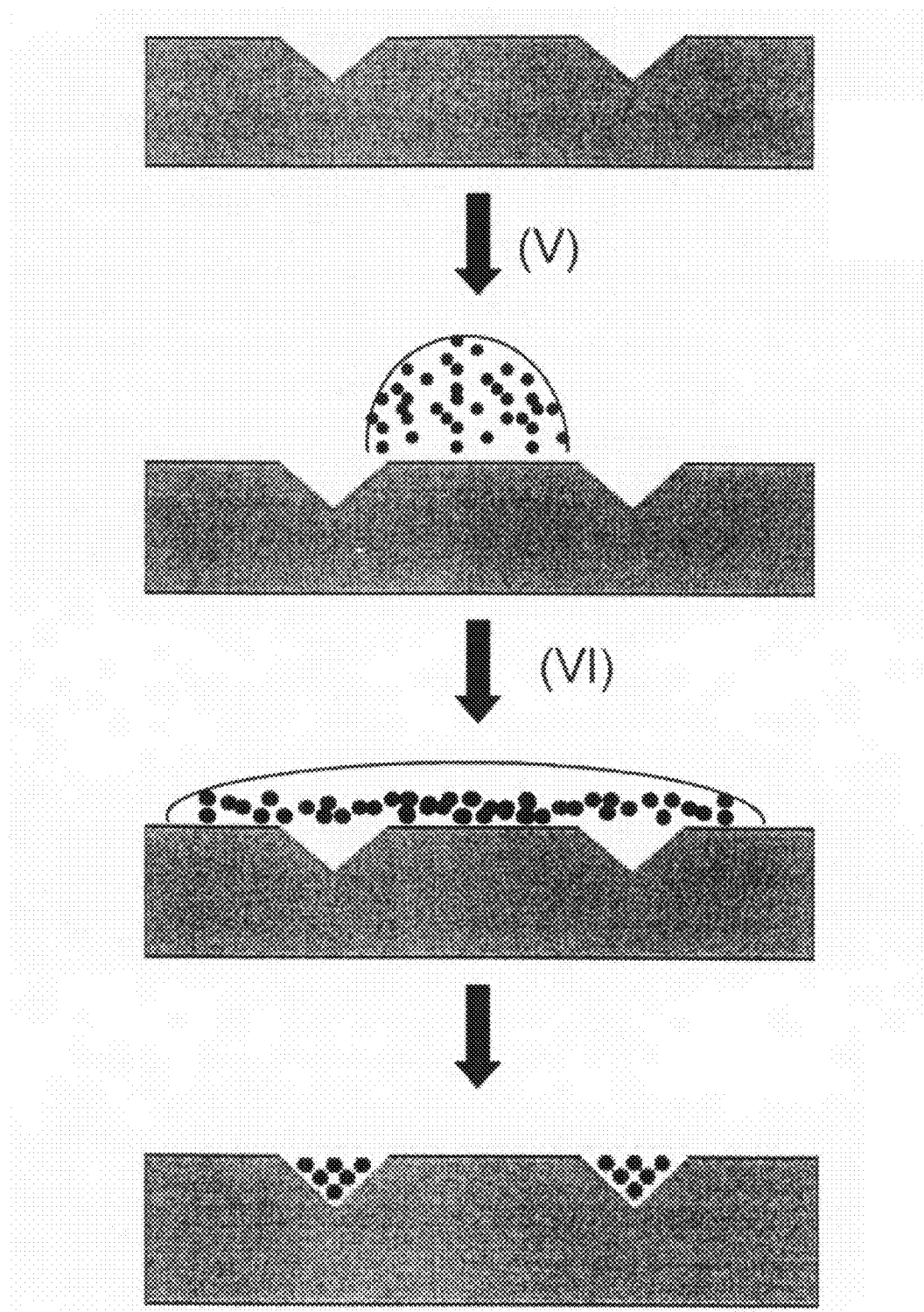

FIG. 4 illustrates the steps (v) and (vi) {note that steps (i-iv) are identical to those in FIG. 1} of an exemplary, non-limiting synthetic strategy illustrating vectorial control of thickness, area, lattice structure, orientation and registry of silica colloidal crystals in a surface relief pattern on a substrate.

Figure 4A:
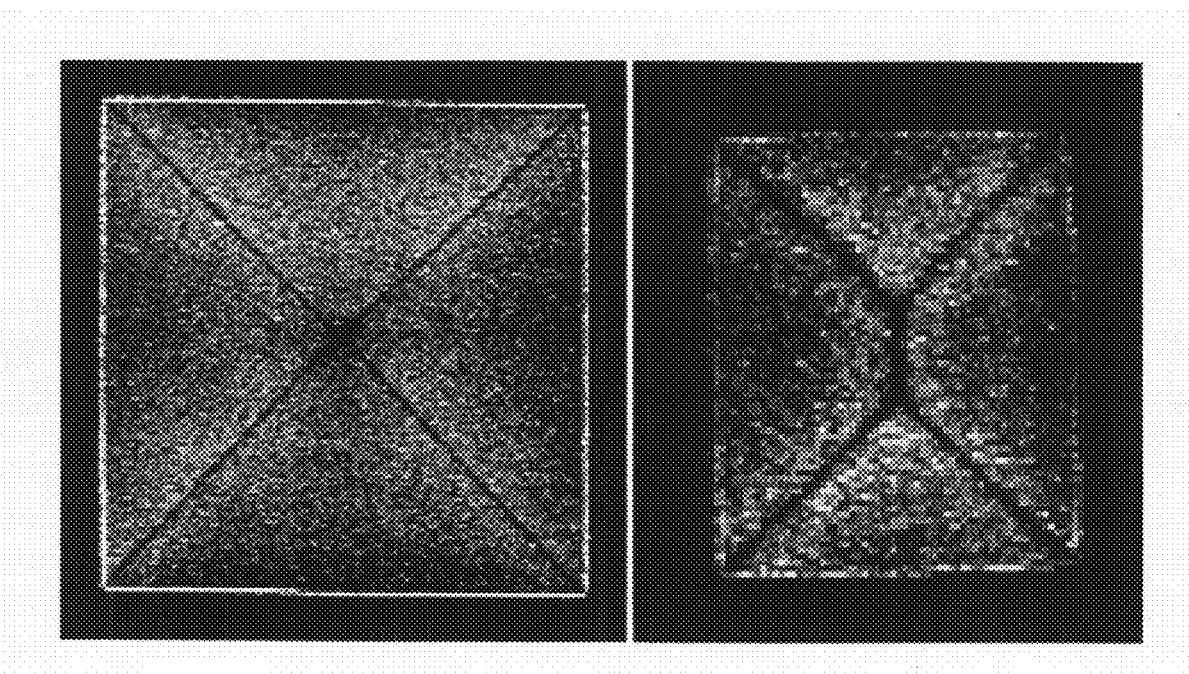

FIG. 4a shows a scanning electron microscope (SEM) image illustrating a lateral view of soft lithographically generated square pyramidal and rectangular pyramidal shaped pits inside a Si (100) wafer.

Figure 4B:
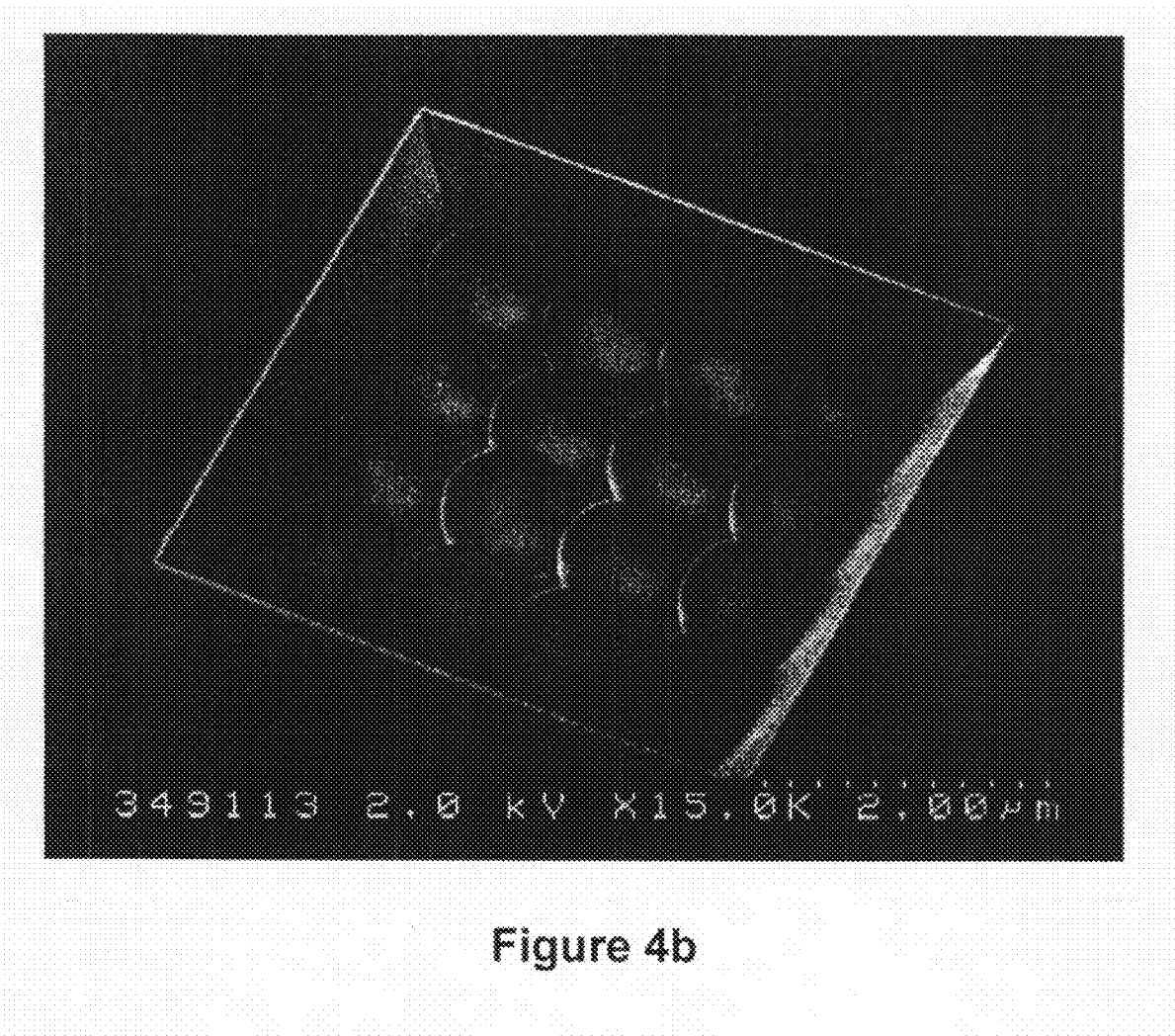

FIG. 4b shows SEM images illustrating a top view of a four-layer stack of a well-ordered single crystal silica colloidal crystal grown by spin-coating generated centrifugal forces, gravity driven sedimentation, oscillatory shear and evaporation induced self-assembly of an aqueous dispersion of silica micro-spheres inside a square pyramidal shaped pit within a Si (100) wafer. The figure shows vectorial growth of the silica colloidal crystal to selectively expose the (100) surface.

Figure 4C:
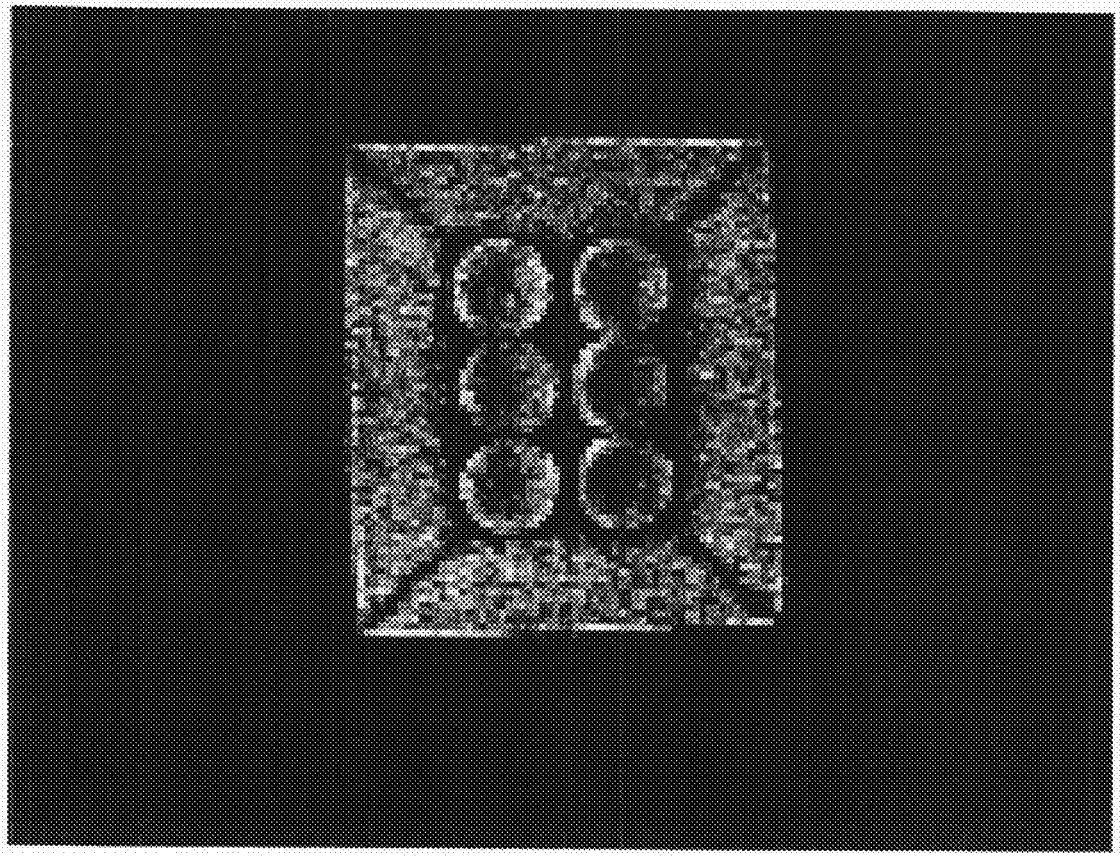

FIG. 4c shows SEM images illustrating a top view of a three-layer stack of a well-ordered single crystal silica colloidal crystal grown by spin-coating generated centrifugal forces, gravity driven sedimentation, oscillatory shear and evaporation induced self-assembly of an aqueous dispersion of silica micro-spheres inside a rectangular pyramidal shaped pit within a Si (100) wafer. The figure shows vectorial growth of the silica colloidal crystal to selectively expose the (100) surface.

Figure 5A:
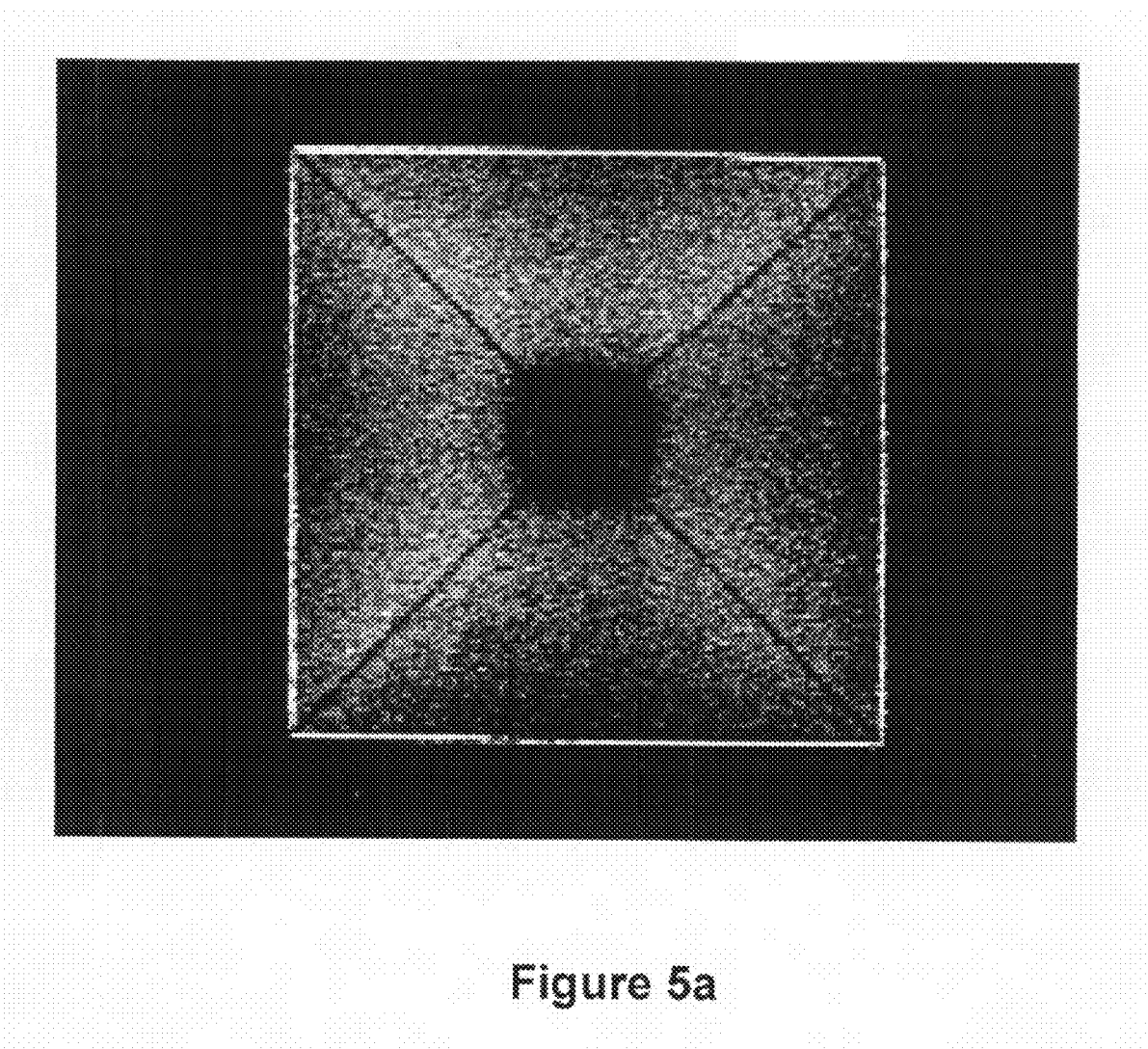

FIG. 5a is an SEM image depicting the formation of a single silica micro-sphere grown in the apex region of a square pyramid-shaped pit that had been anisotropically etched within the surface of a single crystal (100) silicon wafer.

Figure 5B:
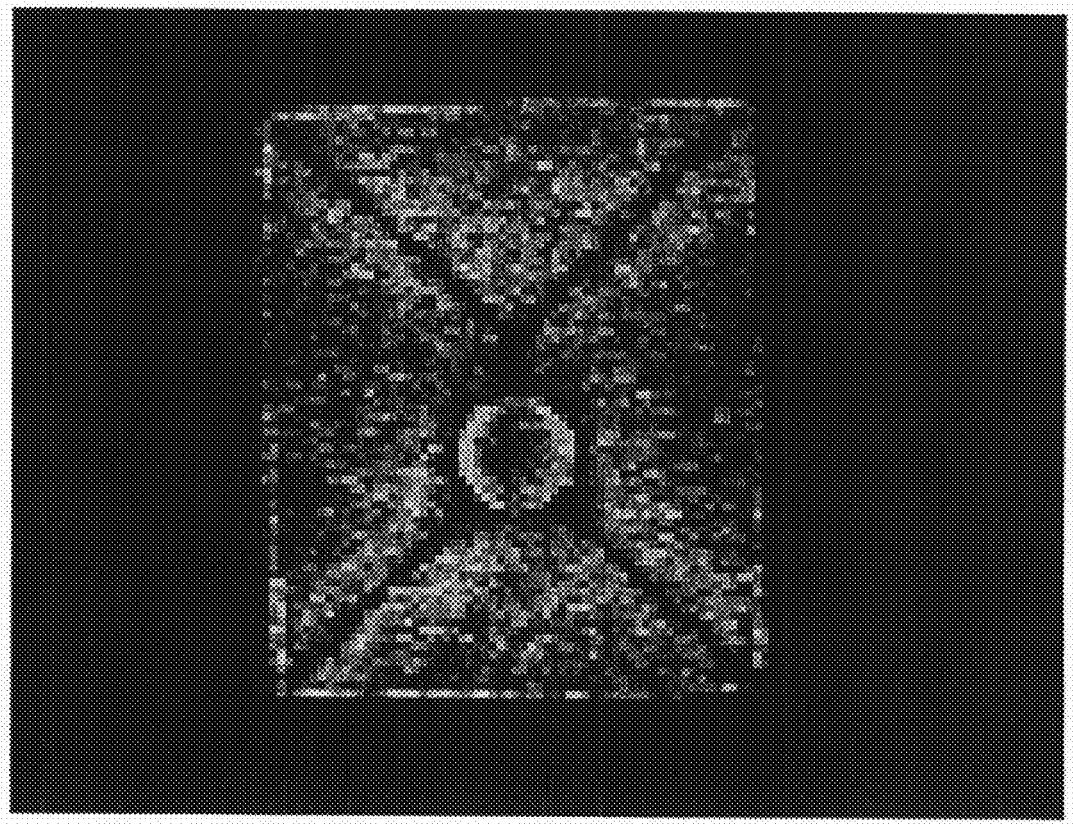

FIG. 5b is an SEM image depicting the formation of a single silica micro-sphere grown in the apex region of a rectangular pyramid-shaped pit that had been anisotropically etched within the surface of a single crystal (100) silicon wafer.

Figure 5C:
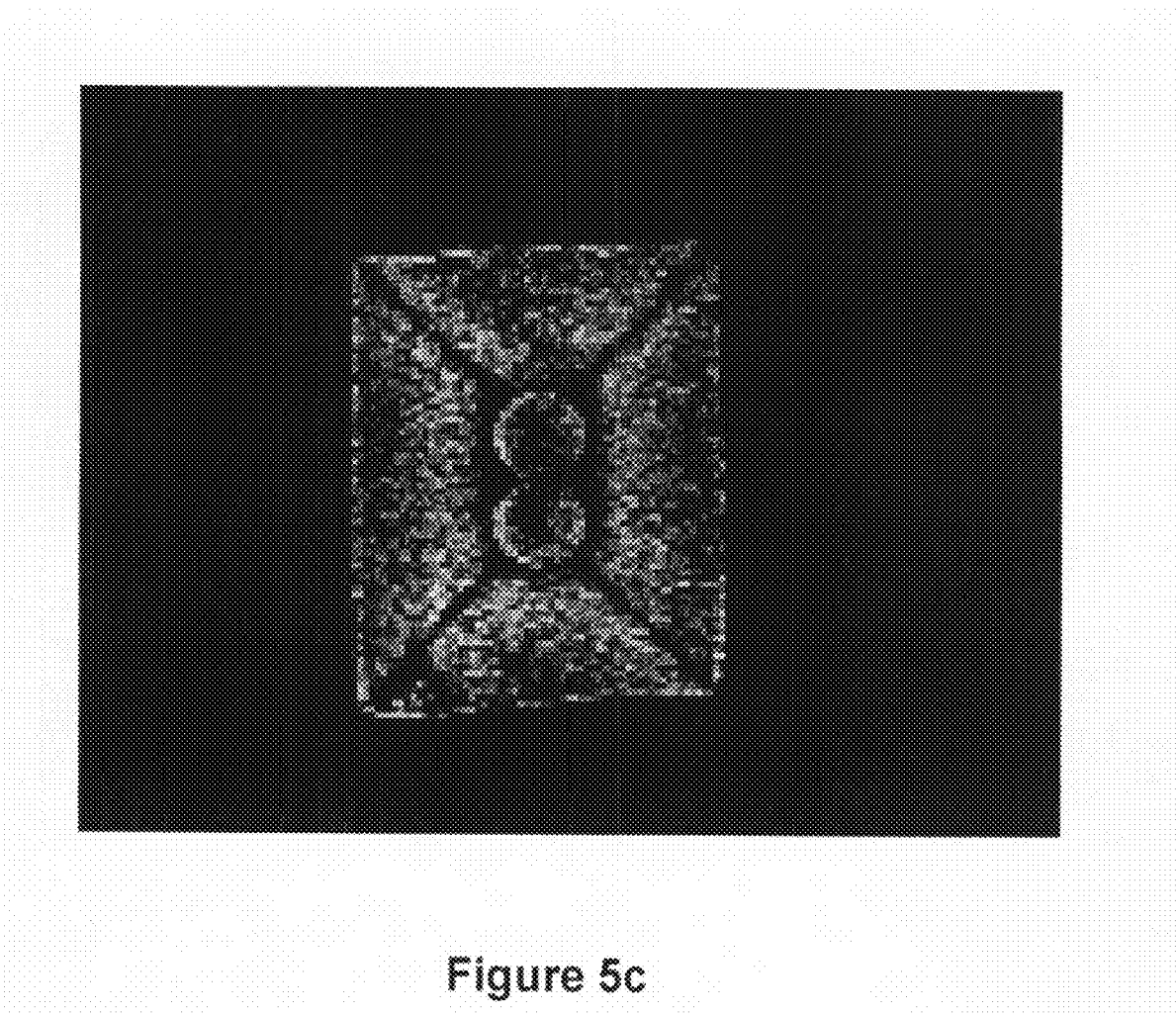

FIG. 5c is an SEM image depicting the formation of two silica micro-sphere grown in the apex region of a rectangular pyramid-shaped pit that had been anisotropically etched within the surface of a single crystal (100) silicon wafer.

Figure 6A:
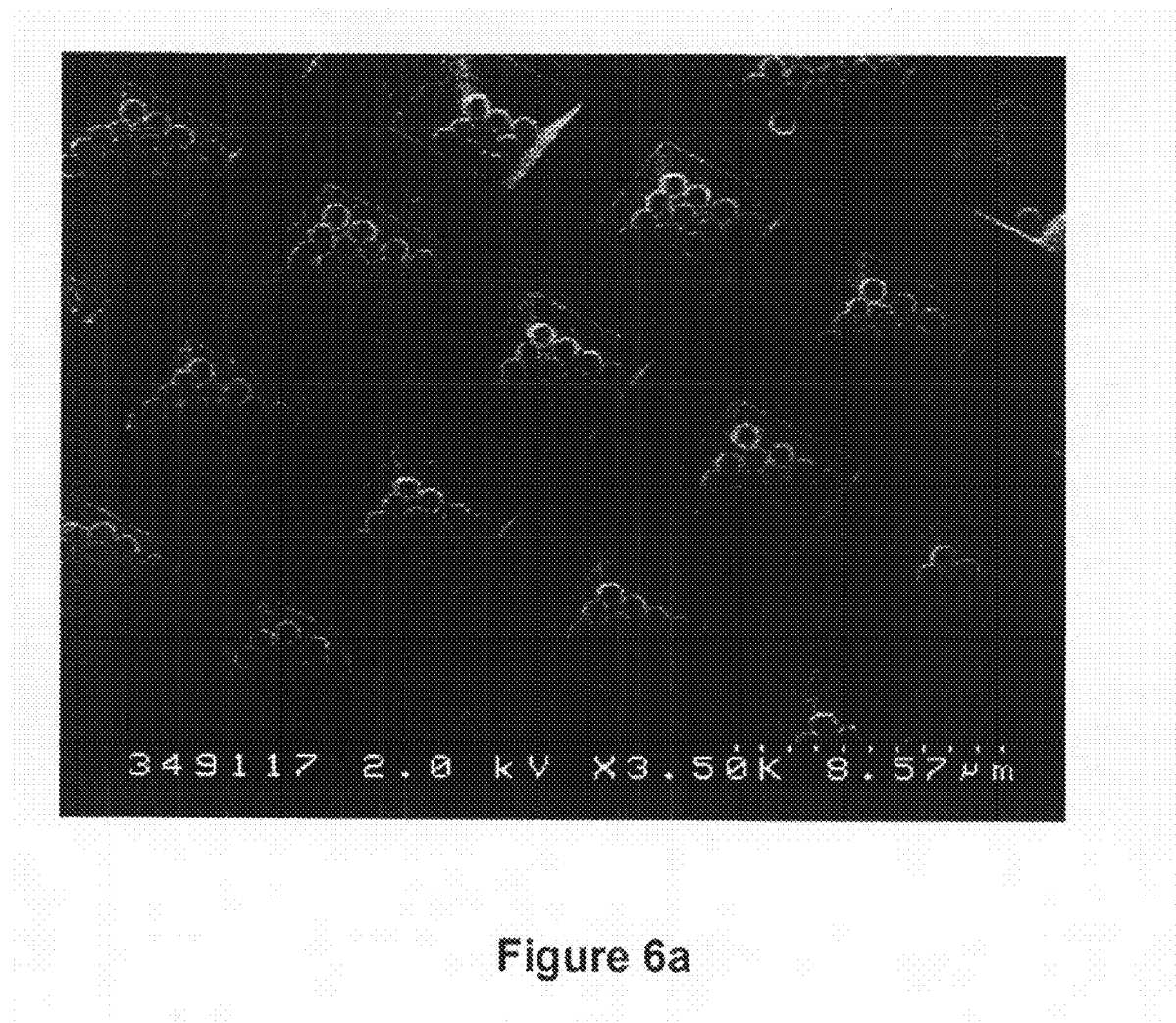

FIG. 6a is an SEM image showing (100) single crystal silica colloidal crystals growing inside a square grid array of square pyramid-shaped pits of Si (100) wafer.

Figure 6B:
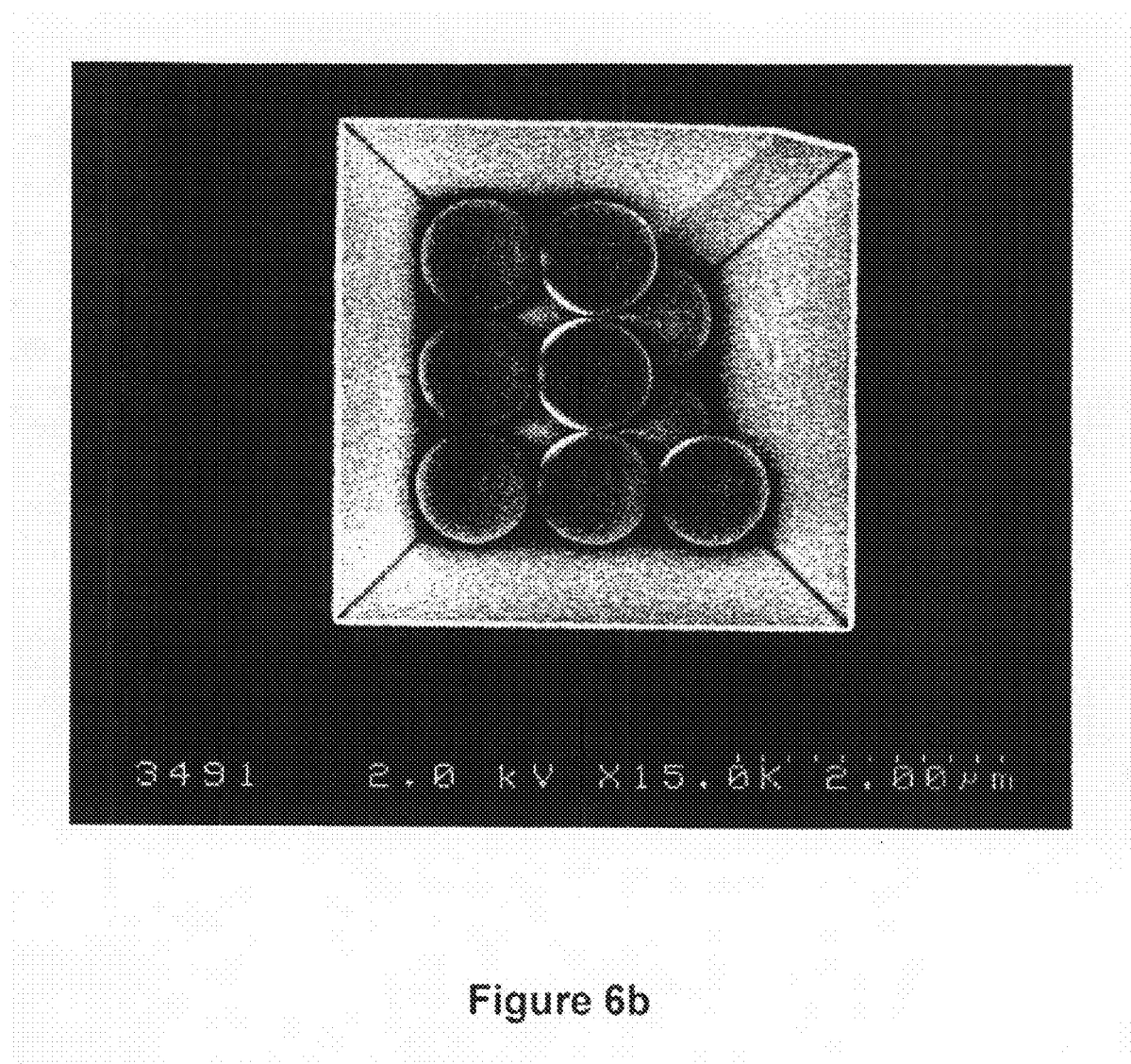

FIG. 6b is an SEM image showing a three-layer (100) single crystal silica colloidal crystal in a square pyramid-shaped pit of Si (100) wafer showing two vacancy defects in the top layer of the micro-spheres.

Figure 6C:
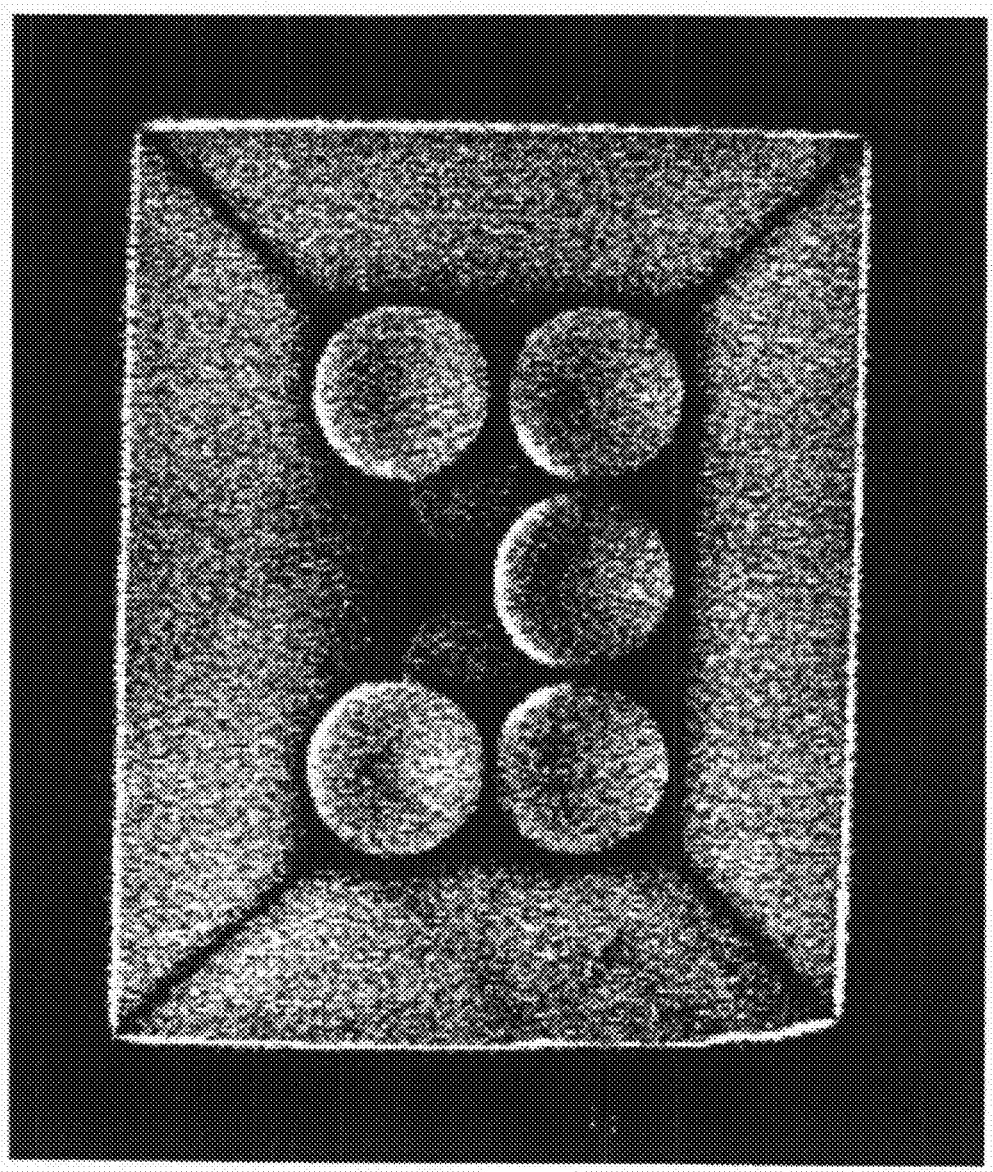

FIG. 6c is an SEM image showing a three-layer (100) single crystal silica colloidal crystal in a rectangular pyramid-shaped pit of Si (100) wafer showing one vacancy defect in the top layer of the micro-spheres.

Figure 7:
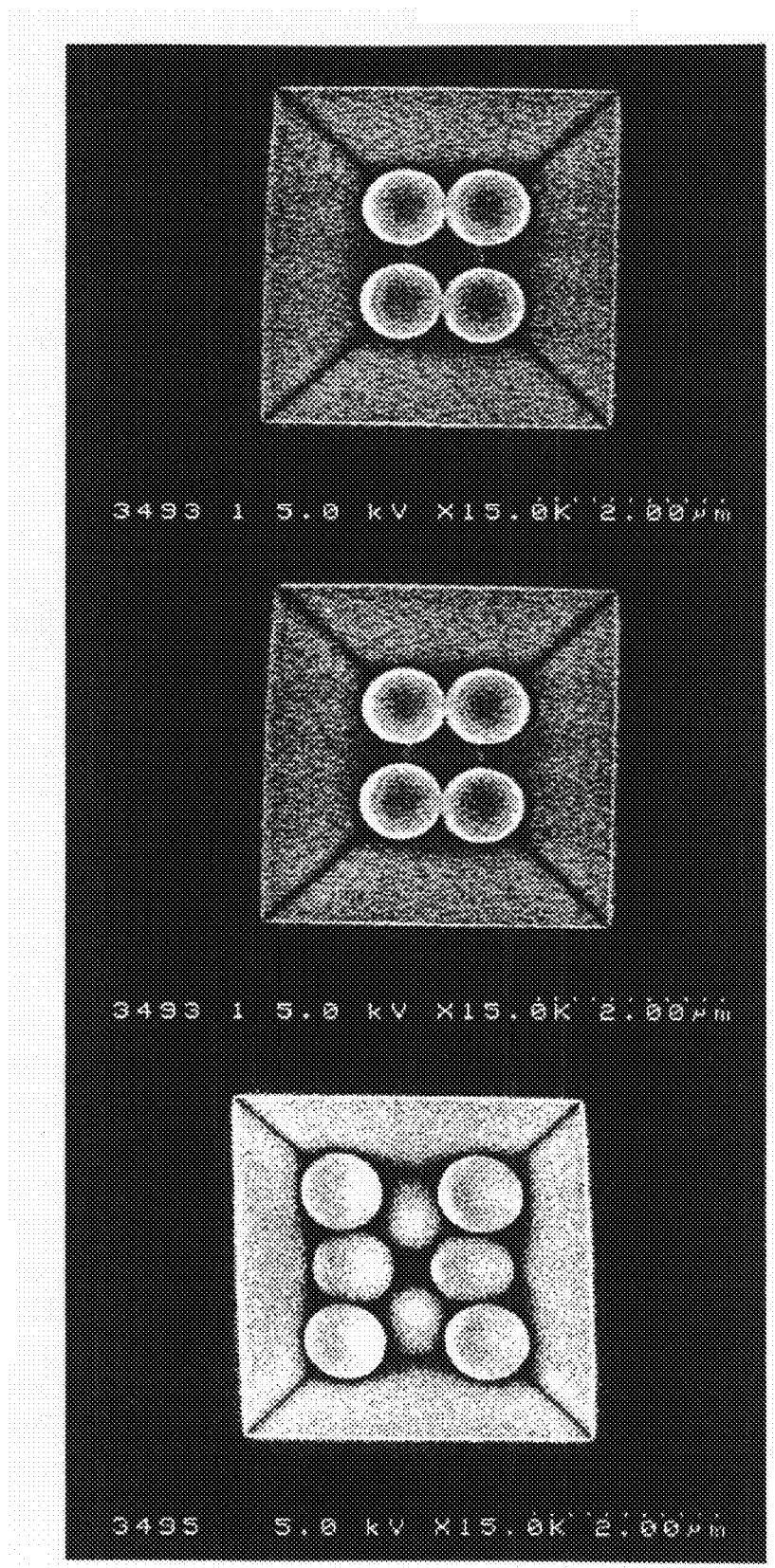

FIG. 7 shows three SEM images illustrating commensurate and incommensurate growth of single crystal silica colloidal crystals in a rectangular pyramidal-shaped pit of Si (100) wafer, depicting the ability to grow novel colloidal crystal lattice structures other than the usual face centered cubic.

Figure 8:
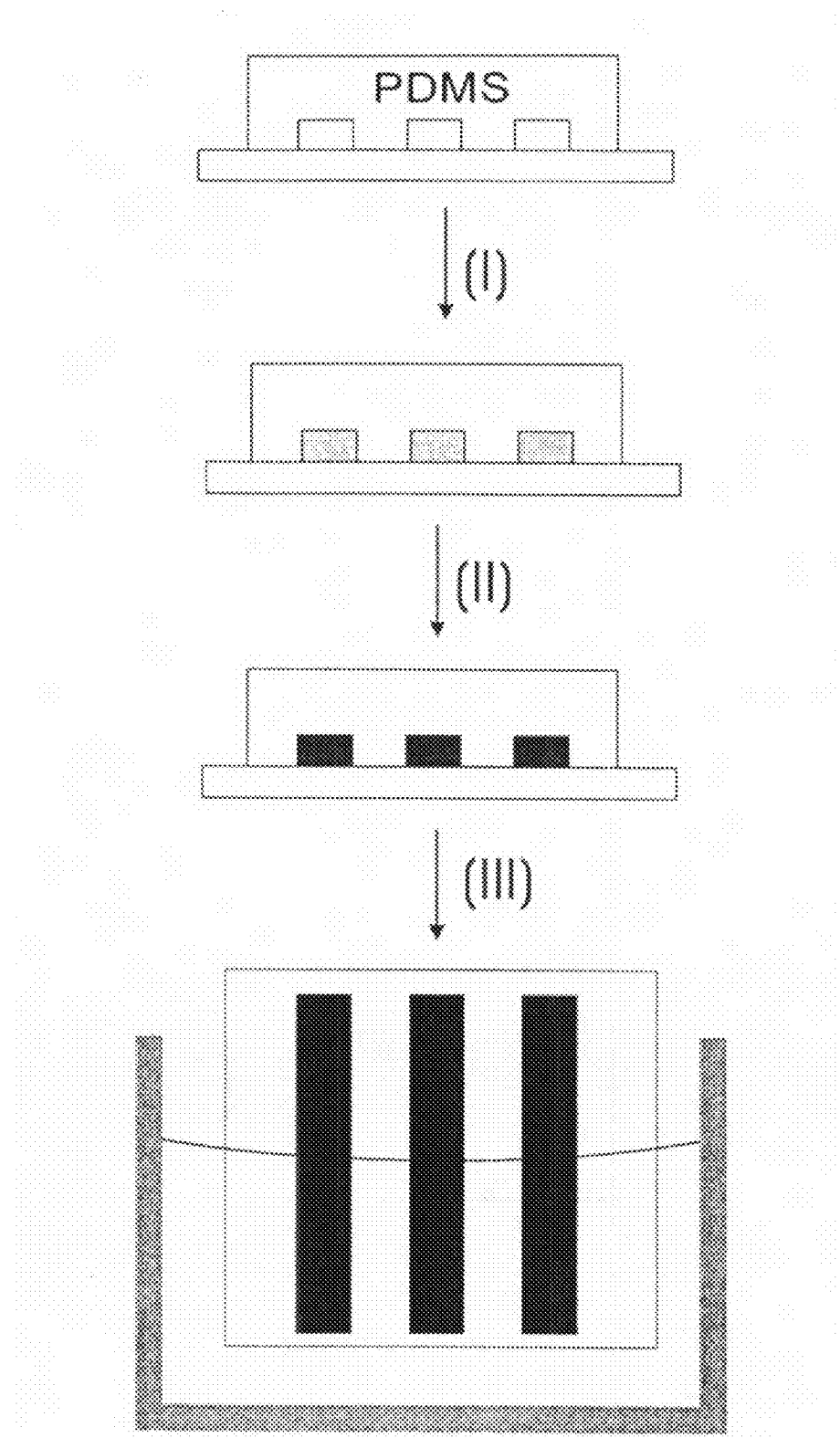

FIG. 8 is a diagrammatic representation of a scheme for producing a surface relief pattern in the surface of a substrate.

Figure 9A:
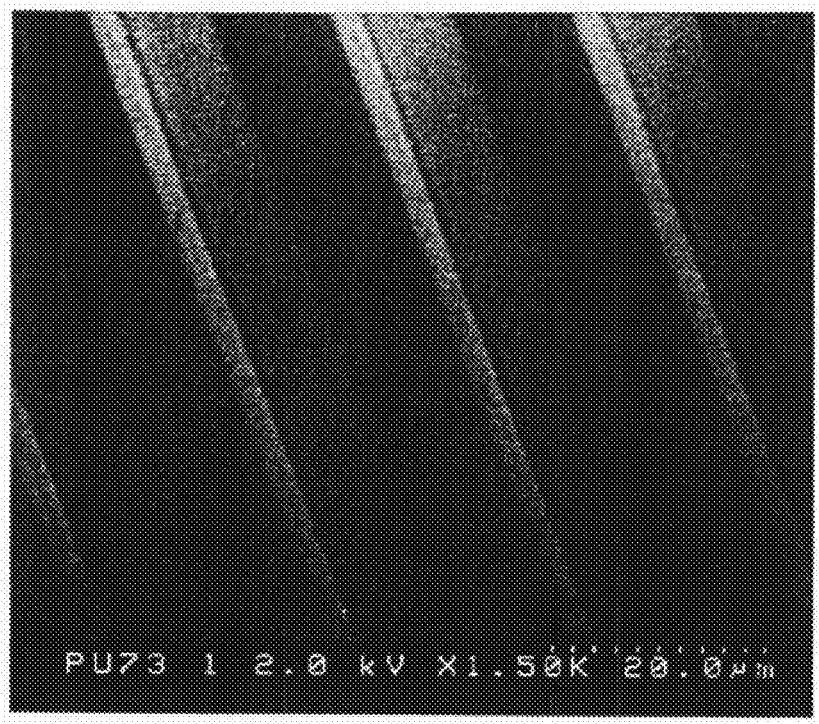
Figure 9A:
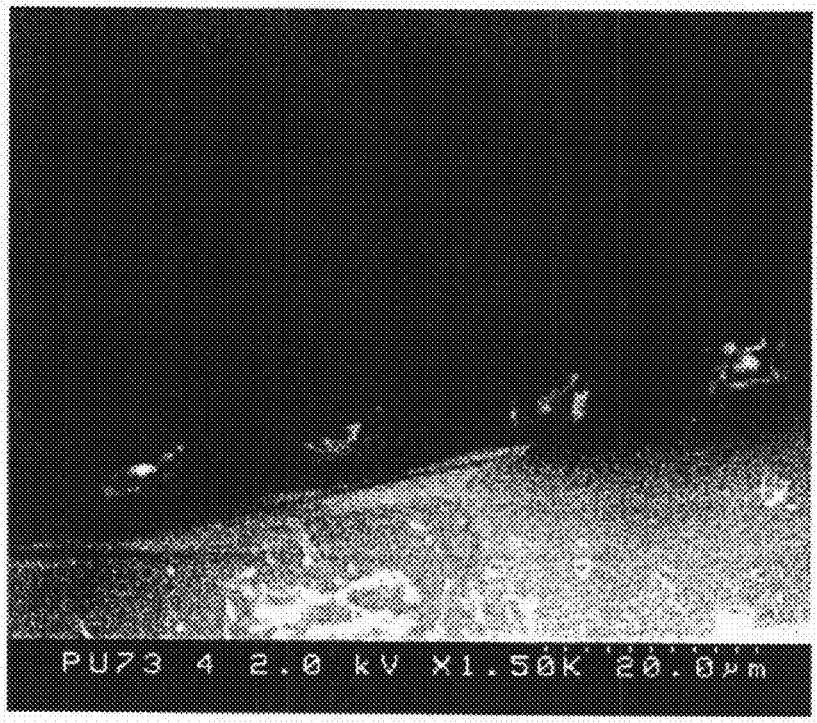

FIG. 9a shows a substrate with vertical polyurethane walls that have been made by the scheme of FIG. 8.

Figure 9B:

FIG. 9b shows representative scanning electron microscope images of a parallel array of micron scale rectangularly-shaped micro-channels in Si(100) wafer by anisotropic wet etching with a line mask 45° with respect to the (110) direction.

Figure 9C:
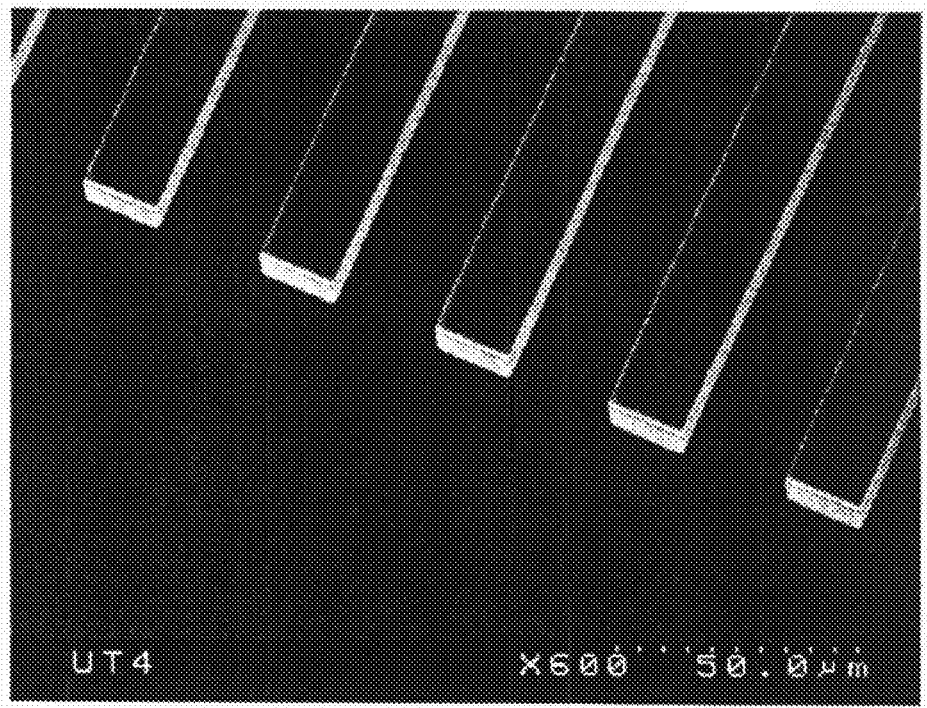

FIG. 9c shows representative scanning electron microscope images of a parallel array of micron scale rectangularly-shaped micro-channels inside Si(100) wafer by deep RIE through the Bosch process.

Figure 9D:
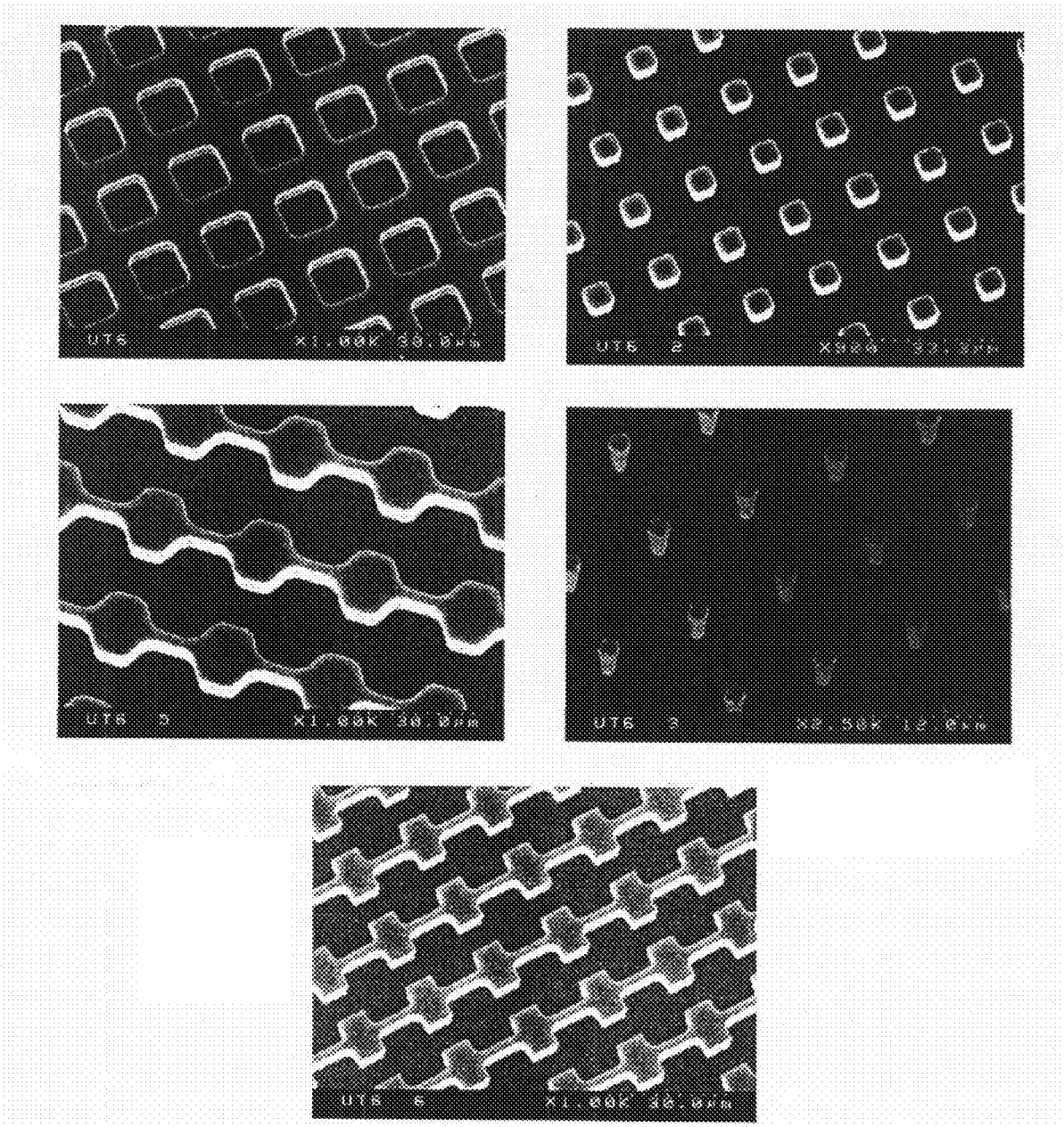

FIG. 9d shows representative scanning electron microscope images of different surface relief patterns generated inside a Si(100) wafer by deep RIE through the Bosch process. Different vertical posts and pits can be formed respectively by using positive and negative patterned resist layers.

Figure 10:
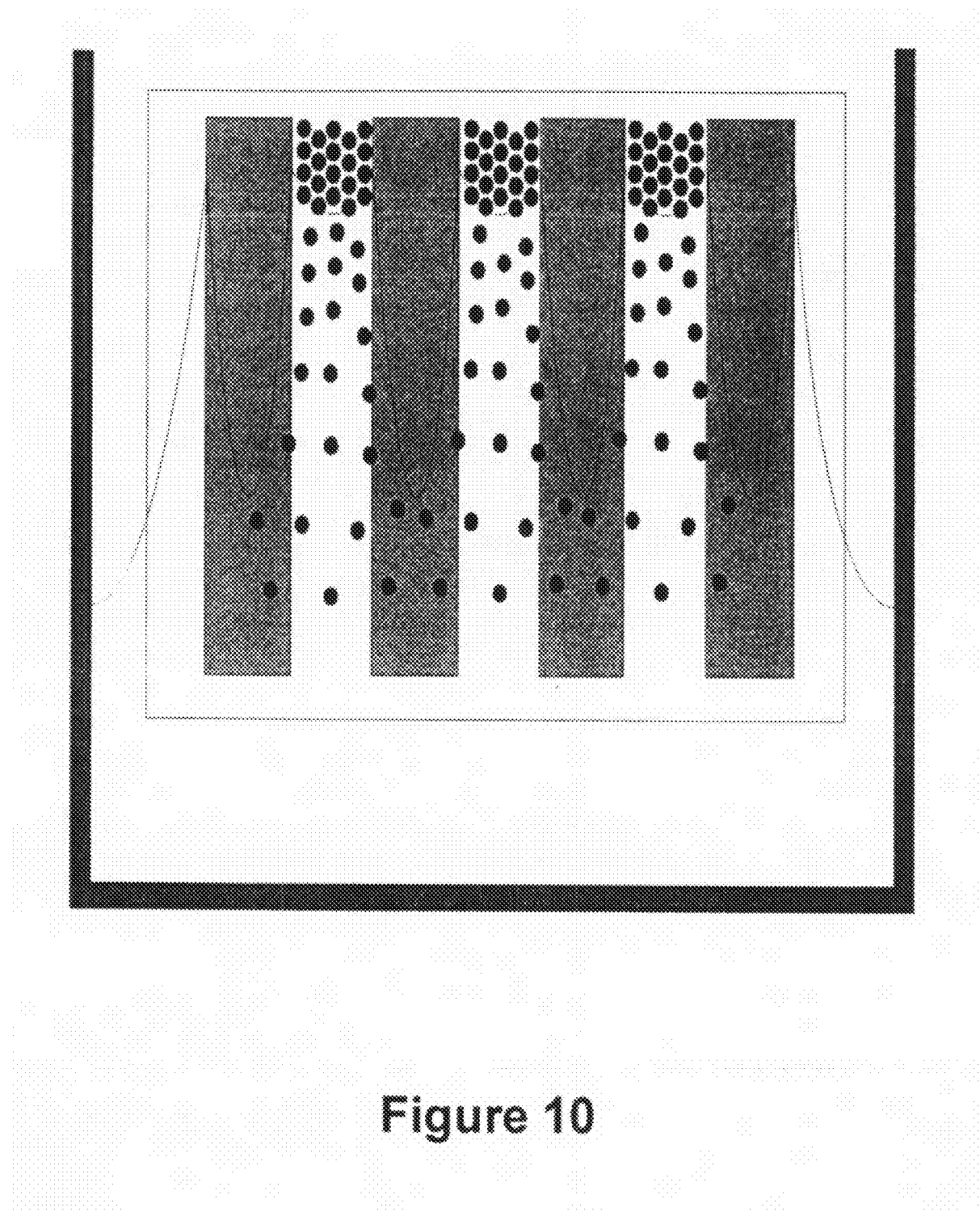

FIG. 10 is a diagrammatic representation showing a patterned substrate with a vertically oriented parallel array of micro-channels immersed in an ethanolic suspension of micro-spheres for growing opals in micro-channels on a glass substrate grown by a method disclosed herein known as directional evaporation induced self-assembly (DEISA).

Figure 11A:
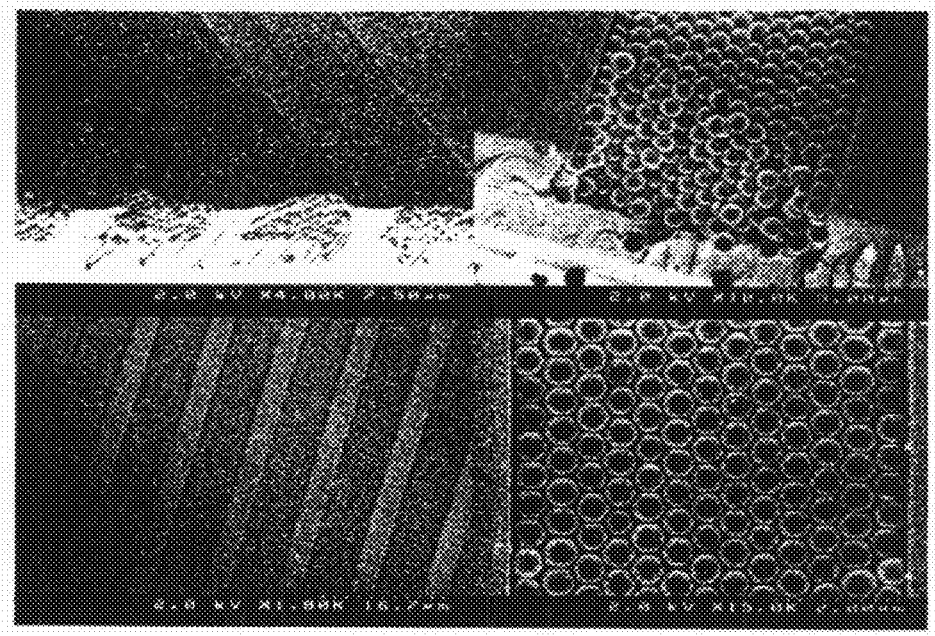

FIG. 11a shows representative examples of scanning electron micrograph images of a parallel array of micron scale rectangular-shaped, silica opal micro-channels on a glass substrate grown by the method of directional evaporation induced self-assembly (DEISA) of FIG. 10 wherein the top images depict the cleaved ends of the opal micro-channels and the bottom images display the top view.

Figure 11B:
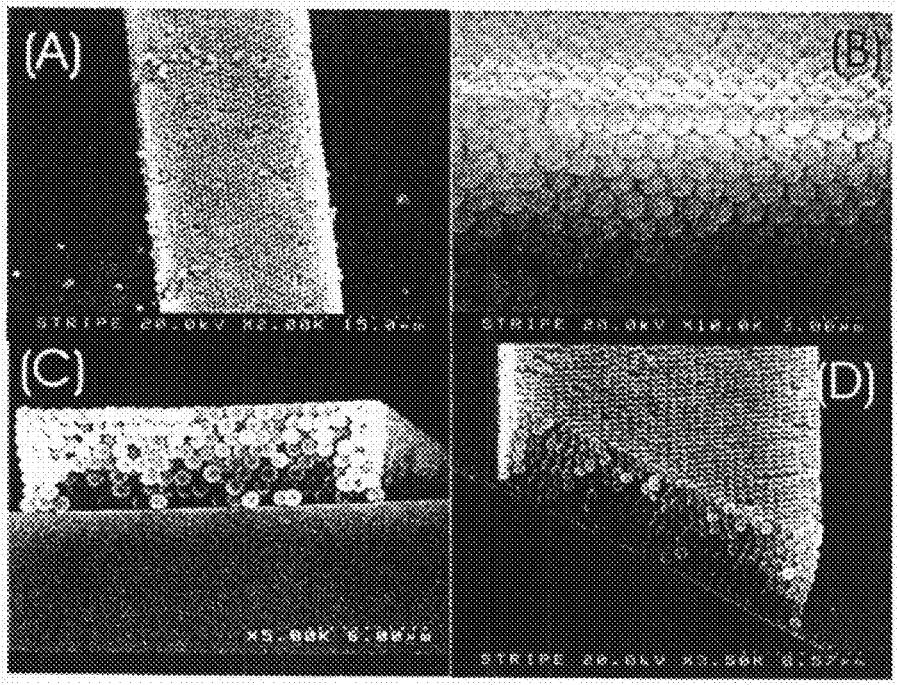

FIG. 11b shows SEM pictures of a confined colloidal crystal made of 870 nm spheres and grown by DEISA inside microchannels. In this case, the walls of the micro-channel have been removed after the infiltration and crystallization took place. This allows studies of the ordering of the colloidal crystal in longitudinal and transverse directions other than the top surface. Triangular arrangements are observed in both the top surface of the crystal—see FIG. 11b(A) and also in longitudinal directions that were adjacent to the original vertical walls of the micro-channel—see FIG. 11b(B). This geometrical configuration is only compatible with a face centered cubic packing arrangement of the spheres in the micro-channel thereby discarding the presence of any other possible colloidal crystal lattices. It can also be seen that the longitudinal crystal faces that were adjacent to the original vertical micro-channel walls display a clear tendency to form a certain angle with them instead of being perfectly parallel to them. An analysis performed on the SEM pictures identifies the longitudinal colloidal crystal faces with the (−1 −1 1) crystalline face, forming an angle of 109 degrees with respect to the top (111) face of the colloidal crystal and, therefore, an angle of 19 degrees with respect to the original vertical walls of the micro-channel. Transverse sections of the colloidal crystal, perpendicular to both the bottom and the original walls of the micro-channels, present low mechanical stability and are difficult to analyse, but the observations indicate that the (1 −1 0) face of the crystal is parallel to the original walls of the channel—see FIGS. 11b(C) and 11b(D).

FIG. 12 shows computer generated models of a rectangular-shaped face centered cubic crystal of micro-spheres. A front view of a (A) {110} surface (direction of the crystal perpendicular to both the bottom and the vertical walls of the channel) and a (B) {112} face (direction of the crystal perpendicular to the vertical walls of the channel) are shown.

Figure 13:
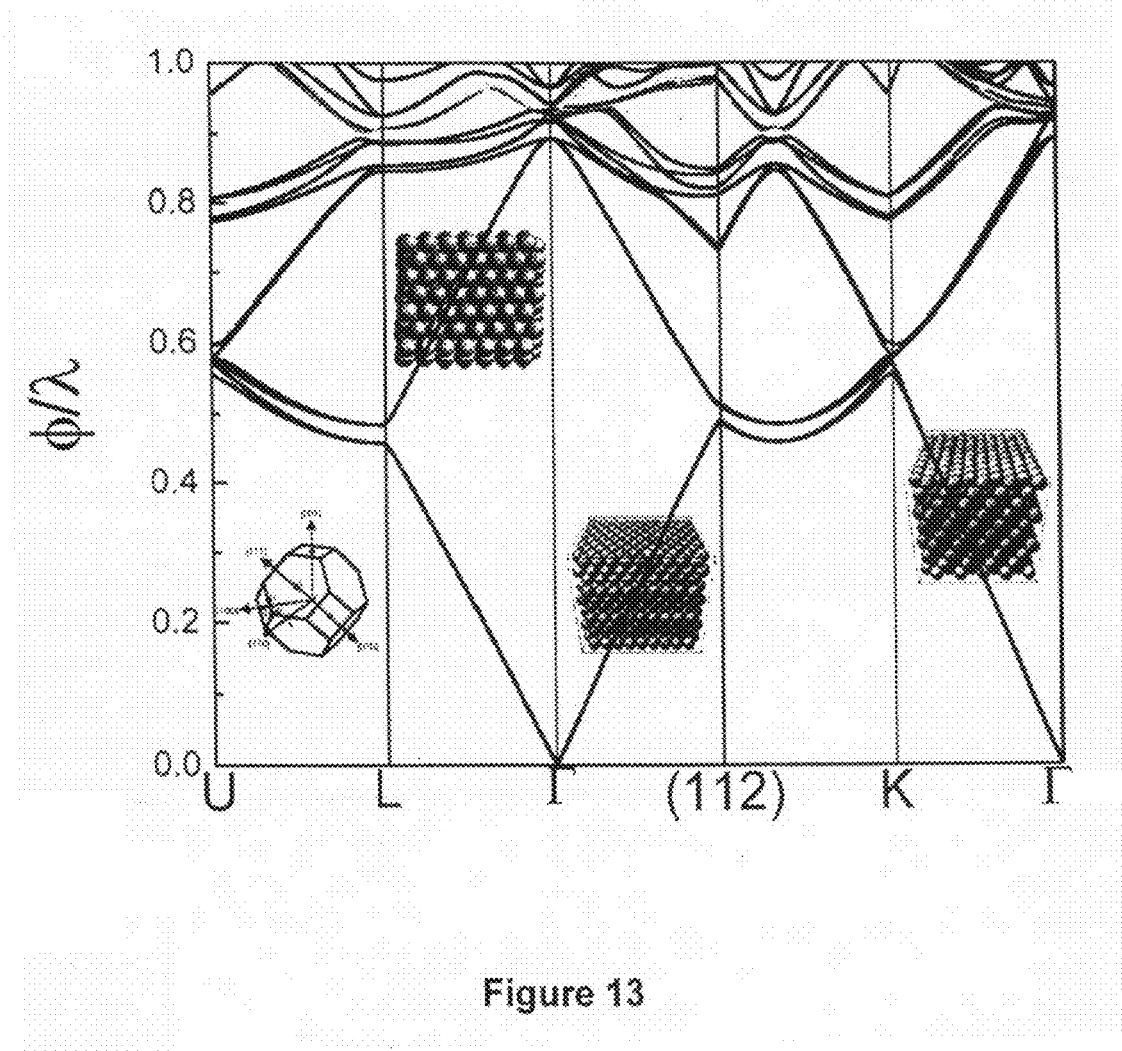

FIG. 13 shows the photonic band structure along the main directions of a rectangular-shaped colloidal crystal.

Figure 14:
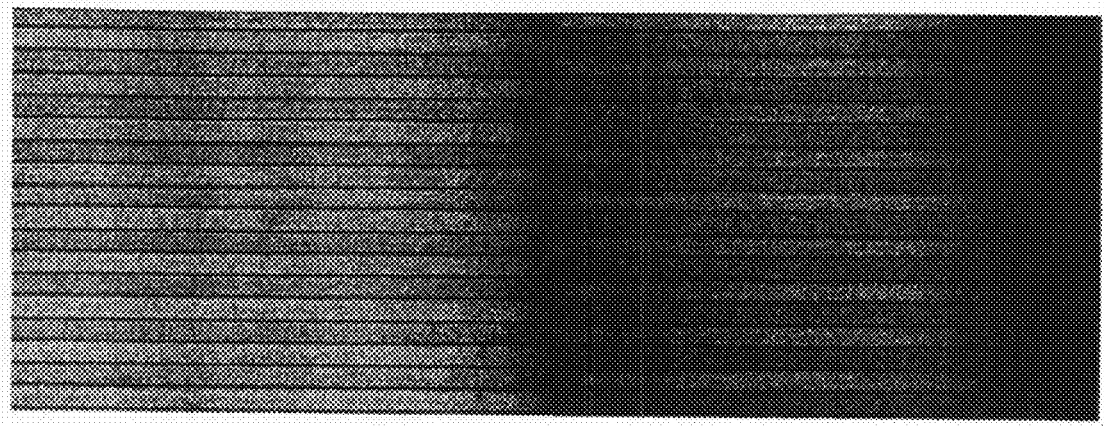

FIG. 14 shows an optical micrograph of an array of epoxy-glass microchannels realized on top of a glass substrate and within which 320±10 nm diameter silica spheres have been infiltrated and crystallized by the DEISA method. Pictures have been taken employing an optical microscope in both transmission (left panel) and reflection (right panel) mode. In both cases, the sample was irradiated with white light incident at a normal angle with respect to the top of the channel. The coloured pattern displayed by the structure is a result of the photonic crystal behaviour of the confined colloidal crystal structure due to the periodic modulation of the dielectric constant.

Figure 15:
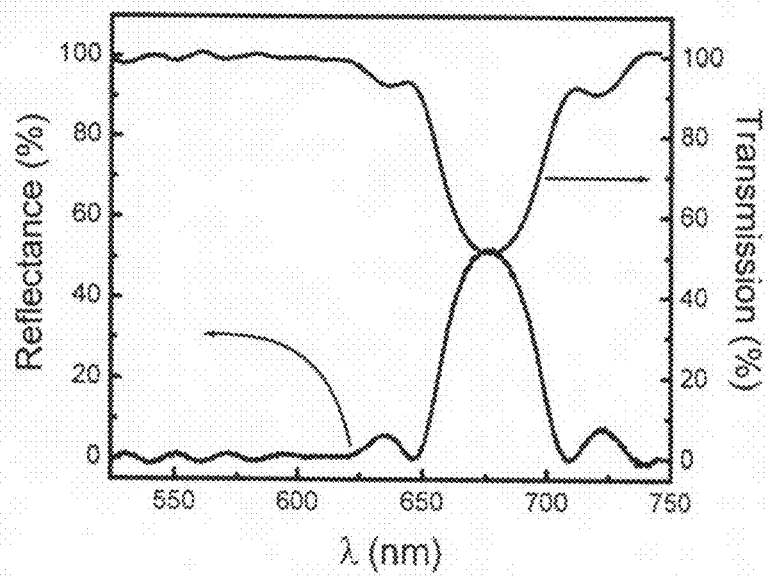

FIG. 15 Absolute optical reflectance (red line) and transmission spectra (green line) measured when white light impinges along the (111) direction (top face) for an individual planar photonic colloidal crystal (silica sphere size 320±10 nm) grown inside a micro-channel by the DEISA method. The reflectance (transmission) peak (dip) corresponds to the first stop band along the (111) direction and there is clear evidence of the optical filtering effect of the so-built structure. The tested area is 10 μm×10 μm. No reflectance peaks are observed from the glass vertical polymer wall regions separating the opal micro-channels.

Figure 16A:
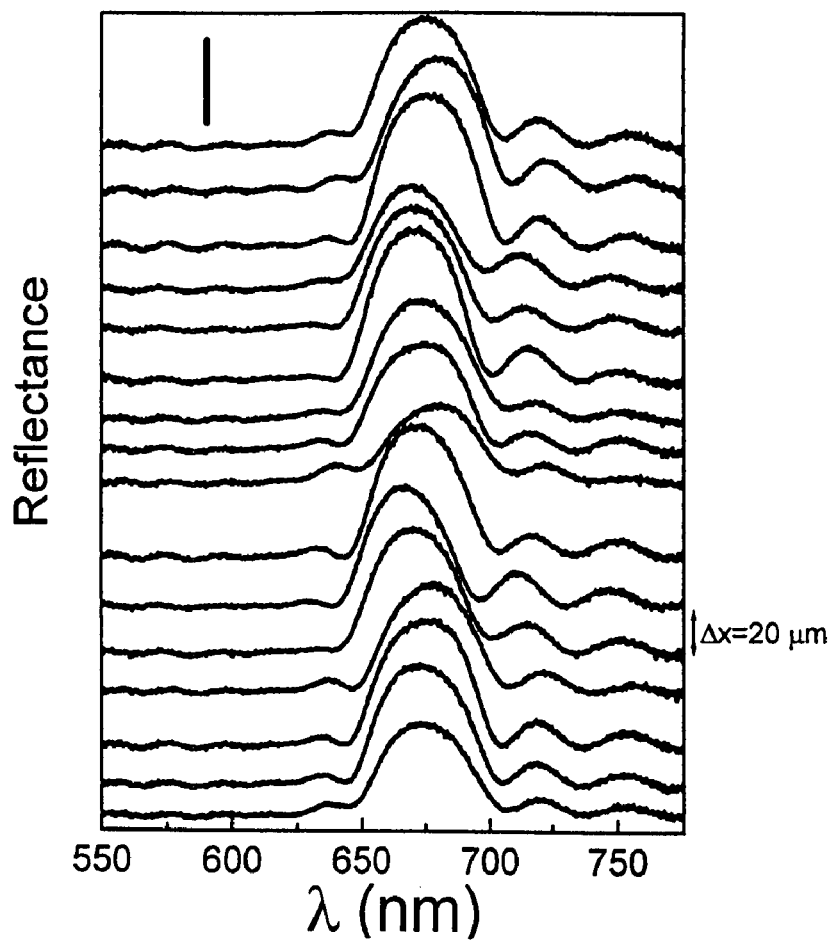

FIG. 16a Spatially resolved optical reflectance along a micro-channel. The confined colloidal crystal is made of 320±10 nm diameter silica spheres, which were infiltrated by the DEISA method. Each one of the spectra corresponds to an area of 15 μm×15 μm of the colloidal crystal micro-channel. The spatial separation between the tested areas along the channel was 20 microns. The total length shown in the figure is 300 microns.

Figure 16B:
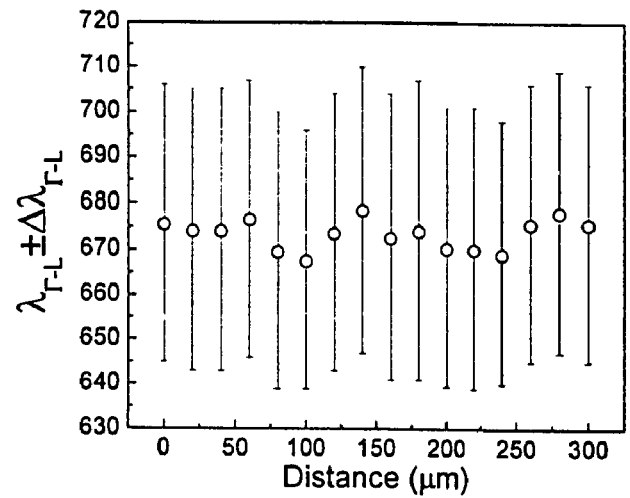

FIG. 16b shows the fluctuation of the position and the width (taken as the distance between the two relative minima which define the absolute maximum in the spectra) of the optical reflectance peak measured along the micro-channel.

Figure 17:
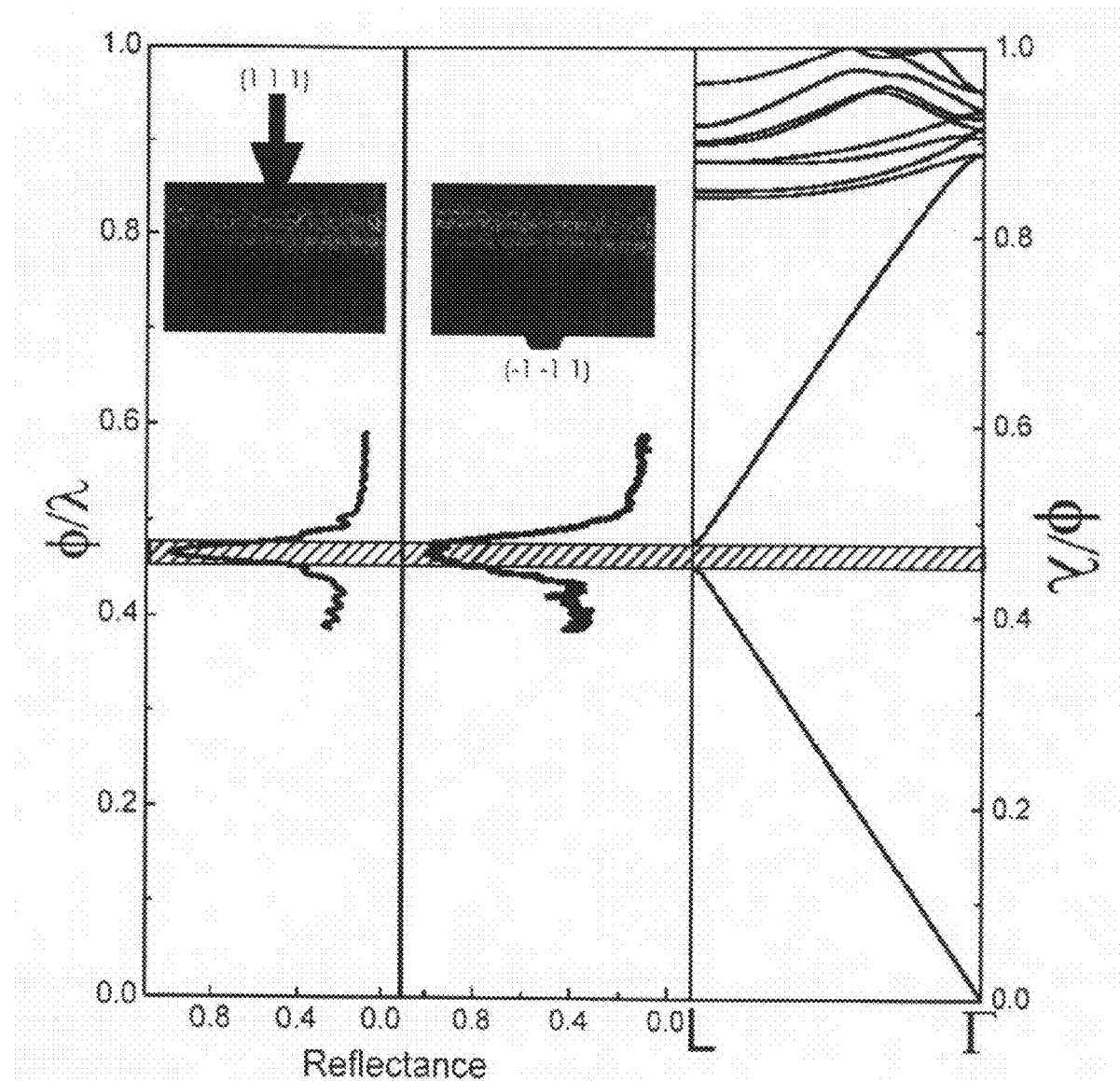

FIG. 17 shows the optical reflectance measured along the (1 1 1) and the (−1 −1 1) crystalline directions (left and central panel respectively) for a planarized confined colloidal crystal made of 320±10 nm diameter silica micro-spheres by DEISA. The right panel shows the calculated photonic band structure corresponding to the Γ-L direction in the reciprocal space.

Figure 18:
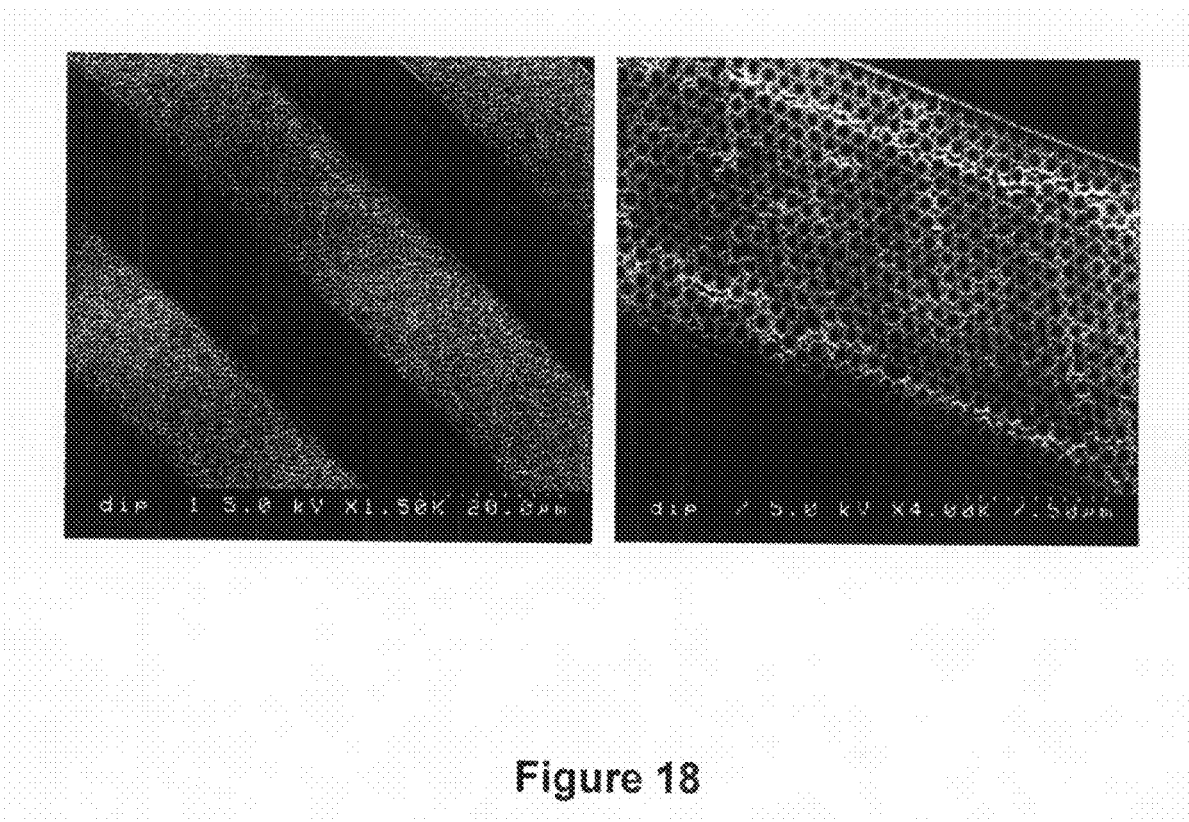

FIG. 18 shows representative examples of scanning electron micrograph images of a parallel array of micron scale rectangular-shaped silica opal micro-channels on a glass substrate grown by the method of dip coating self-assembly (DCSA).

Figure 19:
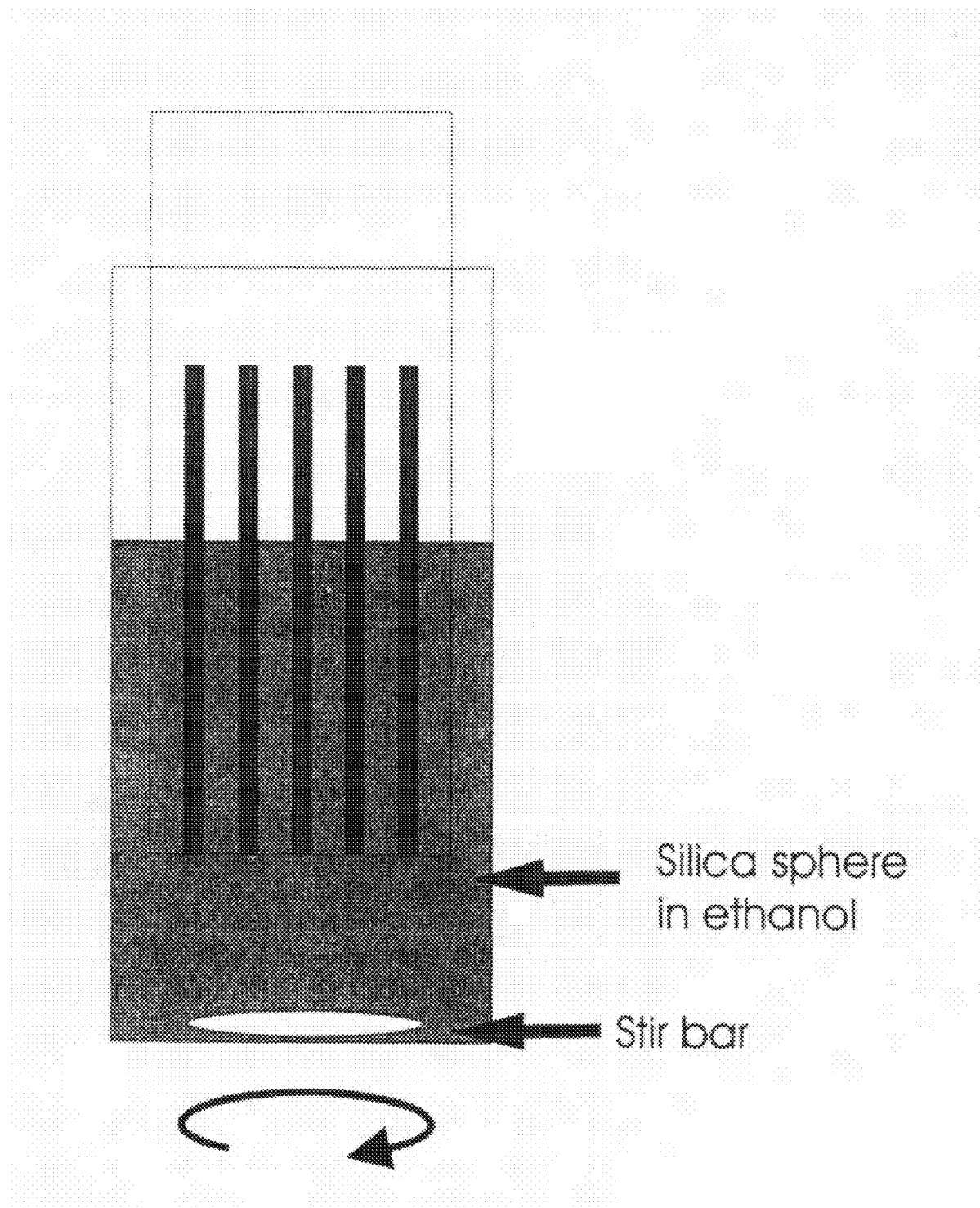

FIG. 19 shows a scheme for the formation of large diameter 850±20 nm silica micro-sphere well ordered opal micro-channels by a method disclosed herein referred to as assisted directional evaporation induced self-assembly (ADEISA).

Figure 20A:
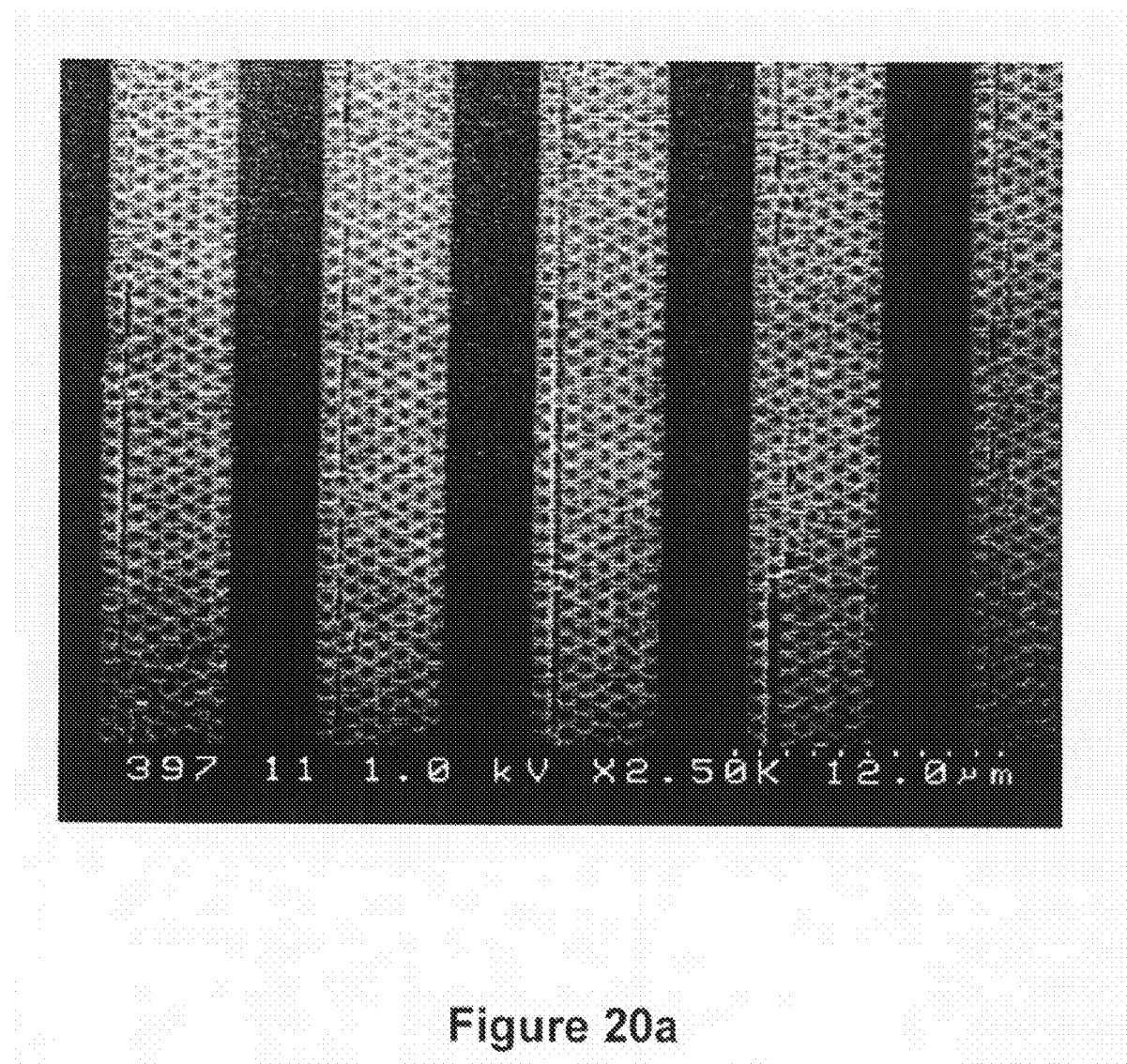

FIG. 20a shows a representative example of a scanning electron micrograph image of a parallel array of micron scale rectangular-shaped silica opal micro-channels on a glass substrate containing large diameter 850±20 nm colloidal dimension silica micro-spheres grown by the ADEISA method shown in FIG. 19.

Figure 20B:
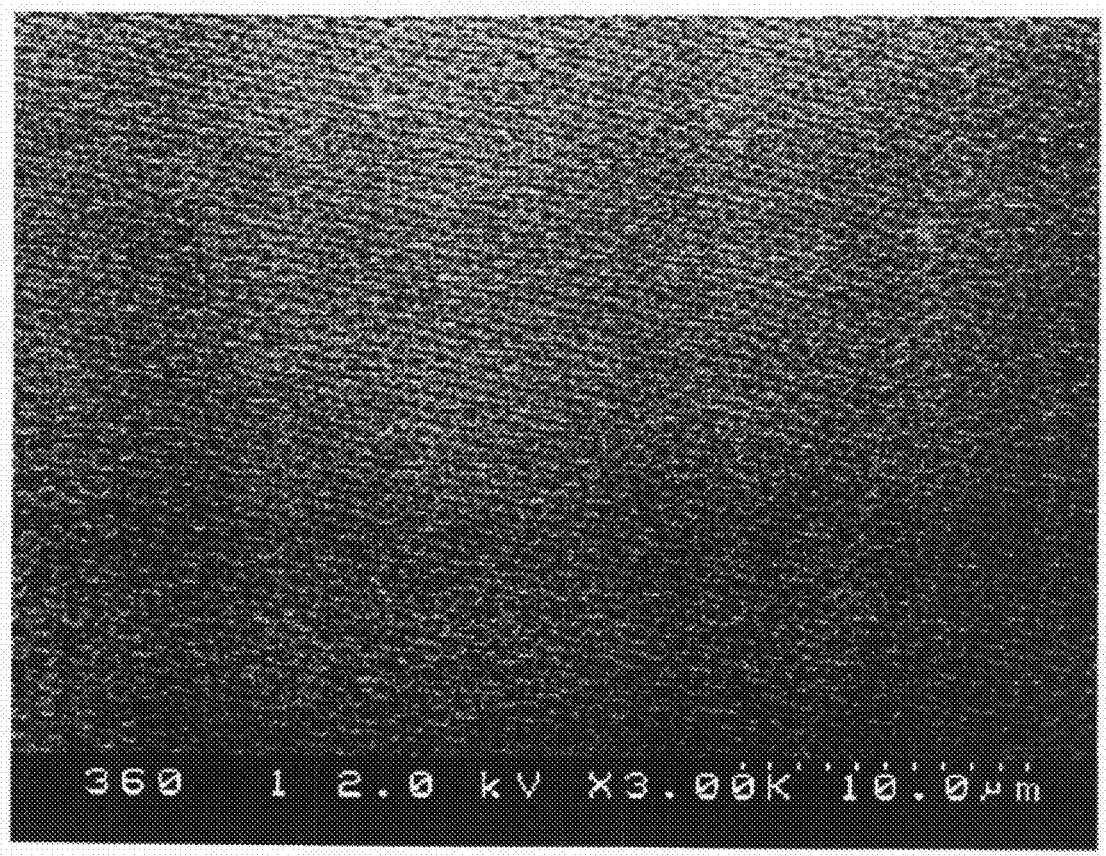

FIG. 20b shows a representative example of a scanning electron micrograph image of a colloidal crystal film on a flat glass substrate containing 850±20 nm colloidal dimension silica micro-spheres grown by the ADEISA method shown in FIG. 19.

FIG. 21a shows a top view of a photonic chip constructed in accordance with the present invention.

FIGS. 21b and 21c show side views of the device of FIG. 21a.

Figure 22:
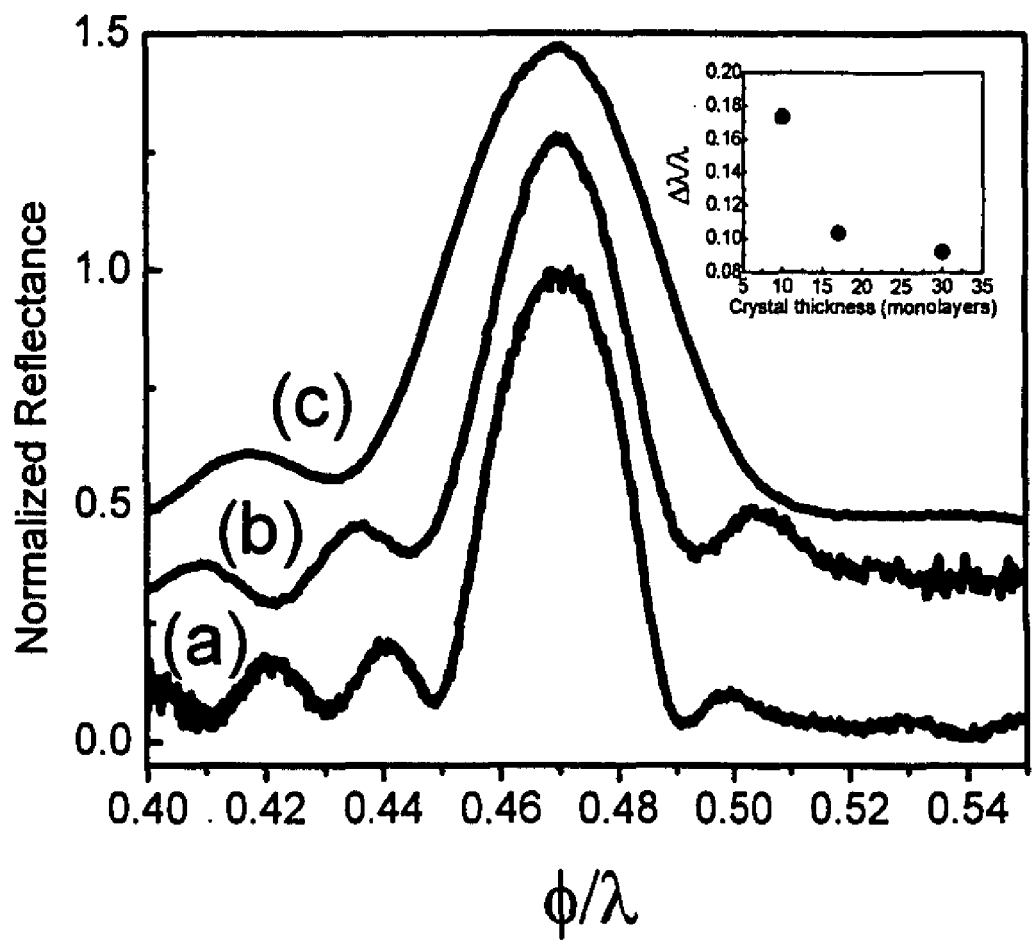

FIG. 22 shows three normalized reflectance spectra, each one corresponding to a confined colloidal crystal micro-channel made of a different silica sphere diameter, namely (a) 320 nm, (b) 550 nm and (c) 970 nm. In all three cases, the micro-channel width and depth dimensions were the same and spheres were infiltrated into the micro-channels by DEISA (320 nm spheres) and ADEISA (550 nm and 970 nm) methods. The wavelength axis has been divided by the sphere size in each case for the sake of comparison.

Figure 23A:
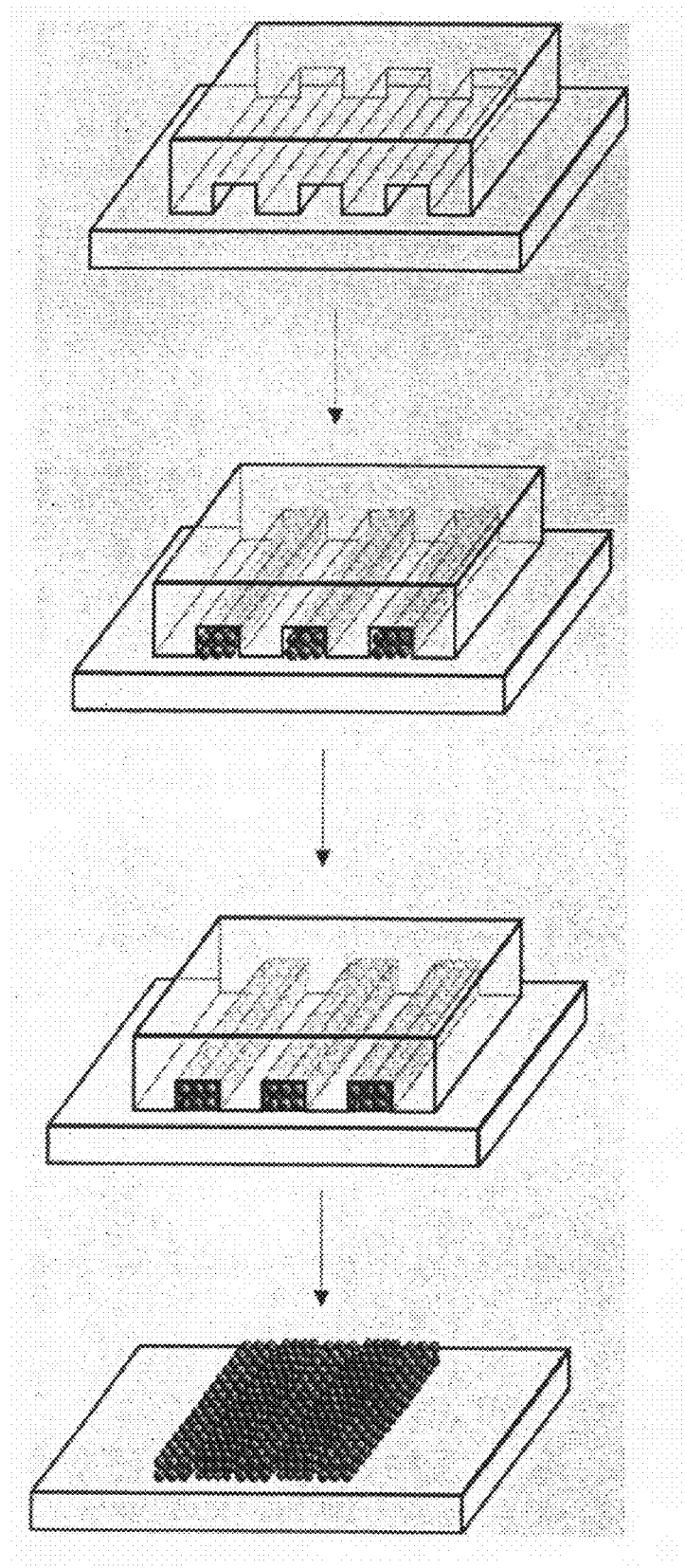

FIG. 23a illustrates a procedure for the fabrication of a bi-frequency colloidal crystal optical mirror.

Figure 23B:
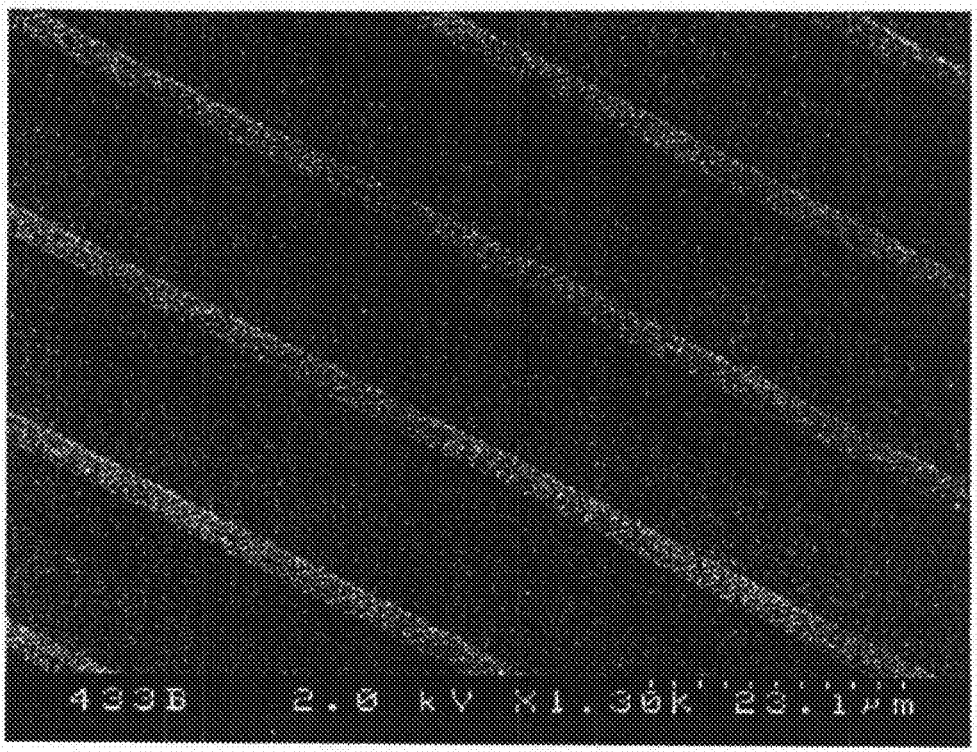

FIG. 23b shows a representative scanning electron micrograph image of a polymer line embedded inside a colloidal crystal line.

Figure 23C:
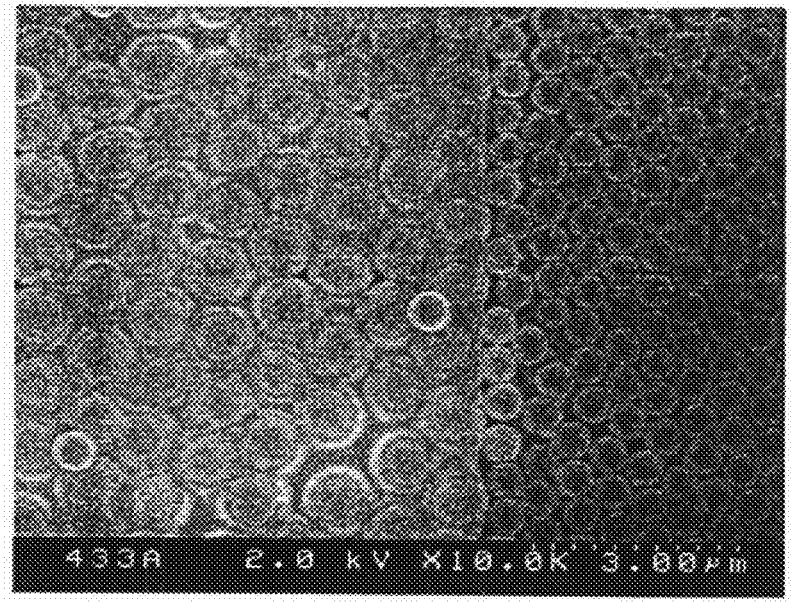
Figure 23C:
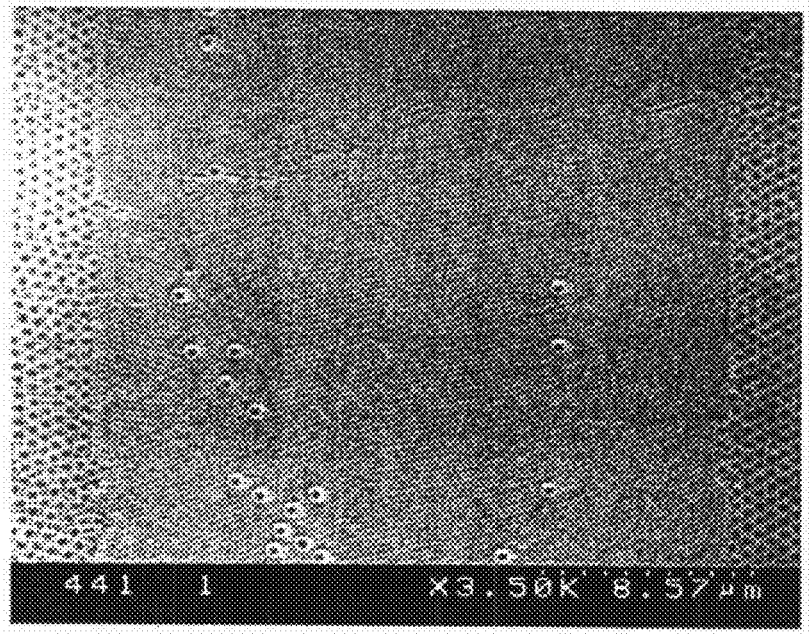

FIG. 23c shows a magnified region of a polymer-big sphere (970 nm) composite line and a small sphere (550 nm) colloidal crystal after DEISA.

Figure 23D:
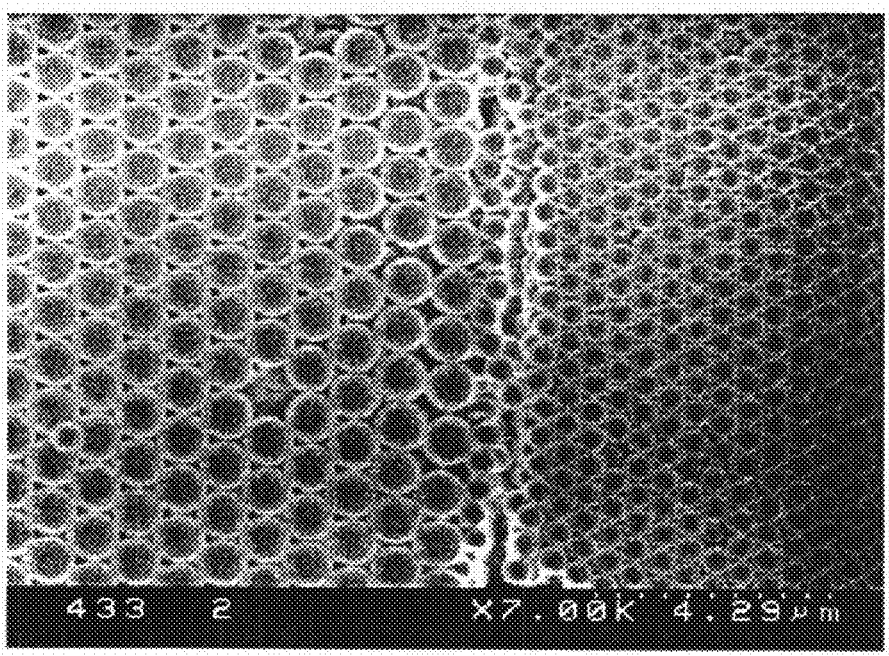

FIG. 23d shows an alternative big and small sphere colloidal crystal line after calcination of the polymer.

Figure 23E:
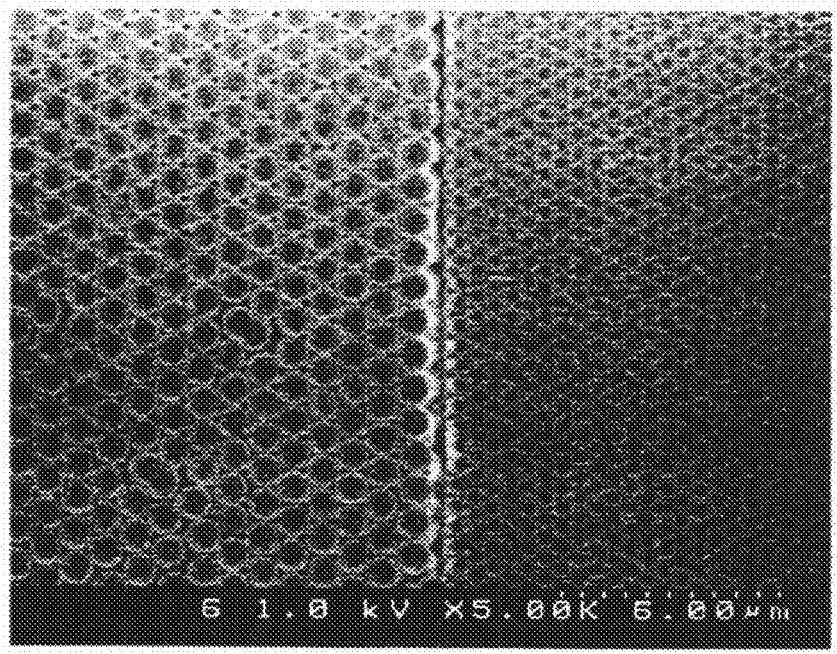

FIG. 23e shows an interface between big and small sphere colloidal crystal lines.

Figure 24:
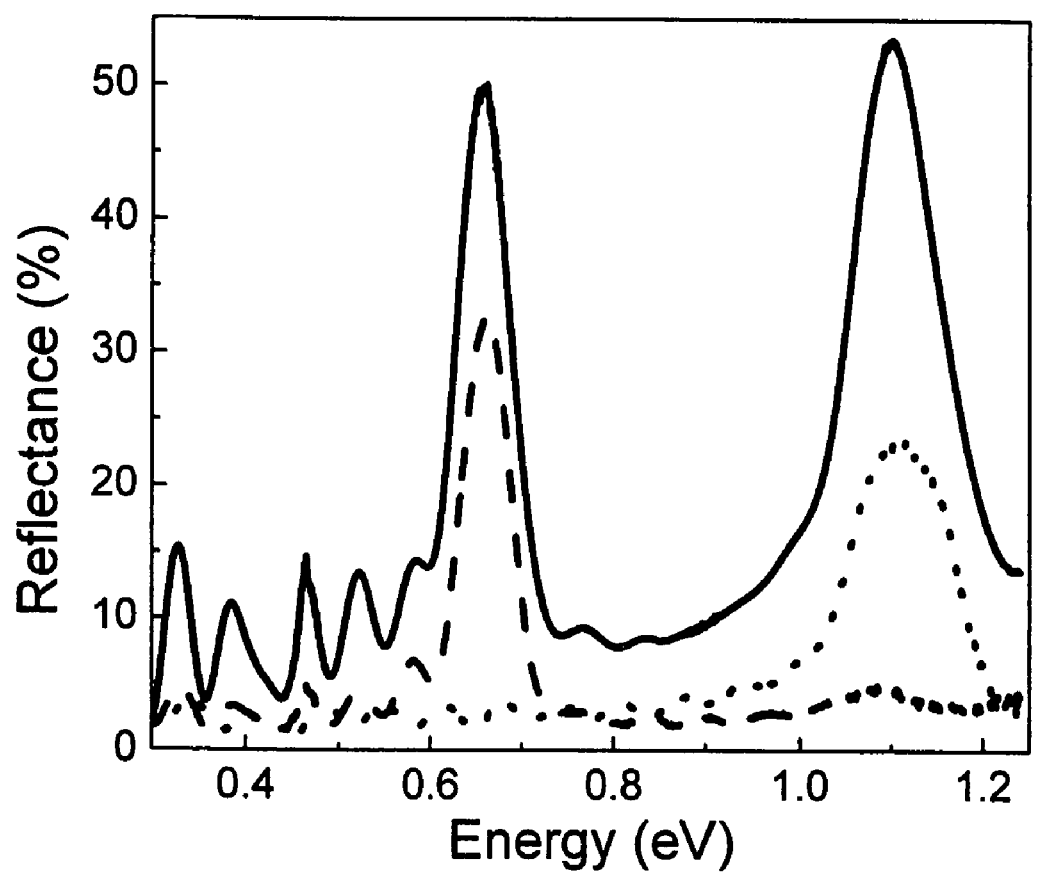

FIG. 24 shows optical reflectance measurements of the structure shown in FIG. 23d and made of two alternating planarized colloidal crystals, made of 550 nm and 970 nm diameter spheres respectively.

Figure 25A:
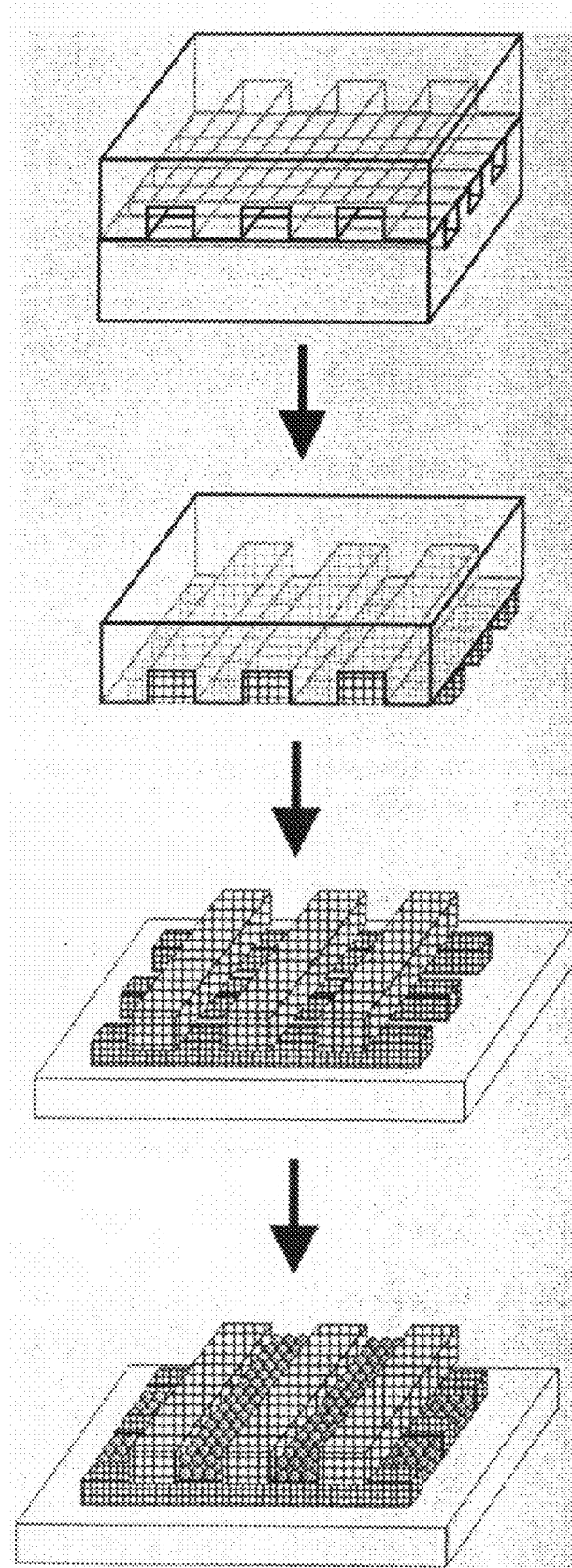
Figure 25B:
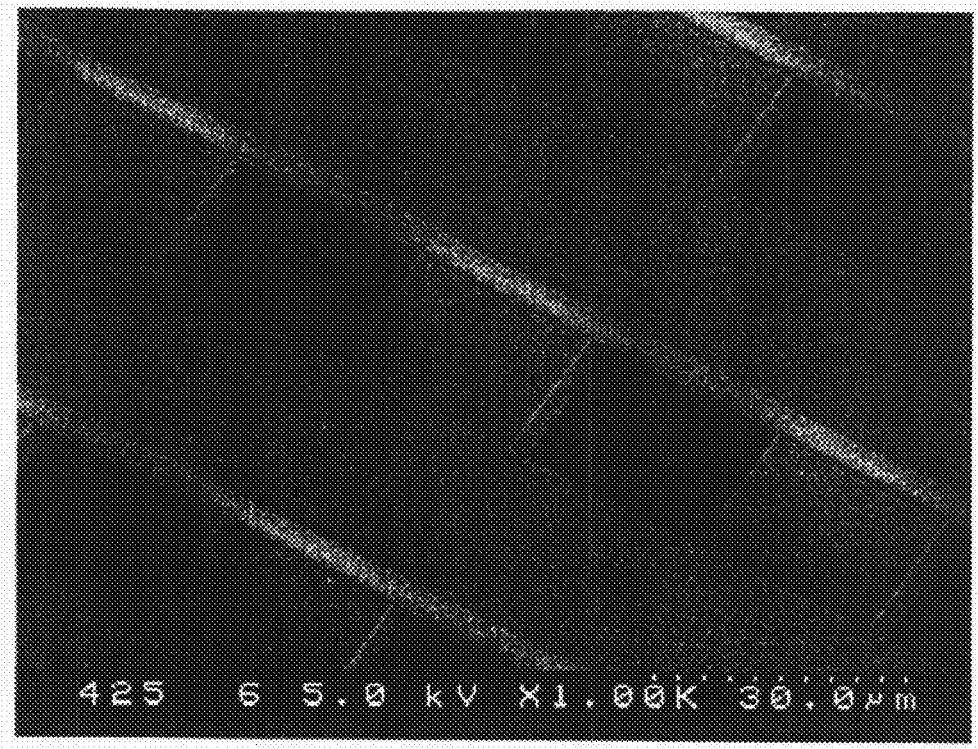
Figure 25C:
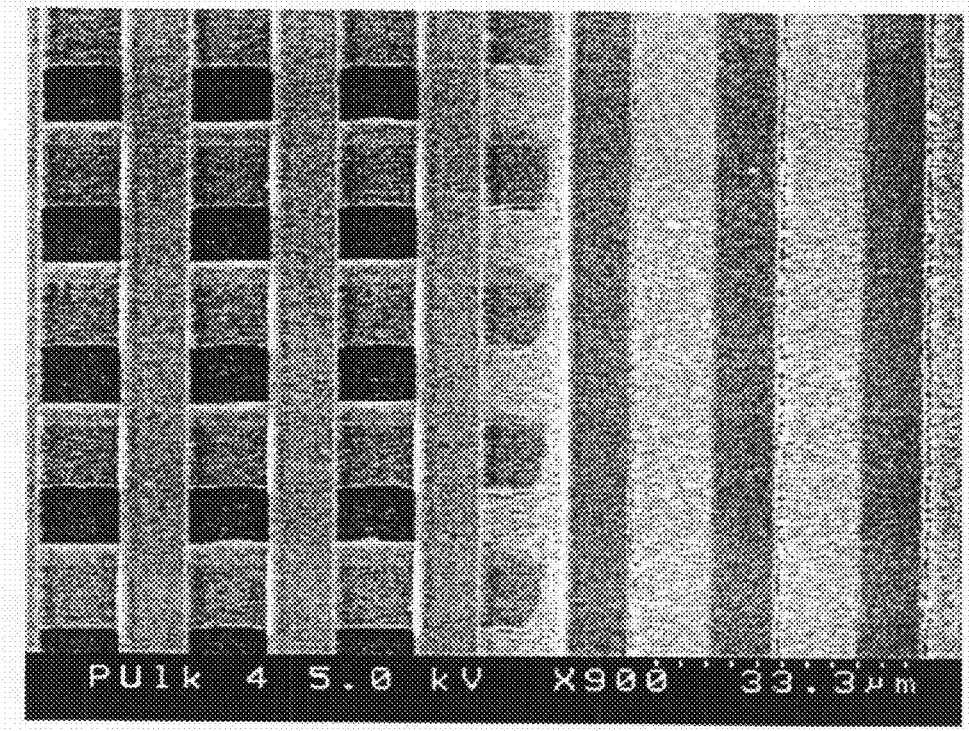

FIG. 25 illustrates a procedure for the fabrication of a Lincoln Log "Wood-Pile" colloidal crystal superlattice.

Figure 26:
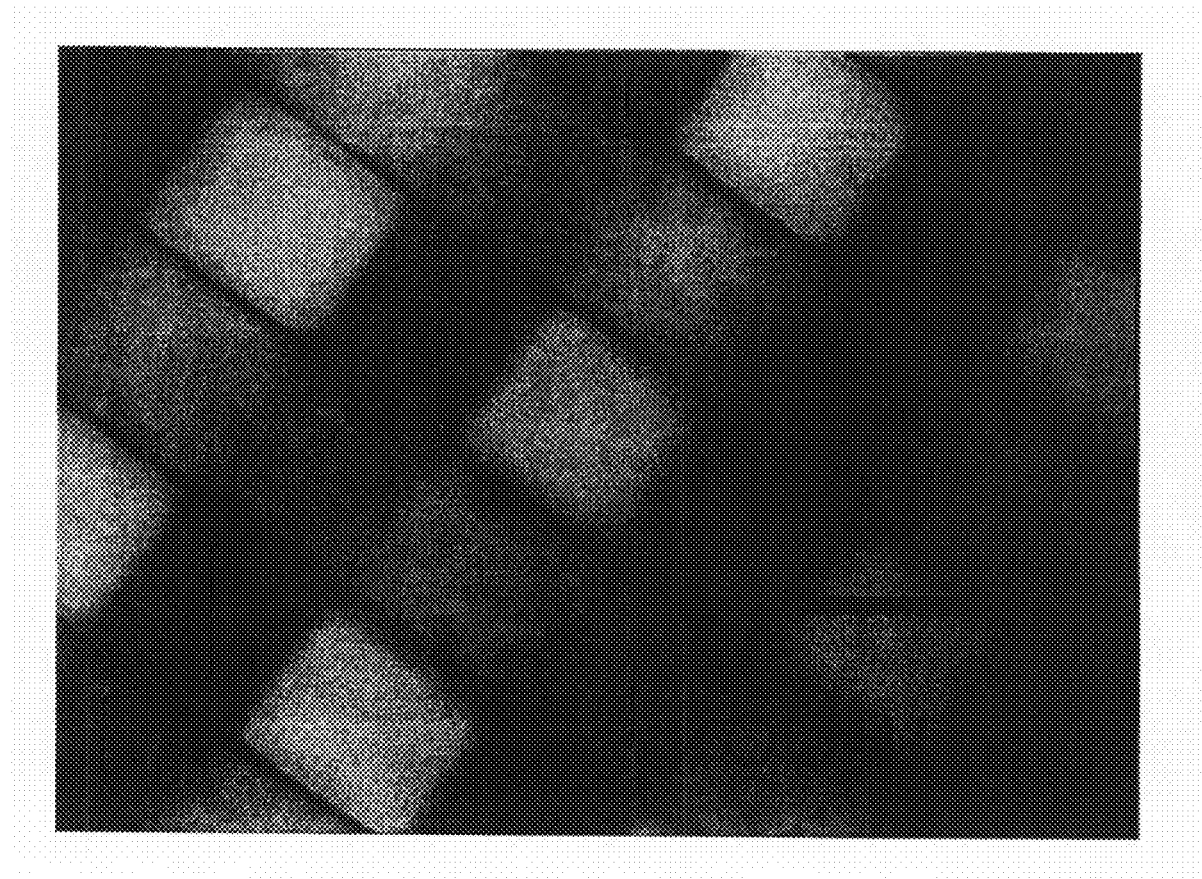

FIG. 26 shows an optical micrograph of a wood-pile superlattice made by the method of micro-molding inside capillaries.

Figure 27:
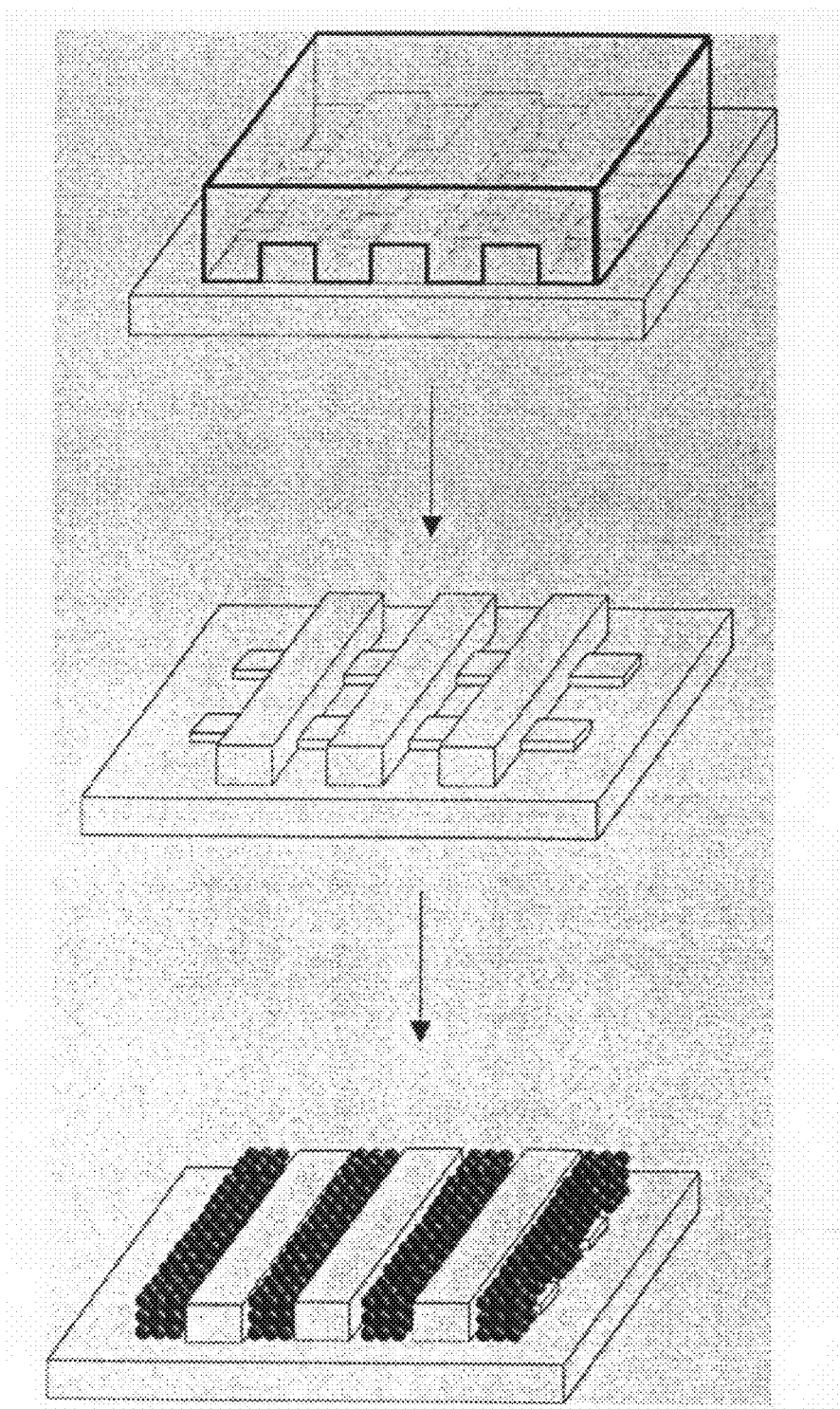

FIG. 27 illustrates a procedure for the fabrication of a modulated thickness colloidal crystal.

FIG. 28 shows (A) optical micrograph of and (B) a corresponding set of optical reflectance spectra.

Figure 29:
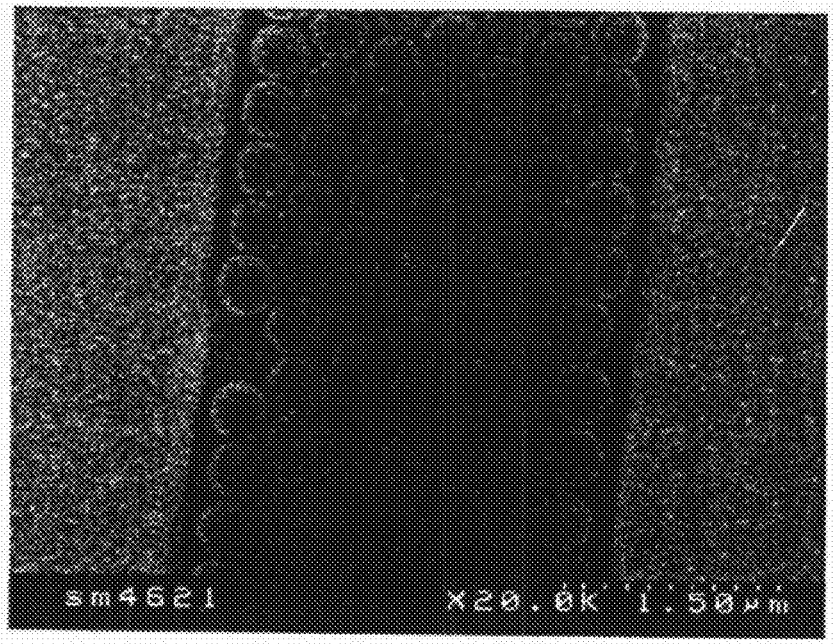
Figure 29:
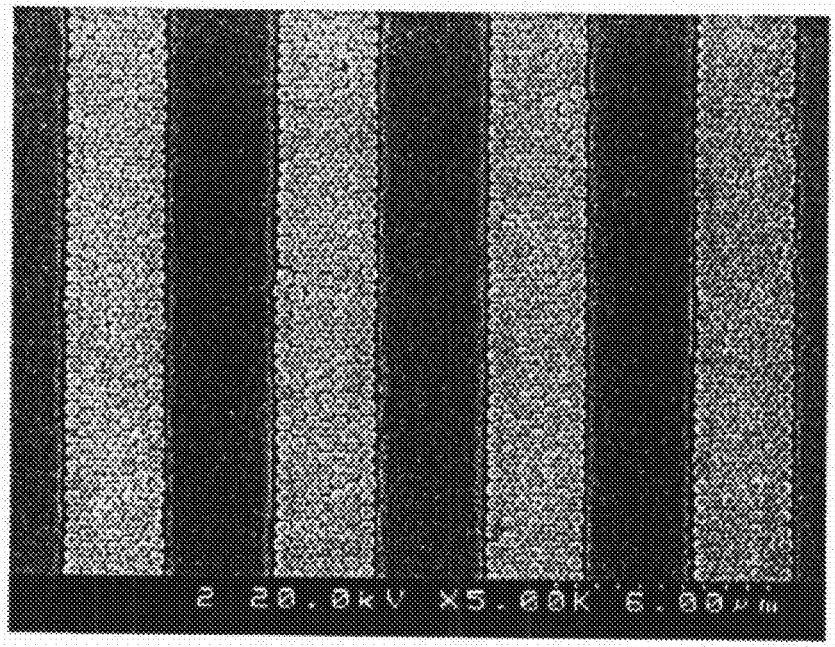

FIG. 29 shows a highly ordered 2-D colloidal crystal photonic lattice comprising micro-spheres.

DETAILED DESCRIPTION OF THE INVENTION

The present invention discloses six, straightforward, rapid, reproducible and inexpensive methods that combine microfluidic and spin-coating, dip coating and two new methodologies with colloidal crystal self-assembly and lithography to produce patterned crystalline colloidal crystals embedded on the surface of or within substrates, such as but not limited to, semiconductor wafers. These techniques enable the planarization of micron scale colloidal crystal-based 3-D PCs that are demonstrated to function as ideal single crystal 1-, 2- and 3-D diffractive optical components. This invention has led to the creation of 1-, 2- and 3-D micro-photonic crystal devices that are packaged in a planar substrate and which may provide the enabling technology for highly compact optical circuits in which 3-D micro-photonic crystals are integrated with optical waveguides and optical fibers. Colloidal crystal patterns in or on substrates can be used for templating micron scale, structural defects in photonic crystals (PC) and integrating PC devices within photonic chips that may be coupled to optical waveguides including but not limited to optical fibers. Since structural defects in photonic crystals can be designed to localize and guide light (E. Yablonovitch et al. Phys. Rev. Lett. 67, 3380 1991; M. Bayindir et al., Phys. Rev. B 61, R11855, 2000), this invention provides an enabling technology for the positioning, assembly and interconnection of micro-optical devices in photonic chips. These devices may include low threshold lasers, optical switches, wavelength dispersion compensators and wavelength division multiplexers that can be linked by circuits of light and coupled to glass fiber optic or other waveguide systems for applications in optical chips computers and optical telecommunication systems.

The processes disclosed herein for growing colloidal crystal patterns on substrates is surprisingly straightforward, and very advantageously is easily integrated into existing chip fabrication facilities and readily amenable to mass production. The methods combine self-assembly of colloidal particles and lithographic patterning to grow and position colloidal crystals of known thickness and orientation in a wafer, which may be used as a template for the production of photonic crystals in photonic devices produced by the combination of substrate and embedded photonic crystal. Because the methods disclosed herein of creating the colloidal crystal patterned wafers are extremely facile, rapid, reproducible and cheap, they are easily adapted for engineering the lattice dimensions, refractive index contrast, structural defects, location and integration of PC on photonic chips. The photonic chips may be seamlessly coupled to optical fiber and waveguide systems to complete an all-optical planarized highly compact telecommunication system.

Soft lithography encompasses a suite of techniques that have proven to be remarkably useful for the fabrication of micron to sub-micron patterns on a range of planar and curved substrates, see Y. Xia and G. M. Whitesides, Angew. Chemn. Intl. Ed. 1998, 37, 551. The procedures are facile and can be readily handled in an ordinary laboratory environment. In the context of the work described in this study, a line patterned polydimethylsiloxane (PDMS) master is obtained by casting a pre-polymer gel (Sylgard 184, Corning) from the corresponding lithographically defined photo-resist pattern. When access to lithographic instrumentation is not available, PDMS masters may be easily made by non-lithographic methods, such as the use of transmission electron microscopy (TEM) grids or optical gratings as templates for making micro-molds (see below).

A) Producing Colloidal Crystal Patterns on Substrates

The following methods teach different ways of growing colloidal crystals on, or embedded within, substrates.

Method 1

Capillary Infiltration

A procedure for fabricating V-shaped groove patterns inside a Si (100) wafer is depicted in FIG. 1. The PDMS master is inked with 2 mM hexadecanethiol in ethanol and then put into conformal contact with a Au (50 nm) coated Si (100) wafer (5 nm Ti is used as an adhesion layer). The bare gold surface is then etched away by a $Fe(CN)_6^{3-}/Fe(CN)_6^{4-}/$ KOH solution and the underlying Si (100) substrate is then anisotropically etched away by 3M KOH in $^i$PrOH/$H_2$O at 70° C. to give V-shaped grooves with 90° apex angles beneath the surface of the Si (100) wafer, as seen in the scanning electron microscopy (SEM) image in FIG. 1a. The etching rate along the Si (100) direction is approximately 1 µm per minute (see I. Zubel, Sensor Actuat. A-Phys. 1998, 70, 260).

A flat PDMS block is next put into conformal contact with the patterned wafer and a drop of a 0.1 wt % aqueous dispersion of monodisperse silica micro-spheres (diameter=840±20 nm, Stöber synthesis) was added at the interface between the patterned silicon wafer and the PDMS block. Micro-spheres are driven into the V-shaped grooves by capillary forces and close-pack inside the grooves upon evaporation of the water-dispersing agent. Due to the 70.6° angular geometry of the V-shaped grooves, micro-spheres nucleate and grow in a vectorial fashion exclusively within the grooves to form a pattern of fcc colloidal crystal parallel lines. It is noteworthy that the {100} layer planes are well ordered and organized parallel to the [100] face of the single crystal Si (100) wafer. This can be seen in the SEM images shown in FIG. 1b-d. Over spatial areas sufficiently large for the construction of photonic crystal devices the colloidal crystals can be made to be essentially free of defects, FIG. 1b. SEM images were obtained on a Hitachi FESEM-4500.

Interestingly, the first micro-spheres to nucleate in the V-shaped grooves are single-file arrangements and these linear constructions are found to be located in the apex of the V-shaped groove. FIG. 2 shows an SEM image depicting the formation of a 1-D chain of silica micro-spheres grown in the apex region of a V-shaped groove that had been anisotropically etched within the surface of a single crystal (100) silicon wafer. These 1-D chains of micro-spheres dominate in the early stages of infiltration and when dilute aqueous dispersions of micro-spheres are used. At later stages the micro-spheres self-assemble adjacent to the 1-D chains and continue to grow up the walls of the V-shaped grooves to eventually fill them with well-ordered patterns of colloidal crystals. The edges of the grooves seem to be filled first with well-defined lines of microspheres. Further, the observed registry of {100} layer planes of micro-spheres between the grooves provides additional evidence for vectorial control of colloidal crystal nucleation and growth and may be the origin of control of thickness, orientation and registry of the patterned colloidal crystal in the silicon wafer.

Very surprisingly, the whole process outlined above can be finished in less than 2 hours. The actual capillary infiltration and crystallization of micro-spheres in the patterned silicon wafer can be as short as minutes to seconds. As the depth of the V-shaped grooves in Si (100) is proportional to the etching time, it is easy to control the groove depth to accommodate a predetermined number of layers of silica micro-spheres. This has been achieved for one to ten layers of patterned crystalline colloidal crystals. The number of micro-spheres observed in the top (100) layer corresponds to the thickness of the colloidal crystal in the V-shaped grooves. The strategy described in this work alleviates the "sagging" and "pairing" problem and control of colloidal crystal spatial dimensions and layer thickness when PDMS is utilized for patterning micro-spheres through micro-molding on top of a Si substrate.

As mentioned above, PDMS masters can be made by non-lithographic approaches involving the use of TEM grids or optical gratings (see Y. Xia, J. Tien, D. Qin and G. M. Whitesides, Langmuir 1996, 12, 4033). To exemplify this methodology, we used a hexagonal 600 mesh TEM grid to prepare the PDMS master. The bar width of the grid is ca. 7 µm and the pitch width is ca. 35 µm. A TEM grid was first attached to a polymethylmethacrylate (PMMA) substrate by chloroform and then a PDMS pre-polymer gel is cast upon the grid. After curing at 60° C., the PDMS master is used for the micro-contact printing followed by Au and Si (100) etching as described above. The SEM image shown in FIG. 1e depicts a representative hexagonal symmetry V-shaped groove network and FIG. 1f displays a typical silica micro-sphere array following influx of micro-spheres into the grooves of the hexagonal pattern using the capillary infiltration method described above.

Example 1

Preparation of PDMS Stamp from Patterned Photoresist

The master consisting of an array of lines in a photoresist was created on a silicon wafer by using photolithography and a chrome mask. The feature line width is 3 to 10 µm with interline space 5 to 20 µm. A polydimethylsiloxane prepolymer (PDMS, Corning Sylgard 184) was poured on top of the master in a plastic petri dish. The gel was degassed for 15 mins and cured at 60° C. for 8 hrs. The solid PDMS was peeled off the master and cut into 1.5 cm×1 cm stamps.

Preparation of Metal-Coated Si (100) Substrate

Si (100) wafers were cleaned by trichloroethylene at 40° C. for 10 mins, acetone at 25° C. for 10 mins, methanol at 40° C. for 10 mins. The wafer was then dried in a nitrogen stream. The metal impurities were removed by boiling the wafer in a sulfuric acid (98%)/hydrogen peroxide (30%) mixture at 80° C. for 10 mins and then washed under running de-ionized water for 1 mins. The surface oxide was then removed by dipping the wafer in 5% hydrofluoric acid for 5 secs, washed under running de-ionized water for 1 min and then dried under a nitrogen stream. The cleaned wafers were stored in a polypropylene box and used within few days. The metal-coated Si (100) substrates were prepared by argon-ion sputtering. 5 nm of Ti or Cr was first sputtered on the wafer as an adhesive layer followed by 50 nm Ag or Au. The thickness of the metal deposit was monitored by a QCM.

Preparation of Patterned Si (100) Substrate

Hexadecanthiol was purified by vacuum distillation. A 2 mM ethanolic solution (ink) was prepared in air. A PDMS stamp was inked by a cotton tip, dried under nitrogen for 1 min, put into physical contact with the Ag or Au coated Si (100) wafer for 10 s. The unprotected metal area was removed by selective etching. For Au, the etching solution is composed of 0.001 M $K_4Fe(CN)_6$, 0.01M $K_3Fe(CN)_6$, 0.1M $K_2S_2O_3$, 1M KOH. For a 50 nm Au layer, the etch time is 16-18 mins. For Ag, the etching solution is composed of 0.001M $K_4Fe(CN)_6$, 0.01M $K_3Fe(CN)_6$, 0.1M $K_2S_2O_3$. For a 50 nm Ag layer, the etch time is 5-7 sec. The wafer was then cleaned with copious amount of water. The native oxide layer was then removed by 1% HF solution for 1 mins. The silicon was then anisotropically etched by KOH solution (92 g KOH in 400 ml water+132 ml isopropanol) at 70-80° C. The silicon etching rates of Si (100) and Si (111) planes are respectively ca. 1 µm and 0.1 µm per minute. Representative results are shown in FIG. 1.

Example 2

Preparation of PDMS Stamp from TEM Grids

TEM grids (400 square mesh or 600 hexagonal mesh) were obtained from SPI Inc. The grid was cleaned by soaking in acetone overnight and then dried in air. The grid was then soaked in chloroform for 5 seconds and immediately transferred to a flat plexiglass substrate. A drop of PDMS prepolymer was added to the grid area and a block of solid PDMS (1 cm×1 cm×0.5 cm) was pressed on the plexiglass. After curing at 60° C. for 8 hrs, the excess polymer was cut off and the PDMS stamp was carefully peeled off from the plexiglass. The stamp was inked and printed on the metal-coated Si (100), followed by selective metal etching and anisotropic silicon etching according to procedures in Example 1. Representative results are shown in FIG. 2 which shows a micrograph of a 1-D colloidal crystal photonic lattice comprising a line of ordered micro-spheres formed in a V-shaped channel in the top surface of a substrate.

Example 3

Preparation of 837±18 nm Silica Micro-Spheres

Tetraethylorthosilicate (5 ml) was added to a mixture of absolute ethanol (74 ml), ammonia solution (28%, 12 ml) and deionized water (2.5 ml). The solution was stirred for 2 hrs, and then 19.5 g of tetraethylorthosilicate was added by a syringe pump (rate: 10 ml/h). The solution was then stirred for another 3 hrs. The silica spheres so formed were cleaned by centrifugation and ultrasonically dispersed in ethanol (3 times) and de-ionized water (3 times). The spheres were finally dispersed in de-ionized water and underwent sedimentation. The supernatant liquid was pipetted out to remove small spheres. This procedure was repeated until a sharp clean boundary between the white colloidal solution and water was observed during sedimentation. After the purification, the spheres were dried at 100° C. overnight and a 2 wt % aqueous dispersion was prepared.

The term "dispersion" as used throughout this patent application refers to isolated colloidal dimension particles of 0.1-5 microns in size suspended in a solvent.

Example 4

Infiltration of Silica Micro-Spheres into Patterned Si Wafer

The infiltration cell was assembled by putting a flat PDMS block (1 cm×0.5 cm×0.5 cm) into physical contact with the patterned Si (100) wafer prepared as in Example 1 and 2. A drop of a 2 wt % 837 nm sphere aqueous solution was added to the edge between the PDMS and the silicon. Capillary forces drive the colloidal solution into the grooves with the cell in a quiescence state. After drying for 2 hour in air, the PDMS was carefully peeled off from the Si substrate. Representative results are shown in FIGS. 3a, 3b and 3c. FIG. 3a is an SEM image showing a six layer (100) single crystal silica colloidal crystal in a V-shaped channel of Si (100) wafer and devoid of vacancy defects. FIG. 3b is an SEM image showing a five layer (100) single crystal silica colloidal crystal in a V-shaped channel of Si (100) wafer showing single vacancy defects in the top layer of the micro-spheres. FIG. 3c is an SEM image showing a seven-layer (100) single crystal silica colloidal crystal in a V-shaped channel of Si (100) wafer showing three vacancy defects in the top layer of the micro-spheres.

Method 2

Spin Coating

This method of assembling opal-patterned chips enables the growth of colloidal crystals within the spatial confines of both open and continuous channels as well as closed and finite pits etched inside the substrate. The open and continuous nature of the channels is a prerequisite of METHOD 1 to enable capillary pressure driven influx of dispersions of micro-spheres into the channels to facilitate crystallization of the micro-spheres into controlled thickness, area, orientation and registered opal patterns. METHOD 2 described in this invention creatively amalgamates methods of spin-coating and colloidal self-assembly with lithography to enable micro-spheres to crystallize into controlled thickness, area, lattice structure, orientation and registered opal patterns within both open and continuous etched channels as well as closed and finite etched channels and pits inside the substrate. In this case "closed" means an indentation, pit, well or channel, which is bounded on all sides therefore forming a "closed" indentation. It is particularly useful for applications in which one or more closed indentations are disposed across a surface of the substrate.

FIG. 4 shows steps (V) and (VI) {note that steps (i-iv) are identical to those in FIG. 1} of an exemplary, non-limiting synthetic strategy illustrating vectorial control of thickness, area, lattice structure, orientation and registry of silica colloidal crystals in silicon wafers for lab-on-chip and photonic chip technologies. The procedure for making the Si (100) substrate patterned with square pyramidal and rectangular pyramidal pits comprises several steps including step (i) an ethanolic hexadecanethiol solution (2 mM) is inked on the PDMS master;

step (ii) next the master is placed in conformal contact with a 50 nm Au/5 nm Ti/Si (100) substrate for 5-10 s;

step (iii) the bare gold is etched away by a mixture of 0.001M $K_4Fe(CN)_6$, 0.01M $K_3Fe(CN)_6$, 0.1M $K_2S_2O_3$, 1M KOH for 17 minutes;

step (iv) anisotropic etching of Si (100) by 3M KOH in water/isopropanol mixture at 70° C. for 10 minutes;

step (v) involves placing a drop of an aqueous suspension of silica micro-spheres on the surface and in the center of the etched pattern of square pyramidal-shaped and rectangular pyramidal-shaped pits in a Si (100) wafer and spinning the substrate, using a conventional spin-coating instrument, at predetermined speed; and step (vi) the effect of spinning is to drive by centrifugal forces the aqueous dispersion of silica micro-spheres across the surface of the patterned wafer upon which a combination of gravity driven sedimentation, oscillatory shear forces and evaporation induced self-assembly causes nucleation and vectorial growth of silica colloidal crystals, having controlled thickness, area, lattice structure and orientation, inside the closed pits or indentations in the surface of the substrate.

It should be noted that while spin-coating is a convenient way of moving micro-spheres laterally across a substrate having open or closed surface relief patterns in order to induce colloidal crystallization exclusively within said surface relief patterns, the method is not limited to just spin-coating and any method which causes lateral movement of micro-spheres across said surface relief patterned substrate can be organized to achieve the same objective of confining the colloidal crystallization to the regions defined by the surface relief patterns.

Example 1

Preparation of Square Pyramid-Shaped Pits in Silicon (100) Wafers

The process of METHOD 2 follows that of METHOD 1 and commences with a line patterned polydimethylsiloxane (PDMS) master that is obtained by casting a pre-polymer gel from the corresponding lithographically defined photo-resist pattern. A procedure for fabricating grid patterns of, for example square pyramid-shaped etch pits inside a Si (100) wafer begins with a PDMS master that is inked with an alkanethiol in ethanol. The inked master is then printed twice, mutually at right angles, onto an Au coated Si (100) wafer having a titanium adhesion layer. The bare gold surface is then removed with a cyanide etching solution, and the underlying Si (100) substrate is then anisotropically etched in aqueous base to preferentially expose (100) surfaces and thereby give square pyramidal-shaped etch pits with adjacent walls mutually inclined at 70.6° angles beneath the surface of the wafer, as seen in the scanning electron microscopy (SEM) image in FIG. 4a.

Example 2

Preparation of Square Pyramid-Shaped and Rectangular Pyramid-Shaped Pits in Silicon (100) Wafers The same square pyramidal pattern of etch pits can be obtained in a single alkanethiol inking process but instead using a square grid PDMS master. In a similar procedure the printing can be arranged to give rectangular pyramid-shaped etch pits, as seen in the SEM image in FIG. 4a. The method outlined in this method is not intended in any way to be restricted to arrays of square pyramidal-shaped or rectangular pyramid-shaped etch pits inside silicon wafers and can be easily adapted to other etch pit shapes and patterns by using the appropriately designed PDMS master. These patterns include closed finite as well as open continuous etch pits formed on the surface of the planar substrates.

Example 3

Spin-Coating Single Crystal Colloidal Crystals Inside Square Pyramid-Shaped Pits in Silicon (100) Wafers Once the patterned silicon substrate has been fabricated using soft lithography, the dispersion of monodisperse silica micro-spheres is placed on top of the patterned wafer and supported on the rotating pad of a conventional spin-coater. Note that the chosen patterning technique is by no way limited to soft lithography and may include any method for creating the require patterns. By subjecting the wafer to a specified spinning speed program the micro-sphere disperson is driven horizontally and at a controlled rate across the surface of the wafer by centrifugal forces. During this process of centrifugal spreading of the micro-sphere dispersion uniformly across the surface of the silicon wafer patterned with a predetermined array of etch pits or channels, the micro-spheres are subjected to a combination of gravity driven sedimentation, vibration induced oscillatory shear and evaporation-induced capillary forces. Together these forces cause the micro-spheres to settle and assemble as well-ordered, colloidal crystals. This occurs preferentially inside the etch pits rather than on the top surface of the wafer.

The choice of experimental parameters for optimizing the spin coating process of creating colloidal crystal patterned wafers include volume filling fraction of micro-spheres in the solvent, aqueous or non-aqueous solvent, pH, ionic strength and temperature. They all affect the efficacy of the spin coating, colloidal self-assembly process and its ability to produce well-ordered colloidal crystals within the etch pits in the wafer to yield the desired opal-patterned chip. Further enhancement of the process can be achieved by appropriately functionalizing the surface of the micro-spheres, the surface of the wafer and/or the walls of the etched pits and channels inside the wafer. This can be achieved by an appropriate chemical treatment or grafting of specific functional groups to the respective surfaces of the micro-sphere, wafer and/or etch pits and channels using standard techniques that are well-known to those skilled in the art. Each of these parameters may be optimized in order to obtain opal-patterned chips of acceptable structure-type and crystal quality.

This combination of physicochemical effects cause the micro-spheres to settle and close-pack in an orderly fashion mainly within the etch pits inside the substrate. Micro-spheres not caught in the pits are thrown off the substrate by centrifugal forces. Due to the 70.6° angular geometry of the etched V-shaped grooves and square pyramid-shaped pits, micro-spheres nucleate and grow in a vectorial fashion exclusively within the grooves and pits to form the desired pattern of fcc colloidal crystals. This can be orchestrated to yield the desired degree of filling and number of micro-sphere layer planes within the etched groves and pits. This can be seen in the SEM images shown in FIGS. 4b, 4c for the growth of silica micro-spheres within closed finite size etch pits inside oriented (100) silicon substrates. It is noteworthy that {100} layer planes of the silica colloidal crystal are well ordered and organized parallel to the [100] face of the single crystal Si (100) wafer. Over spatial areas sufficiently large for construction of photonic crystal micro-devices, colloidal crystals are seen to be high quality single crystals and can be made essentially free of defects. When micro-sphere vacancies are present in the silica colloidal crystals they can easily be identified, see FIG. 6b, 6c, and the effect of different numbers, locations and arrangements of point defects on optical diffraction properties evaluated.

Example 4

Spin-Coating Colloidal Crystal Clusters Inside Square Pyramid-Shaped Pits in Silicon (100) Wafers Interestingly, the first micro-spheres observed to nucleate in the square pyramidal-shaped etch pits are singlet, duplet, triplet and quadruplet and so forth type arrangements of micro-spheres located at the apex of the square pyramid pit, some examples being shown in FIGS. 5a, 5b, 5c. These embryonic micro-sphere clusters are found to dominate in the early stages of the spin-coating, colloidal self-assembly process inside the silicon etch pits and when dilute aqueous dispersions of micro-spheres are used. At later stages and with more concentrated dispersions, micro-spheres close-pack always starting from the apex and continue to grow up the walls and along the edges of the square pyramid-shaped etch pit to eventually fill them with well-ordered patterns of colloidal crystals, FIG. 6a. The edges of the pits generally seem to be filled first with well-ordered micro-spheres and the space that remains in the etch pit is subsequently filled with well-ordered close-packed micro-spheres. Further, the observed registry of {100} layer planes of micro-spheres between adjacent pits provides evidence for vectorial control of colloidal crystal nucleation and growth. The most frequently observed nucleation and growth scheme of colloidal crystal clusters of micro-spheres in confined geometries, like square pyramidal-shaped etch pits in silicon provides insight into the mechanism that enables control of thickness, area, orientation and registry of the patterned silica colloidal crystal within complex geometries inside the silicon wafer.

The whole process outlined above is reproducible and can be finished in less than 2 hours and the pits and channels can be completely filled with well-ordered close-packed colloidal crystals. The actual spin-coating and crystallization of micro-spheres in etch pit and channel patterned silicon wafers can be as short as seconds to minutes and the entire colloidal crystallization process is restricted just to the areas defined by the pits and channels. This advantage arises because any micro-spheres on the surface of the wafer are thrown off the wafer by centrifugal forces. Any adventitious micro-spheres remaining on unwanted regions of the substrate after the spin-coating step can be thrown of by subsequent spinning of solvent over the opal patterned wafer. Alternatively unwanted micro-spheres may be blown off the surface of the wafer by a gentle and directed stream of gas such as nitrogen, argon or air aimed across the surface of the opal-patterned wafer.

As the depth of the pits and grooves in Si (100) is proportional to the etching time, it is easy to control pit and groove depth to accommodate a predetermined number of layers of micro-spheres. This has been achieved for one to ten layers of patterned silica colloidal crystals in variously shaped pits and channels. It is important to note that the method described is in no way restricted to just ten layers as deeper pits may be obtained by longer etching times in base or by the use of reactive ion etching methods well known to those skilled in the art. Further, the method works well for both large and small micro-spheres (0.1-2.0 microns) and is not restricted to silica or latex, other compositions behave equally well. Note that the number of micro-spheres observed in the top (100) layer corresponds to the number of micro-sphere layer planes of the colloidal crystal within the V-shaped grooves as well as square pyramidal-shaped and rectangular pyramid-shaped pits.

Example 5

Spin-Coating Single Crystal Colloidal Crystals Inside Rectangular Pyramid-Shaped Pits in Silicon (100) Wafers Another attractive and inventive feature of the spin-coating process of this disclosure is the ability to intentionally tune the orientation and lattice structure of the colloidal crystal grown within the etch pits inside the wafer. This observation stems from the effect of the geometry of the etch pits on the nucleation and growth of the colloidal crystal within. A rectangular pyramid-shaped etch pit can be used to illustrate this novel and inventive concept reduced to practice in this disclosure. Because the first micro-spheres to settle in a rectangular pyramid-shaped etch pit most likely settle on the apex line, the number and geometry of this embryonic micro-sphere arrangement depends on the relative sizes of the micro-sphere diameter and the length of the line that defines the apex of the rectangular pyramid-shaped pit. If the arrangement is commensurate, that is the apex line is an integral number of micro-sphere diameters then a fcc colloidal crystal oriented along the (100) will grow in the rectangular pyramid-shaped etch pit. In stark contrast, if on the other hand the arrangement is incommensurate, that is the apex line is a non-integral number of micro-sphere diameters then the first micro-sphere(s) to settle in this kind of rectangular pyramid-shaped etch pit will not fit exactly on the apex line and other packing arrangements of micro-spheres are observed to grow.

The colloidal crystal lattice structure and orientation that nucleates and grows within the etch pit then appears to depend upon the ratio of the lengths of the sides of the rectangular pyramid-shaped etch pit. It also appears to depend on the energetic advantages of competitive surface interactions of micro-spheres with micro-spheres and micro-spheres with the walls of the etch pit in the wafer. These ideas are encapsulated in the examples shown in FIG. 7. It provides a new way of growing colloidal crystal templates with lattice structures that can be intentionally designed to be distinct to the usual face centered cubic thermodynamically stable structure. This provides the ability to tailor larger photonic band gaps in photonic crystals made by inverting the colloidal crystal template in high refractive index materials.

Method 3

Directional Evaporation Induced Self-Assembly (DEISA) of Colloidal Dimension Micro-Spheres The chemical lithography method of micro-molding in capillaries is used to create parallel arrays of micron scale patterns of geometrically well-defined rectangular-shaped micro-channels made for example of glass and polymers on wafers including silicon, quartz, glass, polymers and metals.

Referring to FIG. 8, a PDMS elastomeric stamp patterned with a parallel array of micron scale rectangular-shaped micro-channels is placed into conformal contact with a substrate such as a glass slide or silicon wafer. A drop of silica sol (from tetramethoxysilane and 0.1N oxalic acid (3:1 w/w), organic modified silica sol (from mixture of 3-(glycidoxypropyl)trimethoxysilane, tetramethoxysilane and 0.1N oxalic acid 5:1:1 w/w) or pre-polymer (NOA-60 or NOA-73 polyurethane from Norland or epoxy from Stauser) is infiltrated into the micro-channels. The sol spontaneously polymerizes and solidifies in 2 days and the pre-polymer cures by exposure to UV light in 1 hour (for Norland prepolymer) or annealing at room temperature for 18 hours (for epoxy). The PDMS stamp is then peeled off the substrate to create a pattern of vertical wall and flat bottom parallel grooves, see FIG. 9a. The rectangular channel pattern is a replica of the PDMS stamp and so the channel depth on the substrate is controlled by the photoresist thickness in the master. Other than the micromolding method to build vertical wall channels on flat substrates, similar vertical features can be created by anisotropic wet etching of a silicon wafer or deep reactive ion etching (DRIE, Bosch process). For the anisotropic etching method, a gold (50 nm) coated Si(100) wafer with titanium (5 nm) as adhesion layer is prepared by sputtering, similar to Method 1, a line PDMS master inked with hexadecanthiol is stamped to the substrate such that the line pattern is oriented 45° with respect to the flat end of the silicon wafer i.e. 110 direction. The gold and titanium is then etched away similar to that described in Method 1. Anisotropic wet etching is performed by using a concentrated potassium hydroxide solution (KOH 70 wt %) and isopropanol at 70° C. At high KOH concentration and high temperature, the etching rate of the 100 face is slower than that of 110, FIG. 9b (Ref. Powell et. al. J. Micromech. Microeng. 2001, 11, 217). Instead of the wet etching method, vertical features inside a silicon wafer can also be reliably created by standard deep reactive ion etching through the Bosch process (DRIE). In this method, a layer of $SiO_2$ (ca. 0.8 µm thick) is thermally grown on a Si(100) wafer at 900° C. A photoresist (HPR504, thickness 1.5 µm) is spin-coated onto the wafer and patterned by UV photolithography through a line pattern mask. After the photoresist is developed, the exposed $SiO_2$ was etched by a buffered hydrofluoric acid bath ($NH_4F$ and HF, 1:10 v/v) for 15 mins and then the photoresist is stripped off by acetone. A deep RIE process (Bosch process) is performed on the patterned wafer inside an Oxford RIE instrument. Each cycle of the Bosch process involves two steps, an etch step of silicon by $SF_6$ gas followed by $C_4F_8$ deposition step on the silicon surface. The etch rate is ca. 0.5 to 0.8 µm per cycle. The deposited fluorinated material was finally removed by a hot piranha solution, FIG. 9c.

With the micro-channels in a vertical orientation the patterned substrate is immersed into a dispersion of monodisperse silica micro-spheres. The choice of solvent depends on its volatility at room temperature. Preferred solvents include but are not limited to water and short-chain alcohols (n=1 to 4), or mixtures thereof. Ethanol was used in most of the examples disclosed herein. The micro-spheres spontaneously self-assemble and crystallize as well ordered 111 oriented opals exclusively inside the vertical grooves. This kind of localized crystallization of opals is novel and is believed to be due to strong capillary driven, directional mass flow of micro-spheres from the ethanolic dispersion into the micro-channels and away from the surfaces of the adjacent channel walls.

Directional evaporation induced self-assembly (DEISA) of colloidal dimension micro-spheres was utilized to grow and exclusively localize, single crystal opals within the rectangularly-shaped micro-channel spaces of the patterned wafers. Colloidal and capillary forces between micro-spheres as well as surface tension forces between micro-spheres and the walls of the rectangular-shaped channels direct micro-sphere crystallization entirely in these confined geometries. On placing the patterned substrate with a vertically oriented parallel array of micro-channels in an ethanolic dispersion of micro-spheres as shown in FIG. 10, capillary forces cause directional mass flow of micro-spheres into the micro-channels and away from the external surface regions of the substrate located between the micro-channels. The micro-spheres spontaneously self-assemble and crystallize into well ordered single crystal (111) oriented opals exclusively within the micro-channels.

Thus confined colloidal crystallization of micro-spheres in micron scale micro-channels with vertical walls and planar bottoms, is effective at directing the vectorial growth of (111) oriented single crystal opals exclusively within the micro-channel spaces and not on the surface regions of the wafer between the micro-channels. Once the spheres are inside the micro-channel, the crystallization process is highly influenced by the interaction between the particles and the walls of the micro-channel, as well as by its shape. All of these complex interactions yield long-range well-ordered and well-oriented face centered cubic colloidal crystals inside the micro-channels, which present ideal optical features characteristic of a high quality photonic crystal. Evidence of this is shown in FIGS. 11a, 11b, 12a, 12b and 13 (the three latter corresponding to example 1 of this method), in which results from the structural characterization performed by SEM and the optical analysis of the planarized colloidal photonic crystal structure are shown. FIG. 11a shows representative examples of scanning electron micrograph images of a parallel array of micron scale rectangular-shaped, silica opal micro-channels on a glass substrate grown by the method of directional evaporation induced self-assembly (DEISA). The top images depict the cleaved ends of the opal micro-channels and the bottom images display the top view. The opals grow exclusively in the micro-channels and not on the dividing walls. The micrographs of the top surface (FIG. 11a) show clear evidence for a highly ordered triangular arrangement of silica spheres. They suggest that, by the DEISA method, micro-sphere layers are form and packed parallel to the bottom of the substrate. In order to identify which crystalline structure the so-built colloidal crystal presents, a thorough analysis of cleaved edges was performed. An example of the micrographs employed for this analysis is shown in FIG. 11a. It was observed that, for all samples investigated, the crystalline faces observed in different directions were only compatible with a face centered cubic (fcc) structure. The small size of the colloidal crystals (always of the order of a few microns) facilitates and enhances the accuracy and conclusions of this study. Based on this kind of study, it has proven possible to assign the following three main crystalline directions to the free surfaces of oriented colloidal crystal grown by DEISA with respect to the faces of the micro-channels: (111) crystalline direction oriented perpendicularly to the bottom of the micro-channel; (1 1 −2) crystalline direction oriented perpendicularly to the walls of the micro-channel; (1 −1 0) crystalline direction, perpendicular to both the bottom and the vertical walls of the channel and pointing parallel to the direction of the longest dimension of the channel.

Figure 12A:
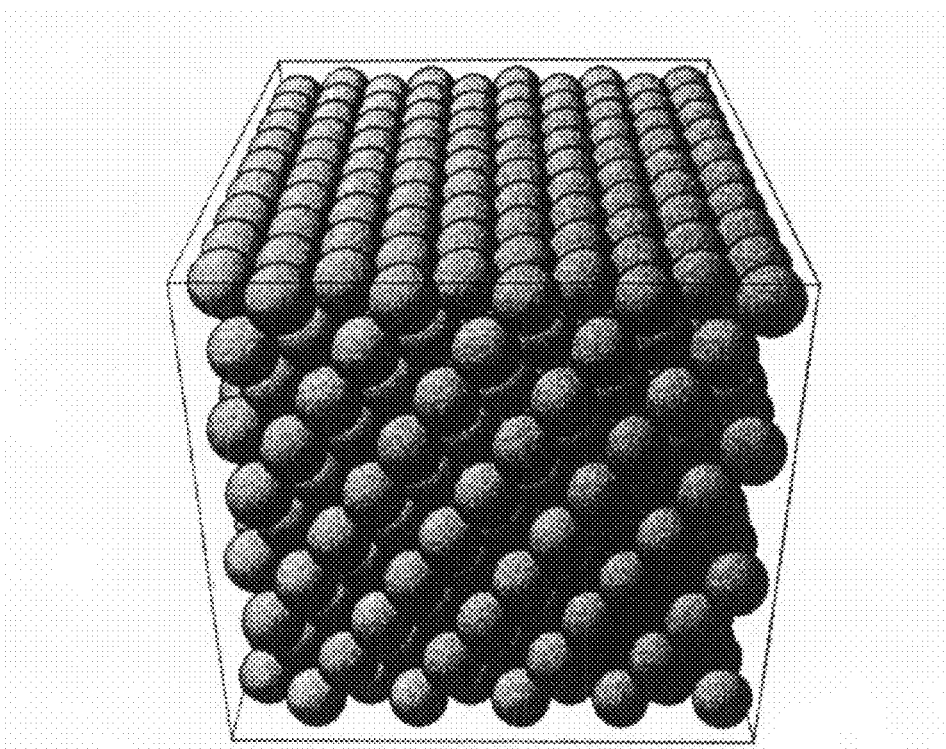
Figure 12B:
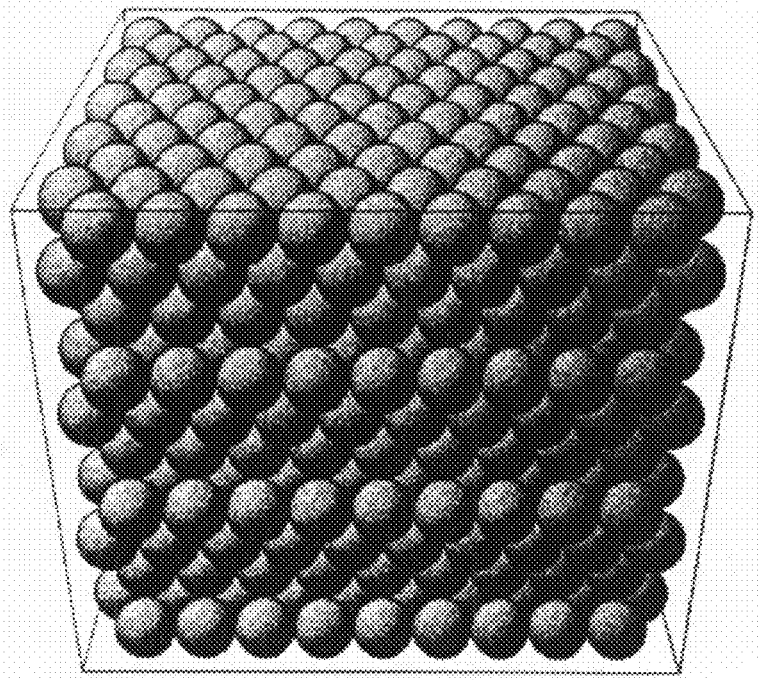

From this point on in the description of this invention, the different crystalline directions analysed are referred to following the convention established above. This tendency of colloidal spheres to crystallize in a fcc lattice rather than in any of the other possible close packed structures (random or hexagonal close packed) has been previously observed in other kinds of colloidal ordering processes. In the case of the present invention, it is believed that this phenomenon is strongly biased by the presence of vertical walls in the micro-channels. Due to the aforementioned control over shape, dimension and orientation of colloidal crystals, the method of geometrically confined colloidal crystallization is uniquely suited to the formation of well ordered, opal-patterned planar substrates for the fabrication of highly compact optically integrated microphotonic crystal chips in the future. In FIGS. 12a and 12b are drawn a model of the colloidal crystal inside the micro-channel. In FIG. 13, we present the photonic band structure showing the photon dispersion relationship (energy versus wavevector) along the main directions of the colloidal crystal confined in the micro-channel. It can be seen how photon frequency stop bands open in some of these directions, which may have an optical filtering effect or selective influence upon light propagating through or impinging on to the micro-channel and therefore, can be put into practice in actual photonic crystal optical devices.

In this process, a glass wafer was patterned with micron scale, rectangularly-shaped parallel micro-channels. It was used as a template to grow, by the method of directional evaporation induced self-assembly, a micron scale parallel array of very well ordered single crystal opal micro-channels whose (111) crystal direction is oriented parallel to the surface normal of the substrate. This method of patterning micron scale opals on substrates is considered to be a novel embodiment of this invention.

To summarize, a silicon master made of a silicon wafer with a polymer resist surface layer patterned with a parallel array of micron scale rectangularly-shaped micro-channels is first used to replicate the pattern of channels in a poly-dimethylsiloxane (PDMS) elastomeric stamp illustrated in FIG. 8. In the next step conformal contacting of the elastomeric stamp with a planar substrate is utilized to create a capillary micro-mold into which sol-gel glass or polymer precursors are introduced by capillary driven infiltration. Subsequent polymerization of these precursors and removal of the elastomeric micro-mold leaves behind a parallel array of micro-channels on the substrate with rectangular-shaped walls, which are composed of the solidified glass or polymer. These vertical features can also be created by anisotropic wet etching or deep RIE in silicon wafers, FIG. 9.

The next step involves directional evaporation induced colloidal self-assembly and crystallization of micro-spheres exclusively inside the micro-channel array, FIG. 10. This is achieved by placing the wafer, with the channels arranged in a vertical orientation in an ethanolic dispersion of micro-spheres. Capillary forces cause influx of the solvent into the channels. Evaporation of solvent from the pattern of menisci within and between the channels induces directional mass transport of micro-spheres entirely within the channels where through a combination of colloidal, capillary and surface forces they crystallize as very well ordered, oriented opals located entirely within the channels. The defining feature of this novel kind of directional evaporation induced self-assembly of micro-spheres, applied in this invention specifically to a planar substrate patterned with an array of parallel channels, is that capillary, colloidal and surface forces work cooperatively to direct micro-spheres to the micro-channels. This serves to spatially confine opal growth only within the channel spaces and not on the surface regions located between the channels. This novel strategy for planarizing single crystal opal designs in wafers is simple, cheap and reproducible and offers obvious advantages compared to other known methods for assembling micro-spheres into opal structures.

Numerous micro-photonic crystal devices useful for optical telecommunication applications may be produced using the present methods. These include passive devices like spectral filters, wavelength division multiplexers and demultiplexers, waveguide splitters and combiners, interleavers, attenuators, wavelength dispersion compensators and high-Q resonators. Active components like liquid crystals and luminescence guests can be incorporated into the components of micro-photonic crystal circuits to achieve for example electro-optical modulation and wavelength tuning of photonic crystals, electrically and optically excited photonic crystal micro-lasers and thermally tuned photonic crystal resonant structures. The example shown next, as well as that shown after the description of Method 5 described hereinafter, illustrates the optical quality and the applicability in photonics of the invention here described.

Example 1

Planarized Opal-Based Microphotonic Crystal Diffractive Optical Device in the Visible Wavelength Range 320±10 nm spheres were infiltrated by using the DEISA method inside an array of micro-channels consisting of epoxy-glass walls previously built on top of a transparent glass substrate. Using a micro-optical spectrometer it proved possible to obtain high quality optical micrograph images, as those shown in FIG. 14, of both transmitted and reflected (left and right panel respectively) light from the array of parallel opal micro-channels. In the images, one observes homogeneously colored patterns of visible light that replicate the pattern of micron scale parallel opal micro-channels. The visual homogeneity of light reflected from the opal micro-channels attests to the single crystal and high optical quality, structural perfection and impressively high degree of orientation order of opals grown in the micro-channels using the method described in this invention. The observed color of reflected light from the opal micro-channels originates from Bragg diffraction of photons by a face centered cubic arrangement of silica micro-spheres and air voids within the opal photonic lattice. It was feasible to record spatially resolved optical reflectance and transmittance data from individual micro-channels in the array, the form of which vindicated the presence of very well ordered (111) oriented single crystal opals located exclusively with the micro-channels, as shown in FIG. 15. Importantly, the optical reflectance and transmittance data recorded in the visible and near infrared spectral regions was reproducible on scanning the incident light beam from opal micro-channel to opal micro-channel. This included the fine detail of the optical side lobes that straddle the main reflectance peak, the origin of which is related to the size of the silica colloidal crystal. There was no sign of any reflectance peaks from the spatial regions between the opal micro-channels.

In order to test the possible variations in the optical quality along an opal micro-channel, we performed spatially resolved spectroscopy, thoroughly mapping the confined colloidal crystal using a spatial filter (pinhole) to isolate square areas of 15 µm×15 µm and recording the optical reflectance at each site. In FIG. 16a, the spectra recorded every 20 microns along the micro-channel are shown, the total length analyzed being 300 microns. It can be seen that, overall, the optical quality of the crystal is maintained along the micro-channels for extremely long distances compared to the micro-channel width which is quite adequate for the construction of photonic crystal devices based on confined colloidal crystals of the type described in this invention. It indicates a low occurrence of defects such as cracks or disorder in the sample. Optical analysis shown in this figure provides strong evidence that the long-range order observed in the top surface of the confined colloidal crystal in the SEM also exists in the direction perpendicular to that surface. Moreover, it shows that the methods described in this invention allow the growth of photonic colloidal crystals with a much larger spatial coherence than those built employing other colloidal crystallization methods described in the literature.

In FIG. 16b, the position of the reflectance peak along with its width are plotted versus the distance to the first optically tested area in the micro-channel. The small fluctuation of both parameters is evidence of the long-range order existing in the confined colloidal crystals. These random fluctuations are, very likely, due to variations in the lattice constant caused by channel width random fluctuations and/or the presence of random vacancies that induce a relaxation of the crystal. In any case, this result clearly shows that there exists a large overlap between the stop band, observed in different regions along the confined colloidal crystal and, therefore, it confirms the large spatial coherence of the colloidal crystal grown by the DEISA method f this invention.

Using the same micro-spectroscopy technique, and taking advantage of the controlled orientation achieved by DEISA, we have analysed the reflectance along different crystalline directions of the confined colloidal crystals. FIG. 17 shows the optical reflectance measured along the (1 1 1) and the (−1 −1 1) crystalline directions (left and central panel respectively) for a planarized confined colloidal crystal made of 320±10 nm diameter spheres by DEISA. The right panel shows the calculated photonic band structure corresponding to the Γ-L direction in the reciprocal space. These calculations have been made employing the software developed by Joannopoulous et al at MIT, based on the plane wave expansion method and available on the web. Both reflectance spectra were taken using a microscope to focus the light coming from a quartz lamp in a few square microns. Radiation impinges at an angle of zero degrees with respect to the normal of the tested surface in each case, as shown by the red arrows in the insets of the figure. The agreement between theory and experiments supports the hypothesis suggested by the SEM analysis that crystallization within rectangular micro-channels gives rise to a well oriented crystal. In addition, it indicates that an optical frequency filtering effect occurs in different directions of the structure, which could be put into practice in actual planarized micro-photonic crystal devices.

The optical reflectance data observed for these planarized opal-based micro-photonic crystal patterns are essentially those expected for the theoretically predicted ideal for such 3-D diffractive micro-optical components. The consistency of Bragg diffraction and side lobes observed for each of the opal micro-channels confirms the reproducibility of size and shape of the opals grown in the rectangular-shaped micro-channels of the wafer by the novel directional evaporation induced self-assembly (DEISA) procedure described in this invention. It also emphasizes the high degree of single crystal structural perfection of the opals patterned by the method of directional evaporation induced self-assembly of micro-spheres confined in micro-channel arrays. This particular arrangement of planarized opal micro-channels can be straightforwardly engineered to function as a prototype micro-photonic crystal optical filter for visible and near infrared light but is by no means limited to this kind of photonic crystal device.

Method 4

Dip Coating Self-Assembly of Colloidal Dimension Micro-Spheres

Large diameter 850±20 nm silica micro-spheres have been directed to and crystallized exclusively within the spatial confines of a parallel array of micron scale rectangular-shaped micro-channels by the novel method of dip coating self-assembly (DCSA). In this approach to making opal-patterned wafers a micro-channel patterned substrate was dipped into a 2-5 wt % ethanolic dispersion of mono-disperse silica micro-spheres that have diameters anywhere in the size range of 350 nm to 2500 nm. While ethanolic based solutions are preferred, those skilled in the art will appreciate that other solvents may be also be preferred including for example water or other short-chain alcohols (n=1 to 4). The rate of withdrawal of the patterned substrate from the ethanolic dispersion of silica micro-spheres was in the velocity range 0.5 to 3 cm/s. Evaporation induced self-assembly and capillary forces operate simultaneously to drive the silica micro-spheres exclusively to undergo colloidal crystallization into the micro-channels and not on the surface regions of the vertical walls located between the micro-channels.

Referring to FIG. 18, representative examples are shown of scanning electron micrograph images of a parallel array of micron scale rectangular-shaped silica opal micro-channels on a glass substrate grown by the method of dip coating self-assembly (DCSA).

The opal crystal order in the opal micro-channels is of good quality but not quite as high a quality as that obtained by the DEISA method described above. The dip coating self-assembly method of creating opal-patterned wafers seems to work well for vertically aligned micro-channels with respect to the surface of the dispersion of micro-spheres. In this process, micro-channels held at other angles with respect to the surface of the ethanolic dispersion allows deposition of some micro-spheres on the outer surface of the vertical walls as well as in the micro-channels.

Another novel aspect of this invention is that the method works well for both large and small silica micro-spheres. This is an attribute not enjoyed by conventional methods of crystallizing silica opals, in particular, made of large silica micro-spheres with diameters greater than 700 nm. This is the range of silica micro-sphere diameters crucial for opal templating of high refractive index contrast inverse opals made of for example silicon and germanium, which have complete photonic band gaps in the near infrared optical telecommunication wavelength range. Such large silica micro-spheres are well known to undergo gravity driven settling too rapidly in water to allow formation of well ordered opals by sedimentation and similarly fall too rapidly in solvents like ethanol to enable formation of well ordered opal film by evaporation induced self-assembly. The formation of well ordered large silica micro-sphere opal micro-channels by dip coating is a novel feature of the method described in this invention.

Method 5

Assisted-Directed Evaporation Induced Self-Assembly (ADEISA) of Colloidal Dimension Micro-Spheres A novel way to maintain large diameter silica micro-spheres in a liquid dispersion and not allow them to suffer the deleterious affects of too rapid a gravity driven sedimentation as described above is to gently stir the ethanolic dispersion of micro-spheres at a controlled rate as shown in FIG. 19. In this method, a substrate patterned with a parallel array of micron scale rectangular-shaped micro-channels held in a vertical orientation is placed in a container of silica micro-spheres suspended in ethanol, which are maintained in a levitated state by hydrodynamic forces in the solvent induced by a mechanical propeller or a spinning stir bar magnet located at the bottom of the container. In the region of the meniscus contacting the patterned wafer, a combination of evaporation induced self-assembly and mass transport, hydrodynamic and capillary forces, cause the large diameter silica micro-spheres to crystallize exclusively within the micro-channel spaces and not on the surface of the dividing micro-channel walls.

It will be appreciated that it is not immediately obvious that micro-sphere agitation would work in this situation because it is counter-intuitive to the criteria that need to be satisfied in the formation of well ordered opals, however very surprisingly it works well. FIG. 20a shows representative SEM images of opal micro-channels made by the novel ADEISA method disclosed herein. It works very well for large monodisperse silica micro-spheres with diameters in the range 700 nm to 2500 nm, important for photonic crystal applications in the near infrared optical telecommunication wavelength range. Clearly agitation as exemplified but not limited to stirring, of the normally quiescent dispersion of micro-spheres in ethanol serves in this case to maintain the micro-spheres in a state of levitation where they undergo enhanced micro-sphere collisions but without disturbing the quiescent state of the meniscus. This favourable situation works cooperatively with capillary forces and mass transport effects to drive the micro-spheres into the channels and away from the dividing walls, to enable efficient self-assembly and crystallization of micro-spheres entirely in the micro-channels instead of allowing them to settle too quickly under gravity driven sedimentation which would prevent colloidal crystallization in the micro-channels.

The effect of agitation is to prevent the micro-spheres from settling too fast but at the same time allows them to be directed into the spatial confines of the micro-channels to crystallize into well ordered opal micro-channels by evaporation induced self-assembly, colloidal and capillary forces as described in the DEISA method of this invention. The difference in this case is that DEISA is now assisted-directional evaporation induced self-assembly and is called ADEISA. There is a delicate balance between the distance of the magnetic stir bar from the surface of the ethanolic dispersion of large diameter silica micro-spheres and the rate of stirring with respect to the crystal quality of opals that grow in a micro-channel patterned substrate. The key is not to disturb the meniscus between the patterned wafer and the ethanolic dispersion of silica micro-spheres. A quiescent meniscus facilitates controlled evaporation induced self-assembly and mass transport based delivery of large diameter silica micro-spheres from the ethanolic dispersion in the meniscus region into the rectangular-shaped micro-channels without any sign of deposition of micro-spheres on the surface regions located between the micro-channels.

To expand, a rectangular-shaped groove patterned substrate is immersed in an ethanolic dispersion of silica micro-spheres (diameter 850±20 nm, micro-sphere loading in ethanol 1-5 wt %) in a 30 ml vial (2.5 cm diameter and 8 cm long). The dispersion is slowly agitated by magnetic stirring at a rotation rate of 100 rpm to 300 rpm so that the solution meniscus is maintained in a quiescent state. The magnetic agitation of the ethanolic dispersion of silica micro-spheres serves to prevent micro-sphere sedimentation, enhances collisions between micro-spheres and maintains a steady concentration of micro-spheres at the meniscus. This enables evaporation induced self-assembly, capillary and directional mass transport delivery of micro-spheres exclusively into the micro-channels where they organize and crystallize into well-ordered opal micro-channels.

It will be appreciated that ADEISA is also a useful method for making high quality opal film on a planar substrate, such as silicon or silica, with a controlled number of layers of micro-spheres with diameters anywhere in the size range of 700 nm to 2500 nm. The film thickness of the spheres on the surface of the substrate may be controlled by the concentration of spheres in the dispersion. As with Examples 3 and 4 above, preferred solvents are water and short chain alcohols (n=1 to 4) because of their high volatility at room temperature. FIG. 20b shows a representative example of a scanning electron micrograph image of a colloidal crystal film on a flat glass substrate containing 850±20 nm colloidal dimension silica micro-spheres grown by the ADEISA method. Large silica micro-sphere ADEISA opal film made using any form of agitation (e.g., mechanical, thermal, acoustical) is also considered to be a novel embodiment of this invention because ADEISA is an excellent method of making film and patterns of high quality opal in and on planar and even curved substrates.

It will be appreciated by those skilled in the art that while the methods disclosed herein have been illustrated with respect to silica colloidal spheres, these methods of growing colloidal crystals may be applied using non-spherical shapes such as rods and the like. While soft lithography has been used in many of the examples disclosed herein for making the surface indentations and channels, it will be appreciated that there are numerous other methods for producing the surface relief patterns in the surface of the substrate. Other methods of producing the relief patterns include but are not limited to photolithographically-wet and dry etch defined micro-machining and laser micro-machining processing techniques. The surface relief pattern can also be produced by the chemical lithography method of micro-molding in capillaries as discussed in Method 3 above used to produce the surface relief pattern made for example of glass and polymers on substrate wafers including silicon, quartz, glass, polymers and metals. Thus the surface relief pattern is produced in a mold, which is essentially bonded to the surface of the substrate. Generally speaking, the surface relief pattern can be defined by either a built-in pattern in to the surface by a mask which is temporarily placed on the substrate surface having a system of channels located therein which define void spaces between the mask and the surface. In either case, applying a liquid dispersion containing colloidal particles of selected shape and size onto the surface results in the void spaces being filed by micro-capillary action, by spinning the substrate, or by DEISA or ADEISA, whereby the colloidal particles self-assemble in the void spaces.

Example 1

Planarized Opal-Based Microphotonic Crystal Diffractive Optical Devices in the Visible and NIR (Control of the Optical Features Due to Crystal Size Effects)

The accurate control of the photonic crystal properties of devices based on the invention described herein is illustrated by the comparison between the optical properties of three samples consisting of the same kind of micro-channel but each one infiltrated with micro-spheres of a different size. In all three cases, the micro-channel width and depth dimensions were the same and spheres were infiltrated by DEISA (320 nm spheres) and ADEISA (550 nm and 970 nm spheres) methods. The wavelength axis has been divided by the sphere size in each case for the sake of comparison of the spectra.

The optical reflectance is shown in FIG. 22. This figure illustrates that several important optical features can be controlled by the confined crystallization method described in this invention. First, it shows that micro-spheres of a wide range of diameters can be crystallized by means of the methods described above, which allows an accurate tuning of the lattice constant of the colloidal photonic crystal and therefore of its optical properties. This implies a major advantage and improvement when compared to other methods previously reported in the literature. Second, when the spectra are compared, one of the most remarkable differences observed between them concerns their relative width. An increasing widening of the spectra is observed as the infiltrated sphere diameter increases, or, in other words, as the photonic crystal size is decreased. This tendency is in good agreement with theoretical predictions and it is explicitly shown in the inset, where peak width (as defined before) versus number of micro-sphere layers in the (111) direction of the crystal has been plotted. As the channel depth is the shortest dimension of the system, it is the dominant dimension regarding size effects. This result demonstrates that colloidal crystal size can be controlled by the methods described herein. Moreover, it suggests that colloidal crystal size may be employed to tune photonic band gap widths in an analogous way that electronic band gap widths can be tuned by means of semiconductor crystal size.

Method 6

Fabrication of Patterned Colloidal Crystal Systems on Flat Substrates

An amalgamation of the DEISA technique described in this invention and the method of colloidal micro-sphere assembly inside micro-capillaries (MIMIC, G M Whitesides, Adv. Mater. 1996, 8, 245) has been utilized to create a colloidal crystal superlattice, which can be used as a bi-frequency colloidal crystal Bragg diffractor and/or tunable width single frequency optical filter. The fabrication process is depicted in FIG. 23a. To amplify, a line patterned PDMS stamp is put into conformal contact with a flat substrate (e.g. glass, quartz, Si wafer, polymer sheet). A 1-3 wt % dispersion of colloidal silica micro-spheres (diameter=930±20 nm) in a water/ethanol mixture (4:1 v/v) was added to one end of the micro-channel. Spherical particles are driven by capillary forces into the rectangular-shaped micro-channels. Evaporation of solvent from the other end of the micro-channels drives a flux of micro-spheres into the end of the micro-channel and induces the micro-spheres to self organise and pack into a well-ordered colloidal crystal. The confined colloidal crystals in the PDMS are dried in a dessicator.

A UV-curable polyurethane (Norland NOA73) is then infiltrated into the void space of the confined colloidal crystal by capillary forces (FIG. 15b). After curing under UV for 4 hours, the PDMS is peeled off to leave a rectangular-shaped line groove pattern on the substrate, in which the wall is composed of colloidal sphere and polyurethane, FIG. 23b. This patterned substrate is then immersed into an ethanolic dispersion of smaller diameter silica micro-sphere (diameter=550 nm, 0.5-1 wt %). The micro-spheres are deposited inside the grooves through directed evaporation induced self-assembly (DEISA), FIG. 23c. The embedded polyurethane is removed by heating at 450 degree for 5 hours, FIG. 23d. The sequence of sphere infiltration plays important role in the colloidal crystal ordering.

Example 1

Bi-Frequency Colloidal Crystal Bragg Diffractor and/or Tunable Width Single Frequency Optical Filter FIG. 23e shows a bi-frequency colloidal crystal mirror prepared by same procedure based on 550 nm and 970 nm silica spheres, except in this case, the smaller sphere (550 nm) is infiltrated into the PDMS master, followed by infiltration of DEISA of the 970 nm sphere. The overall quality of the colloidal crystals and their interfaces are better. It is believe that this improvement in the crystal order is due to a smoother surface of a small sphere-polymer composite wall than that of a big sphere-polymer composite wall for the DEISA process.

FIG. 24 shows optical reflectance measurements of the structure shown in FIG. 23d and made of two alternating planarized colloidal crystals, made of 550 nm and 970 nm diameter micro-spheres respectively. A micro-spectroscopy technique was employed to isolate the optical features of each of them (dashed and dotted line for the larger and smaller micro-sphere colloidal crystal respectively). Also, the overall reflectance of the structure was collected (solid line). It can be seen that the optical properties of the hybrid photonic crystal structure is the result of adding up the optical properties of the individual photonic crystal components. Actually, it behaves as a bi-frequency selective mirror in which the positions and the width of each one of the reflected frequency bands can be determined by the micro-sphere diameter and the size of the colloidal crystals. Alternatively, it can be seen to function as a mono-frequency selective filter in which the width of the transmitted frequency band will be determined by the difference between the diameters of each kind of micro-sphere in the structure.

Example 2

Colloidal Crystal Lincoln Log "Wood-Pile" Superlattice Constructed by the Method of Micro-Molding Inside Capillaries (MIMIC)

The previous example depicted a 2-D colloidal crystal superlattice comprised of two different size micro-spheres. By building a 3-D periodic scaffold on a flat surface and using DEISA, a 3-D wood-pile superlattice made of a colloidal crystal is fabricated. The process is summarized in FIG. 25a. Two PDMS line masters are placed in contact face-to-face with the pattern in an orthogonal orientation. A photo-curable polymethacrylate (J91, Summer optics) is infiltrated into the grooves through the capillary effect (MIMIC). After curing under UV for an hour, one PDMS micro-mold is careful removed to leave the wood-pile structure on the other PDMS stamp. This stamp is then pressed (1 kg/cm$^2$) onto a flat substrate (glass, quartz, Si wafer) and heated above the glass transition temperature of the PMMA polymer (130 degree) for 5-8 hours. After cooling to room temperature, the PDMS is carefully peeled off and leaves behind a 3-D wood-pile structure on the surface, FIG. 25b. This patterned substrate is then immersed into a dispersion of silica micro-sphere in ethanol (diameter=350 nm to 1300 nm, 0.1-3 wt %), the colloidal micro-spheres self-assemble inside the empty space of the wood-pile structure by DEISA or ADEISA depending on the choice of micro-sphere size, FIG. 25c.

FIG. 26 shows an optical micrograph of a wood-pile superlattice made by micro-molding inside capillaries (MIMIC). The sample was illuminated under white light employing a ×50 magnification microscope and the incident and reflected radiation direction being normal to the top surface of the planarized colloidal crystal structures that form the sample. The observed colored patterns, coming from both the lower and the upper stripes indicates the ordering of the micro-spheres within the complex wood-pile micro-capillary structure.

Example 3

Modulated Thickness Colloidal Crystal Micro-Channels

The grooves described in this example have designed thickness controlled either by etching time of silicon wafer or the thickness of a relief structure in a photo-resist pattern. A method to prepare a vertical wall micro-channel with modulated depth is described herein. FIG. 27 illustrates a procedure for the fabrication of a modulated thickness colloidal crystal. The procedure is similar to the preparation of the wood-pile structure, FIG. 25a. During the heating step for transferring the pattern to the substrate, the oven temperature is set at 180° C., which is higher than the glass transition temperature of the PMMA. The PMMA line structure imprints its pattern on the PDMS stamp. By putting this imprinted PDMS stamp on a flat substrate, followed by capillary infiltration of polyurethane (NOA73, Norland) and curing under UV light, a line pattern with modulated steps is formed. After removing the PDMS, the patterned substrate is dipped into an ethanolic dispersion of silica micro-sphere (350 nm, 01-3 wt %) and the micro-spheres deposit and self assemble into colloidal crystal micro-channels with periodic thickness through DEISA or ADEISA.

Figure 28A:
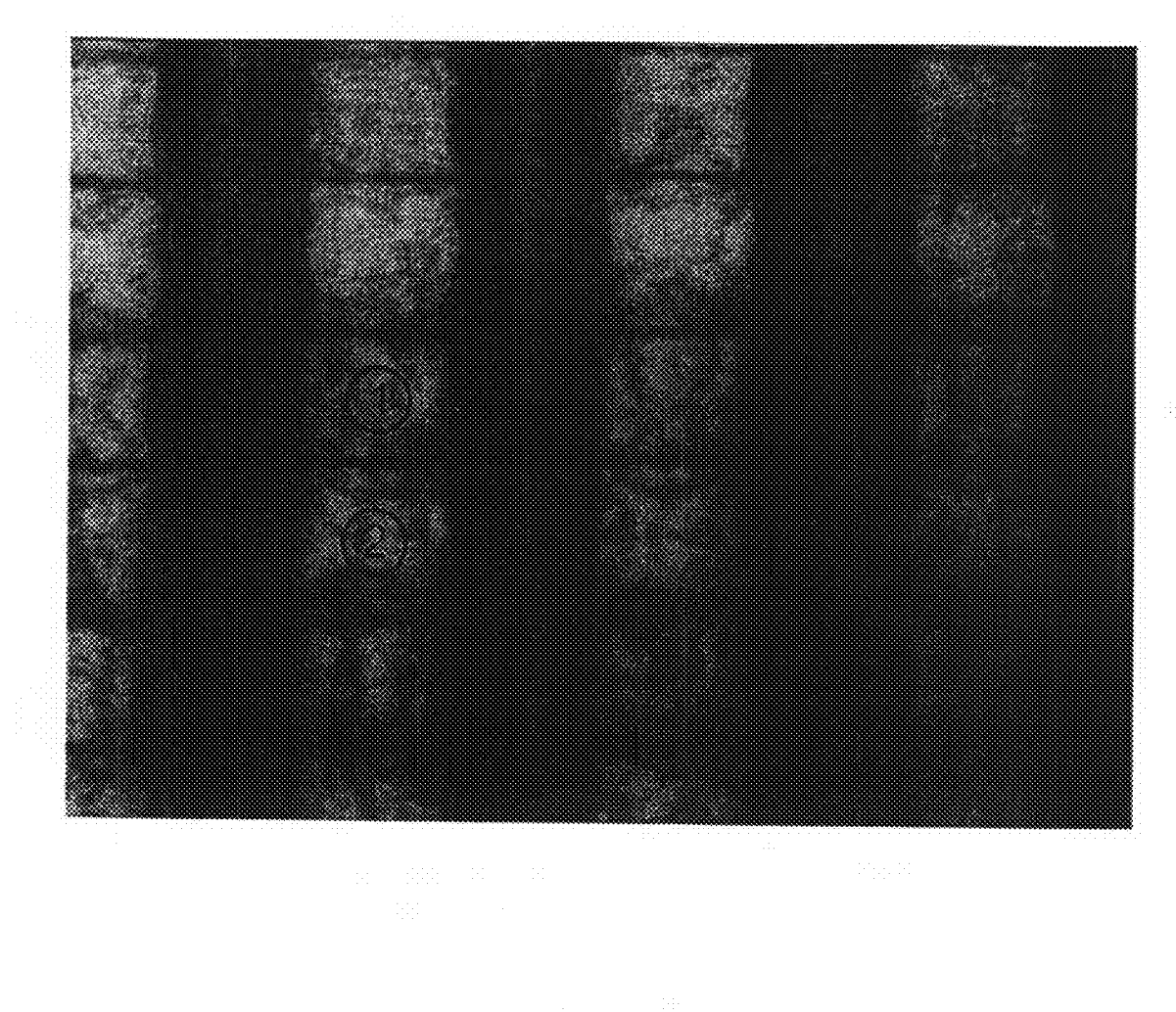
Figure 28B:
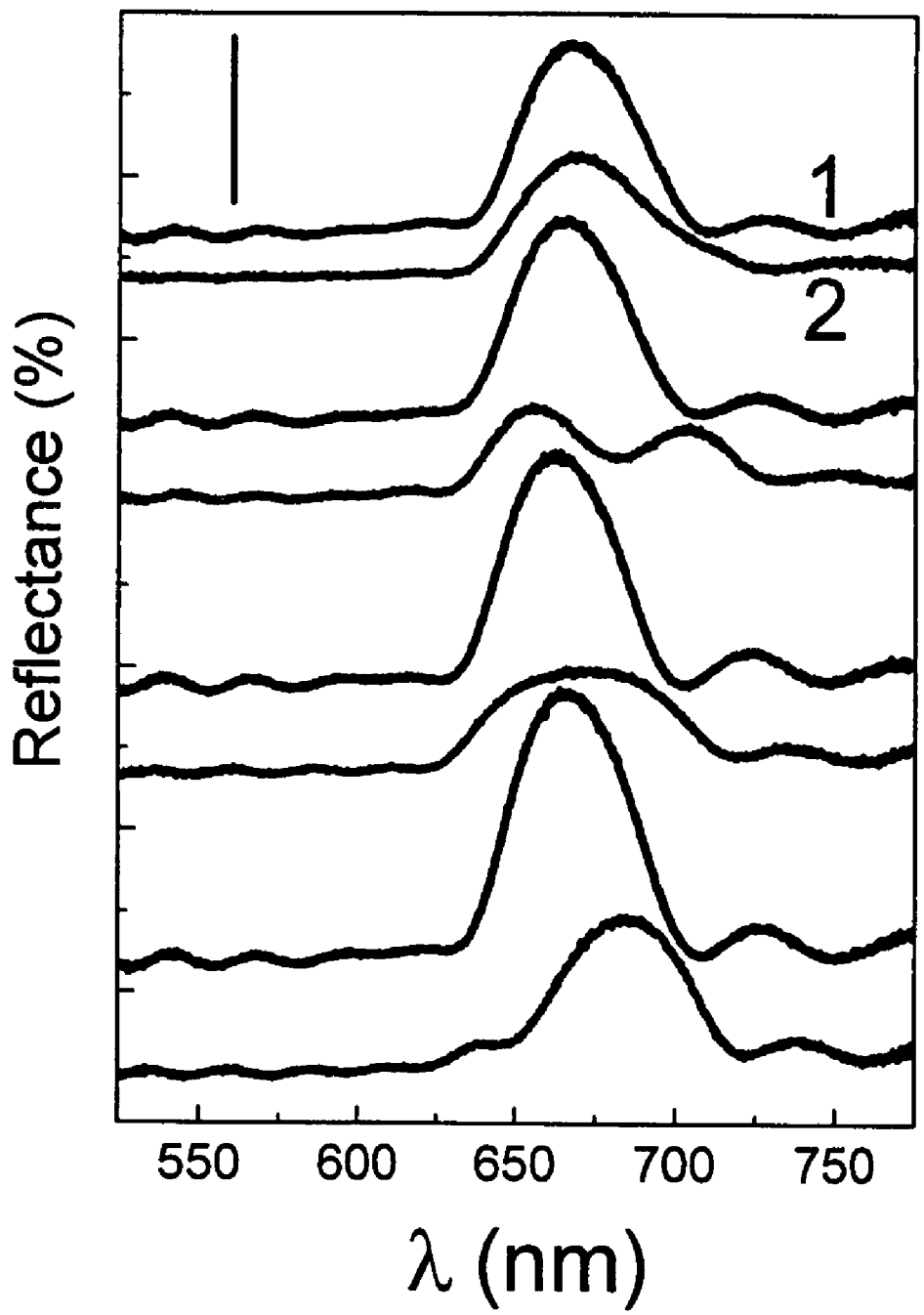

Concerning the optical properties of such a modulated thickness opal-microstructure, FIG. 28a shows an optical micrograph of a modulated thickness colloidal crystal made following the procedure described in this example. FIG. 28b shows a set of reflectance spectra measured employing a micro-spectroscopy technique and corresponding to eight consecutive square colloidal crystal tiles as those shown in FIG. 28a. The two kinds of colloidal crystal sites that were alternately measured are labelled as 1 and 2 in the inset of FIG. 28a and their respective reflectance can be identified by a black and a red line, respectively. In this case, the effect of crystal size on both the intensity and width of the reflectance spectra can be seen.

Applicability to 1-, 2- and 3-Dimensional Colloidal Crystal Structures

The self-assembly methods for organizing micro-spheres exclusively within surface relief patterns on substrates described herein, which enable the formation of single domain colloidal crystal micro-channel and micro-well constructions of a predetermined size, shape, lattice architecture, orientation and registry either on, or within, a substrate surface, are by no means intended to be limited to the preparation of 3-D colloidal crystal photonic lattices. The recent literature (Materials Science Aspects of Photonic Crystals, MRS Bulletin Aug. 2001, pp 608-646) is replete with examples that dramatically demonstrate the novel science and potential technological value of 1-D and 2-D photonic crystals.

More specifically, the width and depth of colloidal crystal micro-channels and micro-wells can be purposely tailored to contain just a single line of ordered micro-spheres, in other words a 1-D colloidal crystal photonic lattice (see FIG. 2) as well as just a single layer plane of ordered micro-spheres—a 2-D colloidal crystal photonic lattice (FIG. 29). Both such examples of 1-D and 2-D photonic crystals based on periodic 1-D and 2-D arrays of micro-spheres grown in surface relief patterns of micro-channels and micro-wells by the colloidal-assembly and micro-fabrication methods outlined in this invention respectively, may be used as 1-D and 2-D diffractive optical elements in miniaturized optical devices and circuits. These low dimensional colloidal crystal photonic lattices can also be utilized as templates for synthesizing, in a wide range of materials compositions, inverted 1-D and 2-D photonic crystal replica structures. It will therefore be clear to those skilled in the art that the methods described in the various embodiments of this invention provides a straightforward, rapid, reproducible and cost effective means for generating surface patterns of well-ordered and high optical quality single domain 1-D and 2-D and 3-D colloidal crystal and inverted colloidal crystal photonic lattices whose lattice dimensions, structures and compositions, refractive indices, extrinsic defects and internal light sources as well as other guests can be intentionally and purposefully tailored to create diffractive optical elements and photonic lattices that have 1-D, 2-D and 3-D photonic stop bands and/or photonic band gaps located in the visible or near infrared wavelength regions of the electromagnetic spectrum and are therefore perceived to have potential value for the manufacture of planarized optically integrated micro-photonic crystal devices and chips, which may provide an enabling technology for the manufacture of highly compact optical circuits for all-optical computer and telecommunication systems in the future.

Example 1

For 1D and 2D systems in which a monolayer of spheres is formed, the photoresist thickness is carefully controlled to be close to the sphere diameter. To elaborate, a photoresist pattern of 3 micron lines with 3 micron spacing and approximately 0.5 micron thick is used as master to make PDMS stamp, which is used to create a polyurethane relief pattern (NOA73) on glass by microtransfer molding (Whitesides et al, Advanced Materials 1996, 8, 837). The patterned substrate is then immersed into an ethanolic dispersion of silica spheres (1 wt %, 530±20 nm). The spheres exclusively self-assemble into close-packed arrays inside the microchannels using DEISA. SEM images reveals that the thickness of the colloidal crystal is a single layer and the spheres are packed in the <111> direction. Furthermore, arrays can be formed by using a line mask with line spacing similar to the sphere diameter through DEISA.

Example 2

A V-shaped channel pattern is fabricated inside a silicon wafer by soft lithography and anisotropic etching. Using a similar method to microfluidic infiltration of spheres inside V-shaped channels, very dilute silica sphere dispersion is used such that the spheres are only deposited in the apex of the channel. Due to evaporation induced capillary forces, the spheres self-assemble into a 1-D ordered chain. Smaller V-shaped channels can also be fabricated with respect to their depth and width by using a smaller size line pattern.

B) Inversion of Colloidal Crystal Patterns

Once the colloidal crystal patterns have been produced in the etched patterns on the substrate, the next steps are consolidation of the colloidal crystal within the substrate. Consolidation of the silica colloidal crystal within the wafer or substrate may be achieved by a number of methods, including thermal sintering and viscous flow of silica around 800-900° C., or hydrothermal treatment in aqueous base to give necking of the silica micro-spheres, or chemical vapour deposition CVD of a volatile silica precursor to connect the silica microspheres with a thin uniform coating of silica. In the case of the sintering process, this leads to the necking, or the formation of small necks, between neighbouring silica spheres. Necking is the thermally induced softening and flow of silica into the regions defined by the touching of silica spheres in the colloidal silica crystal to create a silica neck with a diameter that facilitates infiltration of silicon into the voids of the silica opal and etching of silica from the infiltrated opal to create the inverse silicon opal.

Another extremely important parameter of the colloidal patterns embedded within the substrates when used as matrices for other compounds, is the filling fraction (ratio between the volume occupied for each compound and the total volume of the structure). In the case where the colloidal patterns are large enough to form for example a silica opal structure, sintering provides an accurate way to control the filling fraction between 74% and 100% of silica in opals. The process of necking allows tuning of the dimensions of the silica opal and the resulting inverse silicon opal. The process of necking also provides mechanical stability to the colloidal crystal in addition to providing a control over the opal void volume for subsequent synthesis and providing the connected network topology for removal of the template by an etching process if inversion is performed, discussed hereinafter. The resulting composite material (substrate with colloidal crystal) may be used in various applications such as chromatography, for use in lab-on-chip based devices, micro-reactors and the like. The composite material is packaged as required.

For applications in which composites containing photonic materials are desired, the consolidated crystalline colloid/substrate composite material is next subjected to infiltration of the colloidal crystal pattern with a material having the desired refractive index followed by inversion to remove the silica spheres. In the case where the colloidal crystal patterns are to be inverted using silicon, disilane CVD in the colloidal crystal patterned silicon wafer template followed by fluoride-based etching generates the inverted silicon colloidal crystal patterns embedded within a silicon wafer. Co-pending U.S. patent application Ser. No. 60/178,773 discloses more details of CVD infiltration of colloidal crystals and is incorporated herein in its entirety by reference.

Silicon was grown inside the void spaces of the silica opal template by means of chemical vapor deposition (CVD) using disilane ($Si_2H_6$) gas as a precursor. The temperature during infiltration may be in the range from 100° C. to about 500° C., but preferably the temperature is varied from 250° C. for low in-filling samples to 350° C. for high in-filling ones.

The composite material was placed in a quartz cell and dried under vacuum for about 5 hours. Disilane gas was added to the cell to raise the pressure to about 200 torr, but the pressure may be in the range from 0.1 to about 760 Torr. The cell was heated at 350° C. for different periods of time hours, Table 5. The cell was evacuated by vacuum to remove disilane that remained unreacted and annealed to 500° C. for 30 minutes. (Disilane deposition: Dag O; Ozin G A; Yang H; Reber C; Bussiere G; Photoluminescent silicon clusters in oriented hexagonal mesoporous silica film, Advanced Materials 1999, Vol 11, Iss 6, pp 474-482. Chomski E; Dag O; Kuperman A; Coombs N; Ozin G A; New forms of luminescent silicon: Silicon-silica composite mesostructures, Advanced Materials: Chemical Vapor Deposition 1996, Vol 2, Iss 1, pp 8-15. Silicon annealing: Temple-Boyer P; Scheid E; Faugere G; Rousset B; Residual stress in silicon films deposited by CVD from disilane, Thin Solid Films 1997, Vol 310, Iss 1-2, pp 234-237).

The reaction time was typically 24 hours and the disilane pressure was about 200 torr. After anchoring and growth of silicon, the composite material is annealed or heated to 500° C. to assist diffusion of silicon into the voids in the colloidal crystal to provide substantially uniform spatial distribution of silicon in the voids. The annealing temperature is varied depending on whether crystallization of the silicon is required. The silica-silicon composite may be annealed in the temperature range from about 400° C. to 950° C. It is noted that in the applications where inversion of the colloidal pattern to form a silicon photonic crystal having photonic band-gaps (PBG) is the goal, the amount of infiltration is controlled. For example, theory predicts that the maximum PBG is obtained with a 80% to 97% in-filling of the opal voids in the form of a uniform, thick, wetting layer on the silica surfaces in the case of the opal structure.

The silica spheres comprising the original colloidal crystal is subsequently removed using fluoride-based etching procedures designed to minimize the dissolution of the macroporous silicon framework. The composite with the inverted colloidal crystal may be annealed in the temperature range from about 400° C. to 1100° C.

Fluoride based etches are believed to have the best selectivity for silica in the presence of silicon. In this example, the silicon infiltrated colloidal silica crystal is placed in a 1 or 2% aqueous HF solution for about 8 hours. To those skilled in the art of etching silica from silicon it is well known that buffered 10:1 $NH_4F$/HF solution can be usefully employed to keep a constant level of fluoride ions. This is common in small photolithography set ups to dissolve silica in the presence of silicon. (Silicon Etchants: Ghandhi, S K; VLSI Fabrication Principles, Wiley, 1983). Thermal reductive-elimination of surface hydride from the inverse silicon inverted colloidal crystal is employed to control the ultimate hydrogen content of the silicon layer.

In addition to disilane, other precursors for silicon that could easily be infiltrated into silica colloidal crystals (opals) followed by sacrificial etching of the silica template include the following. Molecular beam and laser ablation of Si atoms followed by thermal post treatment in a controlled atmosphere to control the amorphous and crystalline silicon content. Capped and uncapped colloidal and molecular cluster forms of silicon using vapor, melt and solution-phase techniques followed by thermal post treatment. Infiltration of silane-based polymers using solution and melt impregnation and thermal post-treatment techniques. Other volatile CVD silane-based precursors may be taken from the homologous series $Si_nH_{2n+2}$ where n=1, 2, 3 etc.

The infiltrated silicon may be in the form of single crystal silicon, amorphous silicon, polycrystalline silicon, porous silicon and nanocrystalline silicon. Literature examples cited above for different precursors and different deposition techniques could be used to create these different forms of silicon, which comprise the inverse silicon opal.

Once the colloidal patterned wafer has been consolidated and inverted to produce the photonic crystal embedded within the etched pattern on the substrate or wafer, it may then be buried by being coated with a layer of the substrate material. The whole process described above may then be repeated, another pattern etched into the top layer of the new coating, another colloidal crystal grown followed by consolidation and inversion. In this way, a composite photonic crystal chip is built up with each inverted colloidal crystal pattern performing different optical functions.

This method provides a novel way of making photonic chips where in one example optical fibers are integrated into on-wafer photonic crystals. In one embodiment of this approach a patterned silicon wafer plus appropriately positioned glass fibers in wafer serve as a template for directing growth of a silica colloidal crystal, which then functions as a template for a disilane-based chemical vapor deposition process. This creates a silicon wafer with specified patterns of integrated silicon-silica colloidal crystals and glass fibers. Fluoride-based etching procedures remove the silica colloidal crystal template and simultaneously shape the ends of the glass fibers into micron scale sharp tips able to couple light into and out of photonic crystals on wafer. This process generates an optically integrated micro-photonic crystal silicon chip architecture comprised of silicon wafer and predetermined designs of silicon photonic crystals with a complete 3-D photonic band gap near 1.5 microns (wavelength of choice for optical telecommunications) seamlessly coupled to glass fibers—this highly compact optical circuit is packaged and planarized in the chip. Similar architectures can be orchestrated involving optical waveguides coupled to photonic crystals in a planarized optically integrated micro-photonic chip. On-wafer silicon photonic crystals can be patterned with structural defects based on for example micron scale points, line and bends that function to localize light and control spontaneous emission for low threshold micro-lasers and guide and bend light for photon micro-circuits all contained within a silicon wafer platform. Such optically integrated silicon micro-photonic crystals—silica fibers—waveguides—silicon wafers—optical microcircuits—are envisioned as all-optically integrated microchips for optical computing and optical telecommunication systems.

Glass fibers and waveguides can be integrated into on-wafer photonic crystals with technology well known to those skilled in the art. This enables for example patterning of silicon photonic crystals with structural defects based on micron scale points, line and bends that can function to localize light for low threshold micro-lasers and guide and bend light for photon microcircuits all contained within a silicon wafer platform. Optically integrated silicon photonic crystals—silica fibers—waveguides—silicon wafers are envisioned as all-optically integrated microchips for futuristic optical computing and optical telecommunication systems.

FIGS. 15a, 15b and 15c illustrate an example of how self-assembly and soft-lithography can be effectively combined to make an optically integrated micro-photonic crystal chip comprised of in-wafer patterned photonic crystals and optical fibers of the genre illustrated in the diagram. The whole process is straightforward, quick, repeatable and cost-effective. In one embodiment of this invention orthogonal V-shaped grooves 12 are etched in the surface of a Si (100) wafer 10. Three cladded silica optical fibers 14 with planar ends are positioned within the grooves and a silica colloidal crystal 20 is grown in the region confined by the ends of the fibers 14 using the method described in previous examples of this invention. Thermal treatment in the temperature range of 800-900° serves to neck and consolidate the component silica micro-spheres of the colloidal crystal 20 as well as the silica optical fibers 14 with the silicon wafer 10. Light activated chemistry could them be performed using the crystal 20 as a micro-reactor. In cases where optical devices are to be produced, in this example based on silicon, disilane chemical vapor deposition at a specified temperature deposits the desired degree of filling and form of silicon (e.g., nanocrystalline, amorphous, hydrogenated amorphous, polycrystalline) within the accessible void spaces of the in-silicon wafer patterned silica colloidal crystals 20 and optical fibers to create a silicon-silica composite replica thereof.

A fluoride-based etching procedure serves to simultaneously remove the silica colloidal crystal template and shape the end portion 24 of the cladded silica optical fiber 14 into micron-scale sharp tips that butt up against the inverted silicon colloidal crystal 20 formed by this process. In this way near infrared light at or around 1.5 micron, the optical telecommunication wavelength of choice, can be coupled into and out of an omni-directional silicon photonic crystal with a complete 3-D photonic band gap at or around 1.5 microns. This very simple, elegant, fast, reproducible and inexpensive process generates easily manufacturable integrated photonic chips comprised of in-wafer functional patterns of micro-photonic crystals and optical fibers that are envisioned as the micro-optical circuits for managing photons in all-optical computers and optical telecommunication systems. To those skilled in the art, similar methods can be utilized for coupling in-wafer patterned optical waveguides with photonic crystals to make optically integrated micro-photonic crystal circuits and chips for all-optical computers and telecommunication systems.

To amplify, observations of the integrated substrates with colloidal patterns embedded therein, disclosed herein are new and very interesting. They suggest that the intentional selection of the orthogonality of the rectangular pyramid-shaped etch pit, and the surface functionalization of the microspheres and walls of the etch pit, can both be used to advantage to control the structure of colloidal crystals patterned inside wafers. This is a very significant because the stable structure of close packed micro-spheres is well documented to be fcc. Since the inception of the field of colloidal crystallization it has so far proven impossible to gain command over colloidal crystallization of lattice types other than fcc, such as the most desirable bcc, tetragonal or diamond. The capability to design both the lattice structure type and preferred orientation of colloidal crystals with controlled thickness, area and registry inside wafers has tremendous potential for tailoring the photonic band gaps, photonic band structure and photonic density of states for photonic crystals and devices.

For planar opal film comprised of the large silica spheres (600 to 2500 nm) grown on planar substrates by employing Method 5, after the consolidation and inversions steps are complete, highly compact planarized optical circuits comprising optically integrated wave-guides and micro-photonic crystals may be produced using standard lithographic patterning and wet and dry etch-based micro-machining and laser micromachining processing techniques familiar to those skilled-in-the-art.

In summary, the processes described in Methods 1, 2, 3, 4, 5, 6 above of growing crystalline colloidal crystal patterns of known thickness, area, lattice structure and orientation within a substrate is experimentally straightforward, generally applicable and amenable to mass production. The methods advantageously are rapid, reproducible and cheap. They may for example be easily adapted for engineering lattice dimensions, refractive index contrast, structural defects, location and integration of photonic crystals on photonic chips that are coupled to optical communication fibers and waveguides. One particularly useful application of these silica colloidal crystal patterns embedded within the silicon wafer is that they may be used as templates to make inverted silicon colloidal crystal replicas that operate at or around 1.5 microns, the wavelength of choice for optical fiber telecommunications.

The present invention discloses six fast, reproducible and cost effective ways, that combine micro-fluidics, spin-coating, assisted and non-assisted directed evaporation induced self-assembly and dip-coating with colloidal-assembly and soft lithography, for the fabrication of micron scale patterned colloidal crystals on the surface of or embedded within substrates. A significant advantage of these methods is that they have the capability of working well with large or small diameter micro-spheres, they can create well-ordered, high optical quality, simple and complex colloidal crystal architectures, they can control defects in colloidal crystals as well as the number and orientation of close-packed layer planes of micro-spheres in the colloidal crystals that are embedded beneath the surface of a single crystal silicon (100) wafer. The wafers can be coupled to glass fibers or other types of waveguides in a process like that outlined above.

The methods disclosed herein for growing patterned crystalline colloidal crystals on or inside wafers is able to simultaneously create spatially patterned and well-ordered colloidal crystal lattices of micro-spheres with a predetermined number of layers and a specified orientation, of the layers embedded within open and continuous as well as closed and finite channels and pits within a substrate. Further the methods of preparation are simple, fast, reproducible and cheap. Indeed the methods are so elegant in their simplicity that they are particularly attractive for manufacture of photonic crystals, devices and chips that are seamlessly coupled to glass fiber or other waveguide optical systems.

The use of soft lithography is one amongst many methods of producing a pattern on the surface of the substrate but it will be appreciated by those skilled in the art that any method of producing a selected surface relief pattern on the substrate surface may be used which gives raised portions on which the mask rests. The relief patterns may be of many forms, which include but are not limited to square, rectangular, hemi-cylindrical, V-shaped, trapezoid, rhomboid, saw-tooth grooves/channels, polygonal indentations, and spherical and cylindrical holes. Lithographically defined channels in the wafer may have a range of shapes (e.g., V, square, saw-tooth, single and modulated thickness) and designs (e.g. straight and curved lines, triangular, square, rectangular and hexagonal grids).

Therefore, when the mask is placed on the top surface it sits on the raised portions of the surface relief pattern so that voids such as channels are defined between the top surface of the substrate and the bottom surface of the mask. Providing a mask with a surface relief pattern and the substrate having a planar surface could also be used so that voids such as channels are defined above the top surface of the substrate and within the mask.

Those skilled in the art will appreciate that the methodologies disclosed herein are quite general and not limited to silica colloidal crystal patterns in silicon wafers. For example, unconventional patterning methods of the soft lithography type (such as micro-contact printing, micro-molding in capillaries, micro-transfer printing, micro-writing), and conventional patterning techniques of the photolithography type may be used to carve micron scale designs in the substrate or sculpt micron scale patterns on the substrate. The substrate may comprise a range of materials other than silicon in planar or curved forms and in the shape of solid and hollow fibers and solid and hollow cylinders made of for example glass and polymers. Materials include crystalline insulators like quartz and sapphire, amorphous ones like glass, and polymers like polymethyl-methacrylate and polyurethane. However, colloidal crystal templating of PCs can be generalized to a range of high refractive index semiconductors, like Ge, GaAs, InP, CdSe, HgTe and CuBr to allow engineering of the PBG. Also included are inorganic insulators and semiconductors like tin oxide, titanium dioxide, indium tin oxide and zirconium oxide, organic polymeric semiconductors like poly-p-phenylenevinylenes, polythiophenes, polyphenylenes, polyacetylenes, inorganic polymeric semiconductors like polyferrocenylsilanes, organic semiconductors like buckyballs, buckytubes and polycylcic aromatics like tetracene, swellable-shinkable organic or inorganic polymer gels. Also included are semimetals like graphite and bismuth, metals like platinum and gold, alloys like platinum-iron, superconductors like yttrium barium copper oxide and lanthanum copper oxide and magnesium boride. Micro-spheres may comprise inorganic materials or organic and inorganic polymeric materials having diameters ranging from about 0.1 to about 5.0 microns with a polydispersity less than 5%. Patterned colloidal crystals embedded in or grown on the wafer can have structures other than face-centered cubic. These structures include diamondoid, regular and random hexagonal and can be comprised of component shapes other than spheres.

While the present methods have been illustrated using self-assembly of colloidal particles on surfaces, it will be appreciated that these methods may be used to self-assemble colloidal crystals in tubes, nearly closed or buried structures which are useful when it may be desirable to hermetically seal the substrate/crystal material.

The colloidal crystal patterned wafers may be used to template inverted colloidal crystal replicas with a wide range of compositions, textures and properties. Materials classes comprising the inverted colloidal crystals include but are not limited to insulators, semiconductors, metals, alloys, semimetals, superconductors, ionically and electronically conducting and non-conducting organic and inorganic polymers, biomolecules and biopolymers, and ceramics. Materials textures include but are not limited to single crystalline, polycrystalline, nanocrystalline, nanocluster, colloidal and amorphous. Materials properties include but are not restricted to ferroelectricity, ferromagnetism, ferrimagnetism, paramagnetism, superparamagnetism, paraelectricty, electrochromism, photochromism, electroluminescence, photoluminescence, photobirefringence, photorefractivity, thermochromism, barochromism, photoconductivity, magnetostriction, magnetooptical, chirality, liquid crystallinity, and giant magnetoresistivity.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of synthesizing composite material of a colloidal crystal and a substrate, comprising:
    a) providing a substrate having a surface with a surface relief pattern; and
    b) applying a liquid dispersion containing monodisperse micro-spheres made of silicon dioxide ($SiO_2$) having a diameter in a range from about 0.1 to about 5 microns onto said surface and spinning said substrate whereby said monodisperse micro-spheres are swept across said surface and self-assemble in void spaces on said surface defined by said surface relief pattern.

2. The method according to claim 1 wherein said substrate is selected from the group consisting of insulators, semiconductors, glasses, polymers and metals.

3. The method according to claim 1 wherein said surface relief pattern is produced using soft lithography.

4. A method of synthesizing composite material of a colloidal crystal and a substrate, comprising:
    a) providing a substrate having a surface with a surface relief pattern;
    b) applying a liquid dispersion containing colloidal particles onto said surface and spinning said substrate whereby colloidal particles are swept across said surface and self-assemble in void spaces on said surface defined by said surface relief pattern; and
    c) consolidating the colloidal crystal by thermal sintering or hydrothermal treatment in aqueous base, resulting in necking of the colloidal particles, or silica chemical vapor deposition.

5. The method according to claim 4 including a step d) of infiltration of the colloidal crystal with a material followed by a step e) of inversion to remove the colloidal particles to produce an inverted colloidal crystal on said substrate.

6. The method according to claim 5 wherein said inverted colloidal crystal is a photonic crystal.

7. The method according to claim 6 wherein a ratio of air to said material is selected so that said photonic crystal is characterized by a photonic bandgap.

8. The method according to claim 5 including a step of depositing a layer of material on top of the surface of said substrate containing said inverted colloidal crystal.

9. The method according to claim 8 including a step of producing a surface relief pattern on a top surface of said layer of said material and repeating steps b), c), d), and e) to produce a substrate with more than one inverted colloidal crystal pattern embedded within said substrate.

10. The method according to claim 9 wherein said more than one inverted colloidal crystal are photonic crystals embedded within said substrate.

* * * * *